US006550686B2

United States Patent
Kawai et al.

(10) Patent No.: US 6,550,686 B2
(45) Date of Patent: Apr. 22, 2003

(54) VEHICLE AIR CONDITIONING SYSTEM WITH NON-CONTACT TEMPERATURE SENSOR

(75) Inventors: Takayoshi Kawai, Hoi-gun (JP); Toshifumi Kamiya, Takahama (JP); Akira Ohga, Ichinomiya (JP); Hiroshi Ando, Nagoya (JP); Yuichi Kajino, Nagoya (JP); Hiroyuki Tarumi, Kariya (JP); Katsuyoshi Nishii, Okazaki (JP)

(73) Assignee: Denso Corporation, Kariya (JP)

( * ) Notice: Subject to any disclaimer, the term of this patent is extended or adjusted under 35 U.S.C. 154(b) by 74 days.

(21) Appl. No.: 09/850,899

(22) Filed: May 8, 2001

(65) Prior Publication Data

US 2001/0039806 A1 Nov. 15, 2001

(30) Foreign Application Priority Data

| May 9, 2000 | (JP) | ........... 2000-136215 |
| May 30, 2000 | (JP) | ........... 2000-160813 |
| May 11, 2000 | (JP) | ........... 2000-139027 |
| Jun. 6, 2000 | (JP) | ........... 2000-169156 |
| Jun. 15, 2000 | (JP) | ........... 2000-180239 |

(51) Int. Cl.$^7$ .................. F24F 7/00; G01K 13/00
(52) U.S. Cl. ............. 236/49.3; 236/9 K; 374/121; 702/131
(58) Field of Search .................. 236/91 C, 91 E, 236/49.3; 702/131; 374/121

(56) References Cited

U.S. PATENT DOCUMENTS

| 5,187,943 A | * | 2/1993 | Taniguchi et al. | ........ 236/91 C |
| 6,137,407 A | * | 10/2000 | Akagawa et al. | ........... 340/552 |
| 6,202,934 B1 | * | 3/2001 | Kamiya et al. | ........... 236/91 C |

FOREIGN PATENT DOCUMENTS

| JP | A-10-197348 | 7/1998 | ............ B60A/1/00 |
| JP | A-10-230728 | 9/1998 | ............ B60H/1/00 |

* cited by examiner

Primary Examiner—William Wayner
(74) Attorney, Agent, or Firm—Harness, Dickey & Pierce, PLC

(57) ABSTRACT

In a vehicle air conditioning system, a non-contact temperature sensor having plural temperature detecting elements is disposed to detect a predetermined region within a passenger compartment. The plural temperature detecting elements are constructed by plural first elements each of which has a smaller temperature detecting area in the predetermined region, and plural second elements each of which has a larger temperature detecting area in the predetermined region. The non-contact temperature sensor detects an area, where a detail temperature-distribution information is necessary, using the first elements, and detects an area, where the detail temperature-distribution information is unnecessary, using the second elements.

38 Claims, 31 Drawing Sheets

| A | B | C | D |
|---|---|---|---|
| E | F | G | H |
| I | J | K | L |
| M | N | O | P |

← 70

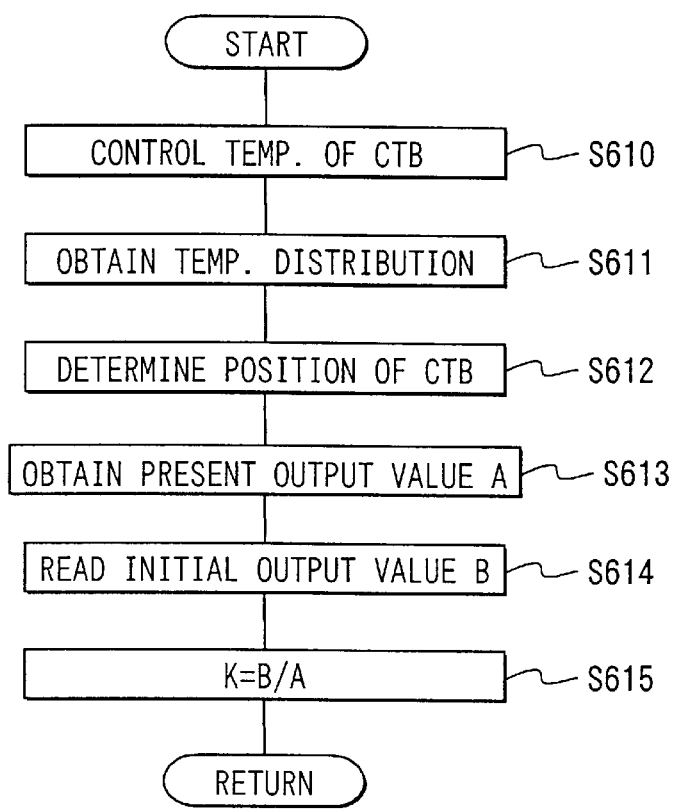
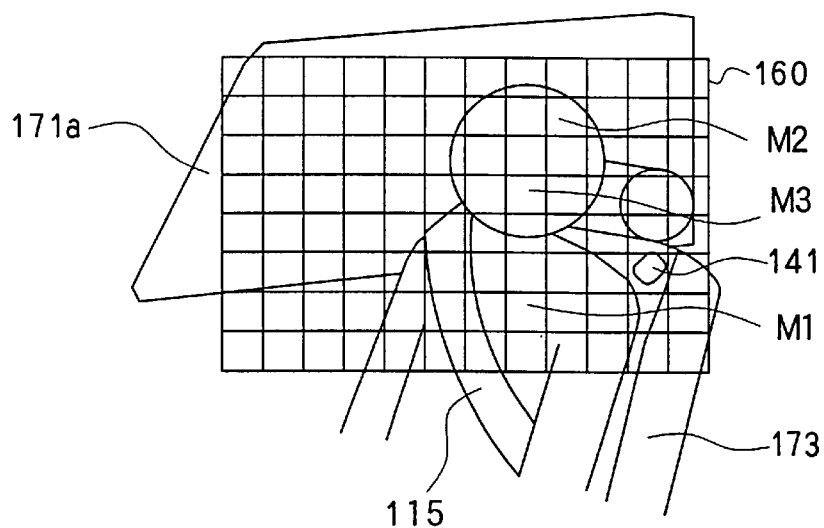

VEHICLE AIR CONDITIONING SYSTEM WITH NON-CONTACT TEMPERATURE SENSOR

CROSS-REFERENCE TO RELATED APPLICATION

This application is related to Japanese Patent Applications No. 2000-136215 filed on May 9, 2000, No. 2000-139027 filed on May 11, 2000, No. 2000-160813 filed on May 30, 2000, No. 2000-169156 filed on Jun. 6, 2000, and No. 2000-180239 filed on Jun. 15, 2000, the contents of which are hereby incorporated by reference.

BACKGROUND OF THE INVENTION

1. Field of the Invention

The present invention relates to a vehicle air conditioning system for performing an air conditioning control based on a temperature within a passenger compartment, detected by a non-contact temperature sensor.

2. Description of Related Art

A conventional air conditioning system for a vehicle using a non-contact temperature sensor is disclosed in each of JP-A-10-197348 and JP-A-10-230728. In these conventional systems, temperatures of a passenger and in the neighborhood of the passenger are detected by an infrared sensor (non-contact temperature sensor) in which plural temperature detecting elements are arranged in a shape of a matrix, and a direction of solar radiation or intensity of the solar radiation is estimated based on their temperature signals of the infrared sensor. In the conventional system as disclosed in JP-A-10-230728, an atmospheric temperature in the neighborhood of a passenger is further estimated, and the air conditioning control is performed based on the estimated atmospheric temperature. However, in the matrix infrared sensor, when both the temperature in the neighborhood of the passenger and the temperature of a predetermined-position face skin of the passenger are detected, it is necessary to narrow a detection area of each temperature detecting element to correspond to the detection face area of the passenger in order to accurately detect the face skin temperature of the passenger. Accordingly, the number of the temperature detecting elements is increased, production cost of a control circuit of the air conditioning system is increased, and a processing time of temperature signals becomes longer.

SUMMARY OF THE INVENTION

In view of the foregoing problems, it is an object of the present invention to provide a vehicle air conditioning system with a non-contact temperature sensor having plural temperature detecting elements, which accurately detects temperature in a narrow range and shorten a temperature-signal processing time in low cost.

It is an another object of the present invention to provide a vehicle air conditioning system using a non-contact temperature sensor, in which a stable temperature environment can be obtained in the passenger compartment.

It is a further another object of the present invention to provide a correction method of a non-contact temperature sensor, for accurately detecting a temperature detecting object.

According to the present invention, in a vehicle air conditioning system, a non-contact temperature sensor is disposed to detect a predetermined region within a passenger compartment in a non-contact state using plural temperature detecting elements, and an air-conditioning state to be introduced into the passenger compartment is controlled based on a temperature signal from the non-contact temperature sensor. In this vehicle air conditioning system, the temperature detecting elements include a plurality of first elements each of which has a first temperature detecting area in the predetermined region, and a plurality of second elements each of which has a second temperature detecting area larger than the first temperature detecting area in the predetermined region. Thus, temperature in an area where a detail temperature-distribution information is necessary is detected using the first elements to be accurately detected, while the number of the entire temperature detecting elements is made smaller. Accordingly, the temperature in a narrow range can be accurately detected by the non-contact temperature sensor, and a temperature-signal processing time can be shortened in low cost.

Preferably, when a passenger is seated on a seat in the passenger compartment, the predetermined region includes the face portion of the passenger and a part around the face portion, and the non-contact temperature sensor is disposed to detect temperature of the face portion of the passenger using the first elements and to detect temperature of the part around the face portion using the second elements. Accordingly, temperature information regarding the face portion of the passenger can be accurately detected.

Further, the non-contact temperature sensor is disposed in such a manner that the face portion and a glass portion of the vehicle are overlapped from each other when being viewed from a position of the non-contact sensor to the predetermined region. Because the glass is low in thermal conductivity and a thermal capacity thereof is large, an abrupt temperature change, due to conditioned air, outside air, solar radiation, or the like, hardly occurs. Therefore, fluctuation of an average temperature of the face portion due to the temperature fluctuation of the face portion background portion becomes small, the fluctuation of the blow-out air amount and the blow-out air temperature of conditioned air become small, and a stable temperature environment is obtained in the passenger compartment.

Preferably, a control unit for controlling the air-conditioning state using the non-contact temperature sensor includes specific region detecting means for detecting a specific region where temperature is out of a predetermined temperature range among the predetermined region, and disturbance determining means which determines that there is a disturbance when the specific region moves in the predetermined region with an elapsed time. Accordingly, an outer disturbance object can be readily accurately determined, and air-conditioning operation of the vehicle air conditioning system can be accurately performed.

In addition, a reference member is disposed in the predetermined region to be set at a predetermined temperature, an initial output value of the non-contact temperature sensor, obtained by detecting temperature of the reference member at an initial time is stored, and a correction coefficient of a present output value of the non-contact temperature sensor is corrected by comparing the present output value and the initial output value. Here, the present output value is obtained by detecting temperature of the reference member at the present time. Accordingly, temperature of a temperature detecting object can be accurately detected.

Preferably, the control unit forms a temperature distribution map of the face portion and the part around the face portion based on temperature signals from the temperature detecting elements of the non-contact temperature sensor, the control unit estimates a position of the face portion within the temperature distribution map, and the control unit estimates a position of a specific portion within the face portion based on a temperature change in the estimated position of the face portion. Accordingly, the position of the specific portion can be accurately estimated.

According to an another aspect of the present invention, a non-contact temperature sensor has a plurality of temperature detecting elements each of which generates an electrical signal in accordance with an amount of infrared rays, and the non-contact temperature sensor is disposed to detect a predetermined region within the passenger compartment in a non-contact state using the temperature detecting elements. Further, a control unit controls an air-conditioning state to be introduced into the passenger compartment based on a temperature signal from the non-contact temperature sensor, the non-contact temperature sensor include a lens through which the infrared rays pass, and the lens is disposed to change a relative position with the temperature detecting elements. The control unit changes the relative position of the lens with the temperature detecting elements to switch a first state of the non-contact temperature sensor, for detecting temperature of an entire area of the predetermined region, and a second state of the non-contact temperature sensor, for detecting temperature of a part area in the predetermined region. Accordingly, a detail temperature information can be obtained in the second state.

BRIEF DESCRIPTION OF THE DRAWINGS

Additional objects and advantages of the present invention will be more readily apparent from the following detailed description of preferred embodiments when taken together with the accompanying drawings, in which:

FIG. 37 is a flow diagram showing a control process regarding a correction of an output signal of the non-contact temperature sensor, according to the fourteenth embodiment;

FIG. 38 is a view showing a temperature detecting region of a non-contact temperature sensor, according to a fifteenth preferred embodiment of the present invention;

DETAILED DESCRIPTION OF THE PREFERRED EMBODIMENTS

Preferred embodiments of the present invention will be described hereinafter with reference to the accompanying drawings.

[First embodiment]

Figure 1:
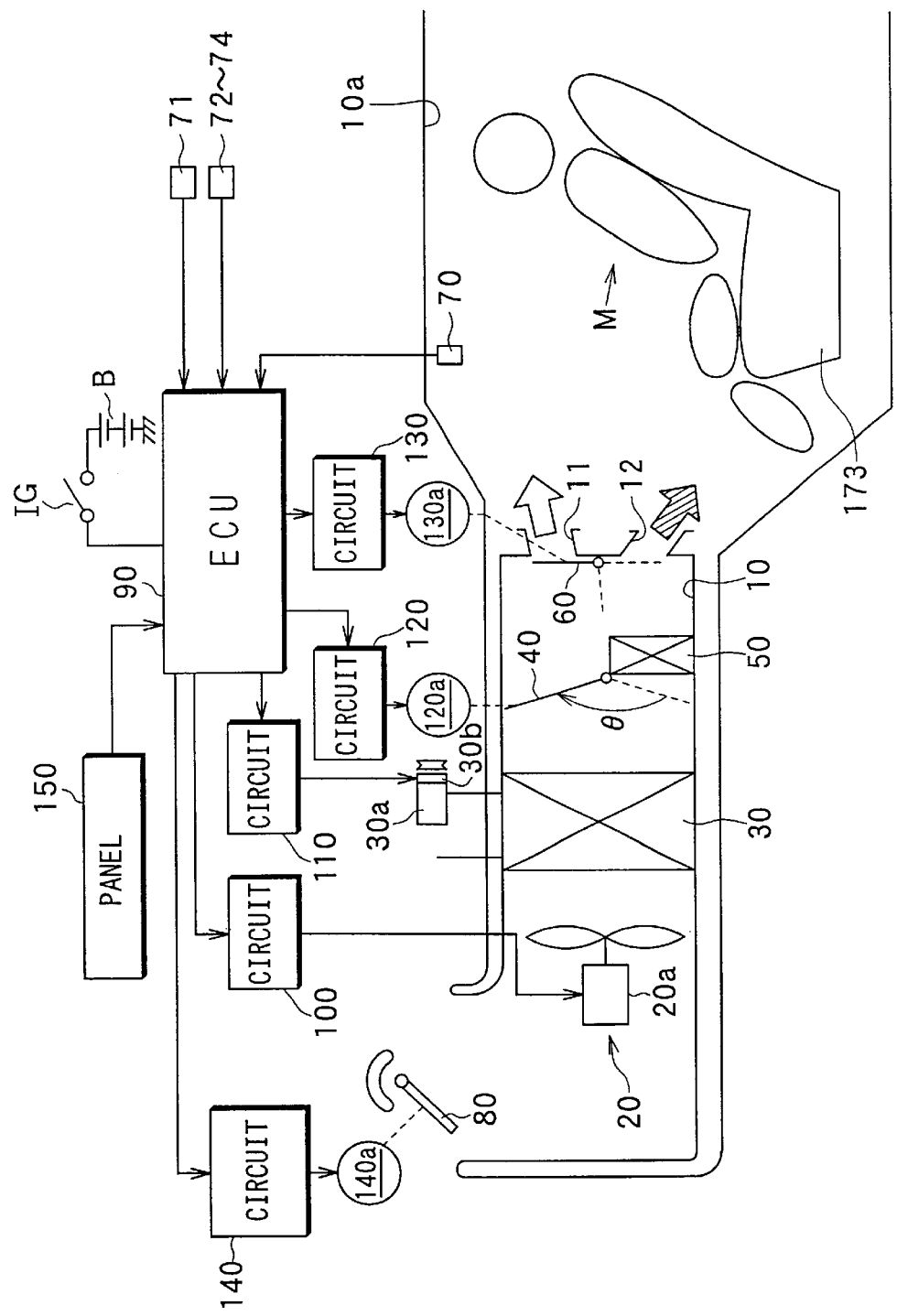
FIG. 1 is a schematic diagram of a vehicle air conditioning system with a non-contact temperature sensor according to a first preferred embodiment of the present invention.

FIG. 1 illustrates an air conditioning system for a vehicle according to the first embodiment of the present invention. The air conditioning system is provided with an air duct 10 forming an air passage, the air duct 10 has a face blow outlet 11 and a foot blow outlet 12 opened inside a passenger compartment 10a. Accordingly, cool air is mainly blown toward the upper half body of the passenger from the face blow outlet 11, and warm air is blown toward the feet area of the passenger from the foot blow outlet 12. Inside the air duct 10, from an air introducing port side to respective blow outlets 11 and 12, an inside/outside air switching door 80, a blower 20, an evaporator (heat exchanger for cooling) 30, an air mix damper 40, a heater core (heat exchanger for heating) 50 and a blow outlet switching damper 60 are arranged in order.

Based on an operating position of the inside/outside air switching door 80, whether outside air is introduced into the air duct 10 or inside air is introduced in the air duct 10 is determined. The blower 20 introduces air from the introducing port into the air duct 10 in response to a drive of a blower motor 20a, and air is blown into the passenger compartment 10a from the face blow outlet 11 or the foot blow outlet 12 via the evaporator 30, the air mix damper 40, the heater core 50, and the blow outlet switching damper 60. The evaporator 30 cools air blown from the blower 20 using a refrigerant in a refrigerating cycle under an operation of a compressor 30a. The compressor 30a is driven by an engine of a corresponding vehicle under a selective engagement of the electromagnetic clutch 30b attached to the compressor 30a.

The air mix damper 40 constructs a temperature adjusting means for adjusting a temperature of air. That is, in response to an actual opening degree $\theta$ (refer to FIG. 1), an amount of cool air to be flowed into the heater 50 from the evaporator 30 and an amount of cool air bypassing the heater 50 are adjusted. When the air mix damper 40 is existed at a position illustrated by a broken line (or solid line) in FIG. 1, the actual opening degree $\theta$ of the air mix damper 40 becomes the minimum opening degree $\theta$min (or the maximum opening degree $\theta$max). The heater core 50 receives engine cooling water and heats cool air flowing from the evaporator 30.

When the blow outlet switching damper 60 is at a switching position illustrated by a solid line in FIG. 1 (hereinafter, referred to as first switching position), warm air from the heater core 50 and cool air bypassing the heater core 50 are mixed and the mixed air is blown from the foot blow outlet 12 into the passenger compartment. When the blow outlet switching damper 60 is switched to a position (hereinafter, referred to as second switching position) closing the foot blow outlet 12, the mixed air having a predetermined temperature is blown from the face blow outlet 11 into the passenger compartment. Further, when the blow outlet switching damper 60 is switched to a position (hereinafter, referred to as third switching position) opening both the blow outlets 11 and 12, the mixed air is blown from both the blow outlets 11 and 12 into the passenger compartment.

In a forward of a driver (passenger) M, a non-contact temperature sensor 70 for detecting a surface temperature in a predetermined area inside the passenger compartment 10a in a non-contact manner is installed in a ceiling section around a rear-view mirror (room mirror). The non-contact temperature sensor 70 is an infrared sensor which detects the surface temperature of a body, and in the rearward periphery thereof of the driver M, and an electric signal (surface temperature signal) corresponding to an amount of an infrared ray radiated from a temperature detecting subject is generated. More specifically, the non-contact temperature sensor 70 is an infrared sensor using a thermo-pile type temperature detecting element for generating electromotive force proportioned to the amount of the infrared ray corresponding to the amount of infrared ray radiated from the temperature detecting subject.

Figure 2:
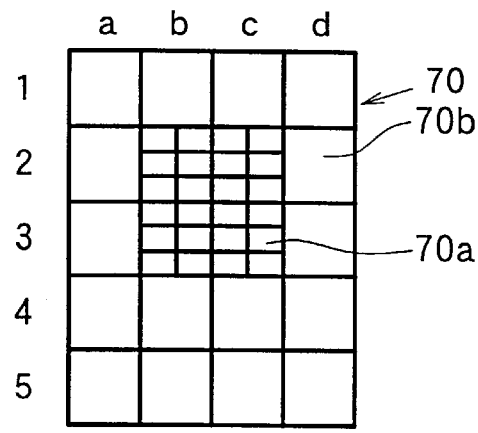
FIG. 2 is a schematic diagram showing a structure of the non-contact temperature sensor according to the first embodiment.

As illustrated in FIG. 2, the non-contact temperature sensor 70 has a plurality of (in this embodiment, 24 pieces) narrow range temperature detecting elements (first temperature detecting element) 70a in which an area of a temperature detecting region per one piece of respective elements is narrow, and a plurality of (in this embodiment, 16 pieces) wide range temperature detecting elements (second temperature detecting element) 70b in which the area of the temperature detecting region per one piece of respective elements is wide. The non-contact temperature sensor 70 constructed of the narrow range and the wide range temperature detecting elements 70a and 70b are arranged in a shape of a matrix of 5 lines and 4 columns (rows).

In more details, for every one matrix element, excluding the b column and the c column of the second line and the b column and the c column of the third line, one piece of the wide range temperature detecting element 70b is arranged. For each matrix element of the b column and the c column of the second line and the b column and the c column of the third line, 6 pieces of narrow range temperature detecting elements 70a are arranged. When the area of the temperature detecting region per one piece of the narrow range temperature detecting element 70a is set as A1, and when the area of the temperature detecting region per one piece of the wide range temperature detecting element 70b is set as A2, a ratio (A1/A2) of the area A1 to the area A2 is ⅙.

Figure 3:
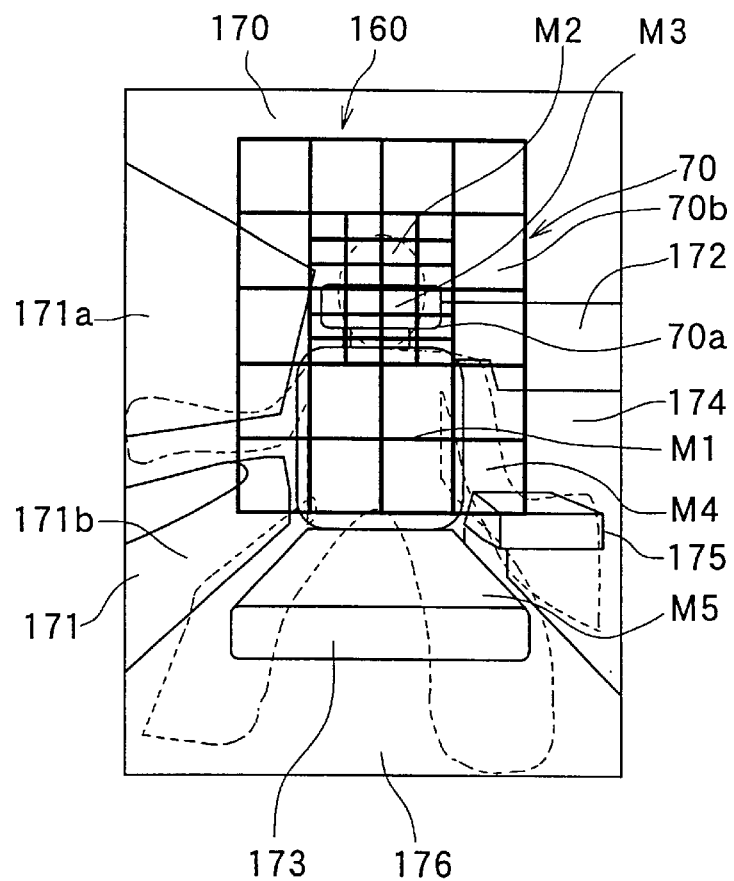
FIG. 3 is a view showing a detecting region of the non-contact temperature sensor according to the first embodiment.

FIG. 3 illustrates a detecting region 160 of a surface temperature by means of the non-contact temperature sensor 70. The detecting region 160 includes the upper half body (wearing section) M1 of the driver M, a head section M2, a face section M3, an arm section M4, a lower half body M5, a part of an inner wall surface of a ceiling 170, a part of an inner wall surface of a side glass 171a of a front seat door 171, and a part of an inner wall surface of rear glass 172. Here, as the surface temperature detecting region of the non-contact temperature sensor 70, a front seat 173, a rear seat 174, a console 175, a floor 176, and a side wall 171b may be included.

In the first embodiment, the temperature in the vicinity (narrow range) of the head section M2 and the face section M3 of the driver M is detected by the narrow range temperature detecting element 70a, and the temperature in a periphery (wide range) of the head section M2 and the face section M3 of the driver M is detected by the wide range temperature detecting element 70b. As described above, by detecting the temperature in the vicinity of the head section M2 and the face section M3 using the narrow range temperature detecting element 70a in which the area of the temperature detecting region per one piece of respective elements is narrow, a temperature distribution in the vicinity of the head section M2 and the face section M3 can be measured in detail, and the temperature of a specific portion (for example, cheeks section) within a narrow range can be detected accurately.

In order to detect the temperature of the cheeks section accurately, the area (A1) of the temperature detecting region per one piece of the narrow range temperature detecting element 70a is preferably to make a degree of ¼ of a single side cheek area. On the other hand, the area (A2) of the temperature detecting region per one piece of the wide range temperature detecting element 70b can be appropriately determined depending on conditions. However, a ratio (A1/A2) of the area A1 to the area A2 is preferable to be 0.8 or below. Further, a more preferable range of the ratio (A1/A2) of areas A1, A2 is 0.1–0.3.

Here, in the detection region 160, since an inner wall surface (surface of interior side of passenger compartment) of the ceiling (portion corresponding to inside air temperature) 170 is not exposed to solar radiation, further, an influence of heat of an outer wall surface of the ceiling 170 is hardly received to the inner wall surface of the ceiling 170 by a thermal insulation material. Accordingly, the surface temperature of the inner wall surface of the ceiling 170 is changed substantially corresponding to an inside air temperature of the passenger compartment 10a. On the other hand, the inner wall surface (surface of interior side of passenger compartment) of a glass section (portion corresponding to outside air temperature) of a side glass 171a or a rear glass 172, receives the influence of the heat (i.e., heat caused by outside air temperature or solar radiation) of a glass outer wall surface (surface of exterior side of passenger compartment) and liable to change the surface temperature. The surface temperature of upper half body (portion corresponding to solar radiation) M1 of the passenger M is readily changed in accordance with an existence/non-existence of the solar radiation.

The temperatures of the inner wall surfaces such as a side glass 171a, the rear glass 172, and a side wall 171b of the front seat door 171 are utilized for estimation of infiltration heat (heat load) due to a difference of the inside air temperature and the surface temperature inside the passenger compartment. The temperature of a portion (for example, wearing section of the driver M) which actually changes the temperature thereof by receiving the influence of the solar radiation, is utilized for the estimation of the infiltration heat (thermal load) due to entrance of the solar radiation inside the passenger compartment. Further, because the surface temperature of the face section M3 (in particular, cheek section) of the driver M has a close relationship with a thermal sense of the passenger, the surface temperature of the face section M3 is utilized for performing a control matched with the thermal sense of the passenger.

In FIG. 1, the air conditioning system is provided with an inside air temperature sensor 71, opening degree sensors 72–74, and various sensor not illustrated. Here, the inside air temperature sensor 71 generates an inside air temperature signal by detecting an air temperature inside the passenger compartment 10a, the opening degree sensors 72–74 generate the opening degree signals by detecting real degrees of openings of an air mix damper 40, a blow outlet switching damper 60 and inside/outside air switching door 80. An operation panel 150 generates various set signals (set temperature signal, mode selection signal, auto/manual selection signal, and the like) serving as an input from the passenger to the air conditioning system. Here, the operation panel 150 includes a temperature setting unit for setting a set temperature inside the passenger compartment, desired by the passenger.

Figure 4:
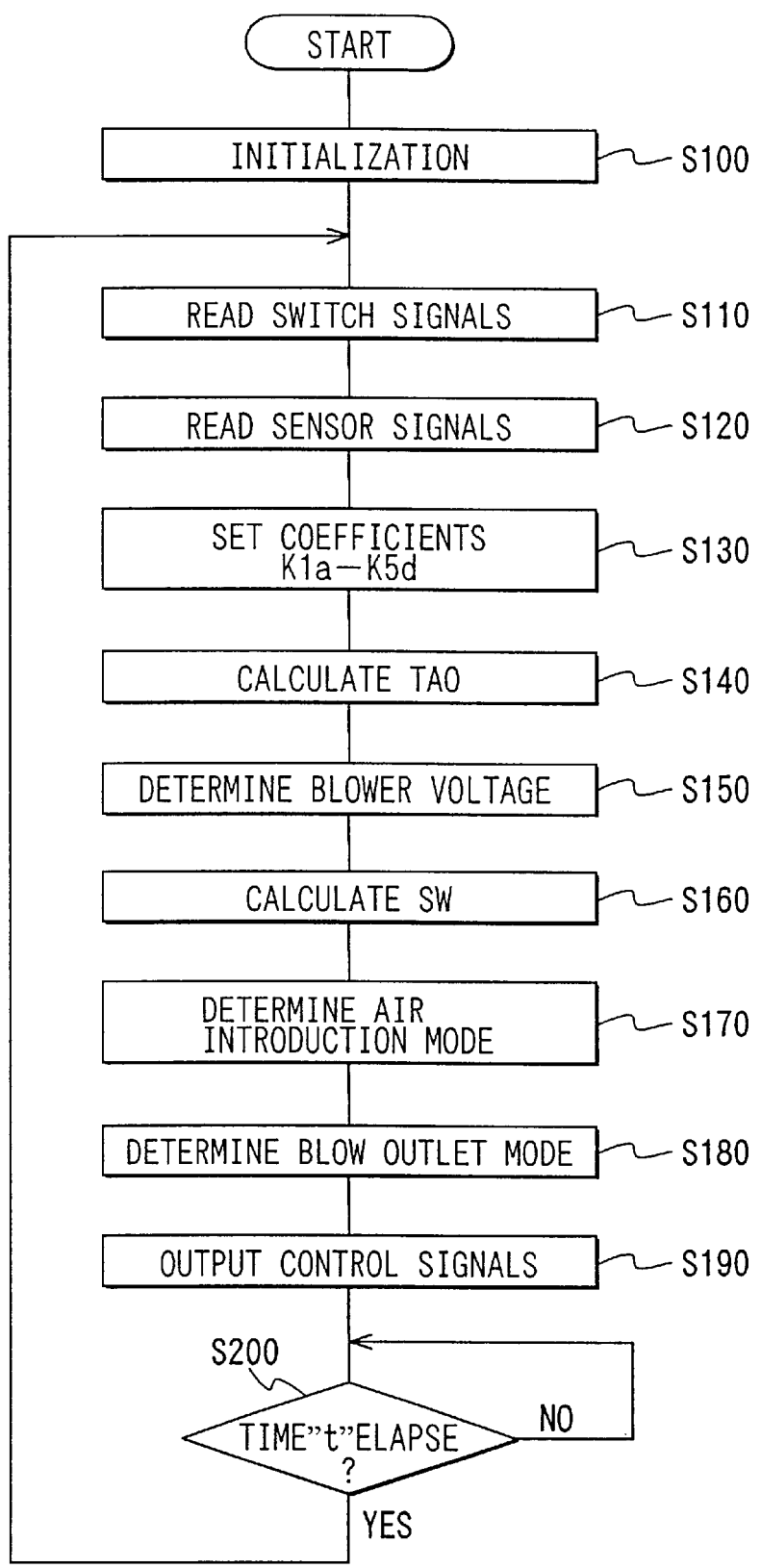
FIG. 4 is a flow diagram showing an air-conditioning control process of an ECU according to the first embodiment.

An ECU 90 performs a program according to a flow diagram illustrated in FIG. 4. During execution of this program of FIG. 4, arithmetic processing required for controlling respective drive circuits 100, 110, 120, 130 and 140 respectively connected to a blower motor 20a, the electromagnetic clutch 30b, and three motors 120a, 130a and 140a is performed. The ECU 90 becomes in an operating state by being supplied power from a battery B through an ignition switch IG of the vehicle, and the execution of the program of FIG. 4 is started. The program described above is previously stored in a ROM of the ECU 90.

The drive circuit 100 controls a rotary speed of the blower motor 20a by the ECU 90. The drive circuit 110 is controlled by the ECU 90 and makes selectively engage the electromagnetic clutch 30b. The motor 120a is rotated and is driven by the drive circuit 120 in response to a control of the ECU 90. This means that the motor 120a adjusts a real opening degree of the air mix damper 40 via a reduction mechanism (not illustrated). The motor 130a is rotated and is driven by the drive circuit 130 in response to the control of the ECU 90. This means that the motor 130a selectively switches the blow outlet switching damper 60 at first to third switching positions via a reduction mechanism (not illustrated). The motor 140a is rotated and is driven by the drive circuit 140 in response to the control of the ECU 90. This means that the motor 140a adjusts the real opening degree of the inside/outside air switching door 80 via the reduction mechanism (not illustrated).

The electromagnetic clutch 30b is engaged or disengaged with a driving source by the drive circuit 110 in response to an output signal from the ECU 90. In the engagement state of the electromagnetic clutch 30b, the compressor 30a is driven by the vehicle engine and supplies a compression refrigerant to the evaporator 30. Therefore, air introduced by the blower 20 into the evaporator 30 is cooled. A part of air from the evaporator 30 flows into the heater core 50 with the amount in response to the real opening degree θ of the air mix damper 40 to be heated, while the residual air bypasses the heater core 50 to be mixed with heated air from the heater core 50 at a downstream air side of the heater core 50.

In this embodiment, by means of closing of the ignition switch IG, the engine of the vehicle is started and the ECU 90 is set to an operation state. When an operating signal is generated from the operation panel 150, the ECU 90 start execution of the program of the ECU 90 in accordance with the flow diagram illustrated in FIG. 4. As shown in FIG. 4, firstly at step S100, a process of initialization for initial setting a counter or a flag utilized for an execution of the processing hereinafter is carried out, and the program is shifted to step S110. At steps S110 and S120, switch signals from operation switches, and various sensor signals (e.g., inside air temperature, engine cooling water temperature, evaporator outlet temperature, vehicle speed, humidity, and the like) from sensors including the non-contact temperature sensor 70 are read. Among these sensor signals, the signal of the non-contact temperature sensor 70 is input to step S130, and coefficients K1a–K5d are set for each of the temperature detecting elements 70a, 70b.

Figure 5:
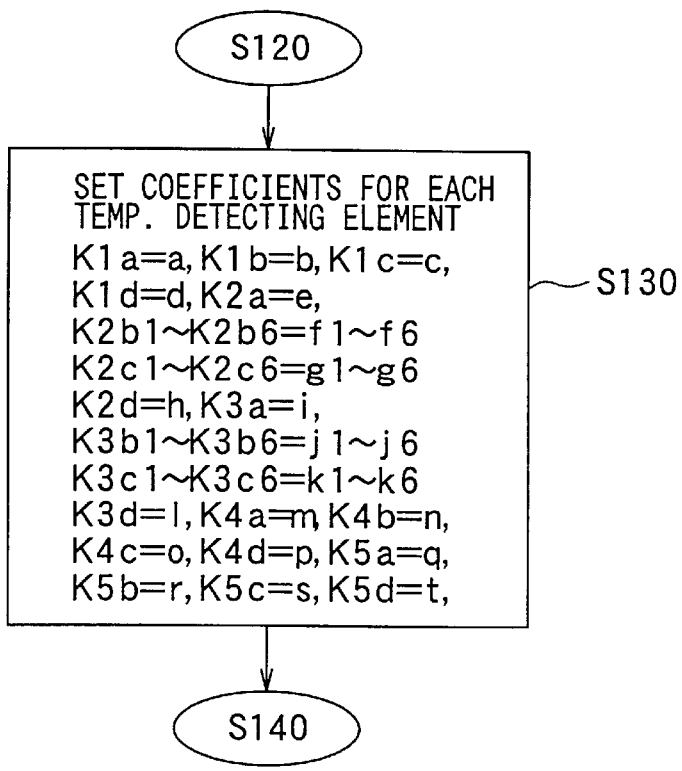
FIG. 5 is a flow diagram showing a control of step S130 in FIG. 4.

At step S130, as illustrated in FIG. 5, coefficients K1a–K5d in consideration of a influence degree (weight) to a system is set for each of temperature detecting elements 70a and 70b. That is, relative to an output value of a surface temperature signal of detecting region in which a degree of influence to cooling heat load or the thermal sense is large, a coefficient is made larger. Here, symbol K1a designates a coefficient for a first line and "a" column, symbol K1b designates a coefficient for the first line and "b" column, and symbol K5d designates a coefficient for a fifth line and "d" column. Among these coefficients, symbols K2b1–K2b6 designate the coefficients of six pieces of the narrow range temperature detecting elements 70a of the second line and the "b" column, symbols K3c1–K3c6 designate the coefficients of six pieces of the narrow range temperature detecting elements 70a of the third line and the "c" column. Symbols a–t designate constants.

Figure 6:
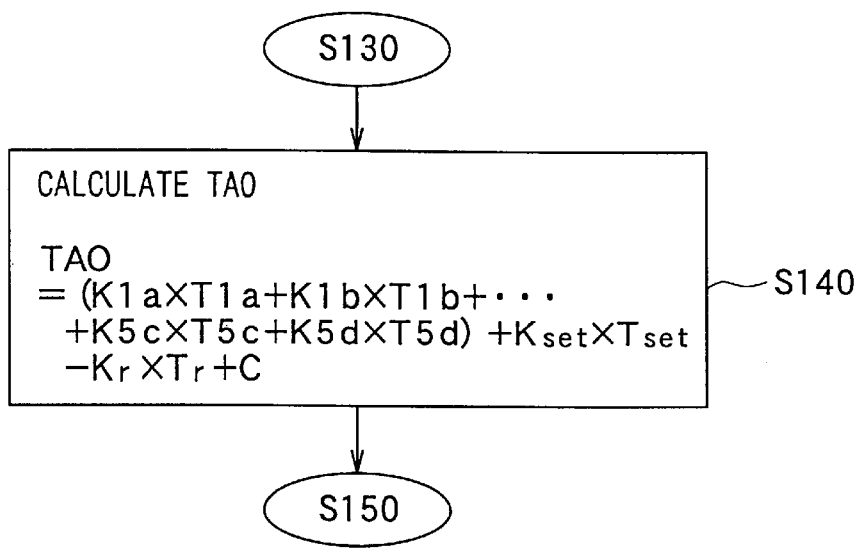
FIG. 6 is a flow diagram showing a control of step S140 in FIG. 4.

At step S140, based on surface temperature signal output values T1a–T5d read at step S120, a set temperature Tset and an inside air temperature Tr, a target blow-out air temperature (target air temperature) TAO is computed by utilizing a formula illustrated in FIG. 6. In the target air temperature TAO calculating formula in FIG. 6, symbol T1a designates a surface temperature signal output value of the first line and the "a" column, symbol T1b designates a surface temperature signal output value of the first line and the "b" column, . . . symbol T5d designates a surface temperature signal output value of the fifth line and the "d" column. Symbols Kset and Kr designate coefficients, symbol C designates a constant.

Figure 7:
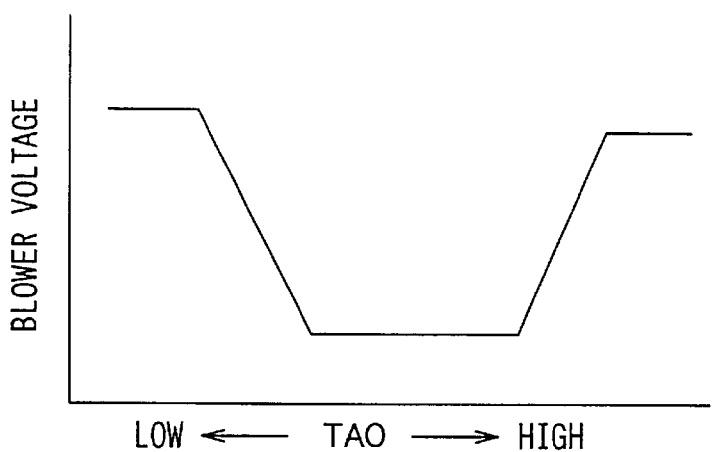
FIG. 7 is a characteristic view showing a relationship between a blower voltage and a target air temperature TAO, according to the first embodiment.
Figure 8:
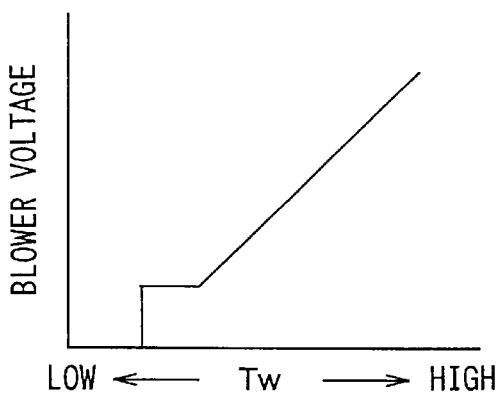
FIG. 8 is a characteristic view showing a relationship between a blower voltage and an engine-cooling water temperature Tw, according to the first embodiment.

At step S150, a first blower voltage applied to the blower motor 20a corresponding to a target air volume is calculated from the characteristic view in FIG. 7 based on the target air temperature TAO described above, and a second blower voltage is calculated from the characteristic view in FIG. 8. Further, at step S150, between both first and second blower voltages, the voltage having a lower value is determined as a blower voltage.

At step S160, based on the target air temperature TAO, an engine-cooling water temperature Tw and an evaporator outlet temperature Te, a target opening degree SW of air mix damper 40 is calculated by utilizing a numerical expression 1 described below. Here, symbol α in the numerical expression 1 designates a constant.

[Numerical Expression 1]

$$SW=[\{TAO-(Te+\alpha)\}/\{Tw-(Te+\alpha)\}]\times 100\ (\%)$$

Figure 9:
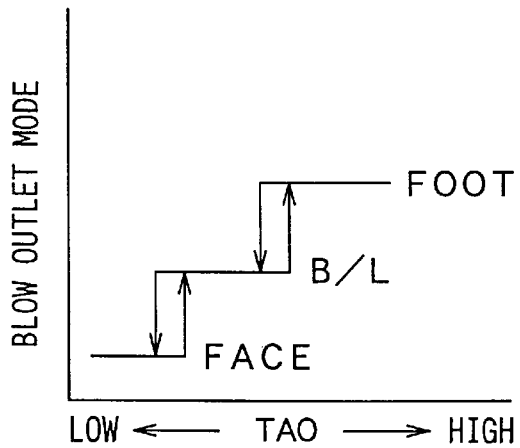
FIG. 9 is a characteristic view showing a relationship between a blow outlet mode and the target air temperature TAO, according to the first embodiment.

At step S170, based on the target air temperature TAO, an air introduction mode is determined between an inside air introduction mode and an outside air introduction mode. Next, at step S180, based on the target blow-out air temperature TAO, in accordance with the characteristic view in FIG. 9, a blow outlet mode is determined among a face mode (FACE), a bi-level mode (B/L) and a foot mode (FOOT). At step S190, according to computation results by steps S150–S180, a blower voltage control signal, an opening degree control signal for an air mix damper, an inside/outside air introducing mode control signal, and a blow outlet mode control signal are respectively output to the driving circuits 100, 120, 130 and 140. The program is advanced to step S200, whether a cycle time t seconds has elapsed or not is determined. When the determination of step S200 is of negative, the program stands by at step S200. After the cycle time t seconds passes, the program returns to step S110.

In this first embodiment, because the temperature distribution in the vicinity (narrow range) of the head section M2 and the face section M3 is measured in details by the narrow range temperature detecting element 70a whose area of the temperature detection region per one piece of respective elements is narrow, the temperature in the specific portion (for example, cheek section) within the narrow range can be accurately detected. Accordingly, a suitable control matched with the thermal sense of the passenger can be performed based on the cheek section skin temperature having close relationship with the thermal sense, and comfortableness in riding can be improved.

The temperature in a region (in the vicinity of head section M2 and face section M3) required of detailed temperature distribution information is detected by means of the narrow range temperature detecting element 70a whose area of the temperature detection region is narrow, so that the number of temperature detection elements is increased in the region like this. However, the temperature in a region (on periphery of head section M2 and face section M3) not required for the detailed temperature distribution information is detected by means of the wide range temperature detection element 70b whose area of the temperature detecting region per one piece of respective elements is wide. Accordingly, the number of temperature detecting elements in the non-contact temperature sensor 70 can be lessened.

Thus, in the first embodiment, while the temperature in the specific portion such as the cheek section is detected accurately, a reduction in a circuit scale accompanied by a reduction in the number of temperature detecting elements, and a decrease in processing time of the temperature signals can be implemented.

In the first embodiment described above, as the non-contact temperature sensor, the infrared sensor utilizing thermo-pile type detection element is used as an example, an infrared sensor utilizing a bolometer type detecting element constructed of a resistance having large temperature coefficient, the other form of an infrared sensor can be utilized. Not necessary an infrared sensor, the other form of non-contact temperature sensor for detecting the surface temperature of the temperature detecting subject in a non-contact state can be utilized.

In the first embodiment, the inside air temperature sensor 71 is utilized, however, the inside air temperature sensor 71 can be abandoned by performing an air conditioning control by estimating an inside air temperature based on a signal from the non-contact temperature sensor 70. An air conditioning control may be conducted in response to an amount of solar radiation, an outside air temperature, or the like, by utilizing a solar radiation sensor, an outside air temperature sensor, and the like.

(Second Embodiment)

A second embodiment illustrated in FIG. 10 and FIG. 11 will be explained. In the above-described first embodiment, the non-contact temperature sensor 70 in which two kinds of temperature detecting elements 70a and 70b different in the area of the temperature detecting region per one piece of an element are arranged in the shape of the matrix is utilized. However, in the second embodiment, a wide range non-contact temperature sensor 200 for detecting a surface temperature in a non-contact state of entire area (wide range) of a prescribed region inside the passenger compartment 10a, and a narrow range non-contact temperature sensor 300 for detecting a temperature in a region (narrow range) of a part of a predetermined region are utilized.

Figure 11:
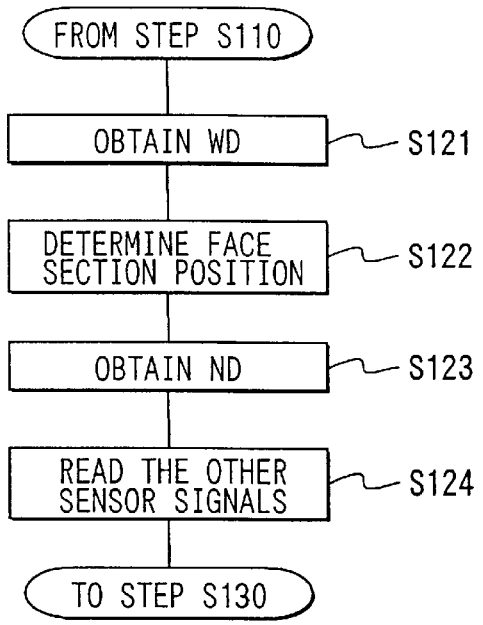
FIG. 11 is a flow diagram showing a main control process according to the second embodiment.

Accompanied by utilizing both the non-contact temperature sensors 200, 300, the preceding control at step S120 (refer to FIG. 4) of the first embodiment is changed as illustrated in FIG. 11. Except these changed points, the other control steps of the second embodiment are the same as the first embodiment.

Figure 10:
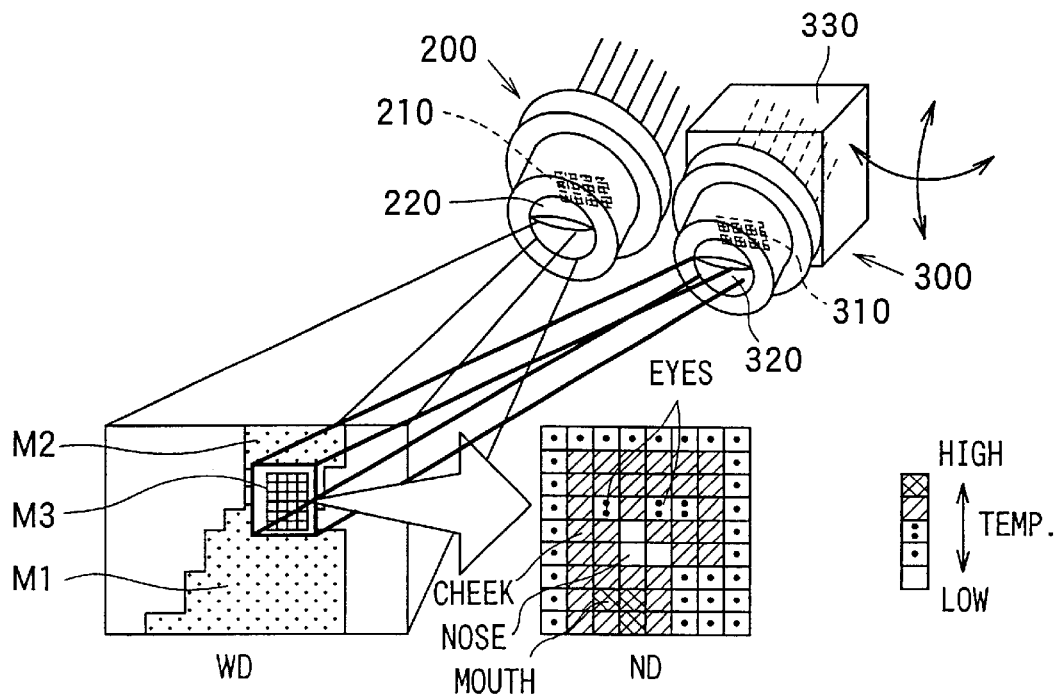
FIG. 10 is a schematic perspective view showing a structure of a non-contact temperature sensor according to a second preferred embodiment.

In the wide range non-contact temperature sensor 200 shown in FIG. 10, a number of wide range temperature detecting elements (second temperature detecting element) 210 are arranged in a shape of a matrix, infrared rays radiated from a temperature detecting subject are condensed by a lens 220 and a thermal image of a wide range is imaged on the wide range temperature detecting elements 210. Accordingly, a wide range temperature distribution information (WD) indicated in FIG. 10 can be obtained.

In the narrow range non-contact temperature sensor 300 described above, a number of temperature detecting elements (first detecting element) 310 are arranged in a shape of a matrix, infrared rays radiated from a temperature detecting subject is condensed on the narrow range temperature detecting elements 310 by a lens 320, and a thermal image of a narrow range is imaged on the narrow range temperature detecting elements 310. Accordingly, a narrow range temperature distribution information (ND) indicated in FIG. 10 can be obtained. A drive device (temperature detecting portion adjusting means) 330, for adjusting a temperature detecting direction of the narrow range temperature detecting elements 310, is disposed.

Both the non-contact temperature sensors 200 and 300 are disposed in a forward (for example, instrument panel) of the passenger M. Here, an area (A1) of a temperature detecting region per one piece of respective elements of the narrow range non-contact temperature sensor 300, is set smaller than an area (A2) of a temperature detecting region per one piece of respective elements of the wide range non-contact temperature sensor 200, so that a ratio of these areas (A1/A2) is made approximately as ⅓.

FIG. 11 illustrate read-in steps for reading sensor signals. Firstly, at step S121, the temperature of the entire area of the detection region 160 in FIG. 3 is detected by the wide range non-contact temperature sensor 200, and wide range temperature distribution information (WD) can be obtained.

At step S122, a position of the face section M3 is determined based on the wide range temperature distribution information (WD). That is, except a case where the inside air temperature is extremely high such as cool down time in summer season, because the vicinity of the face section M3 becomes the highest temperature in the wide range temperature distribution, the highest temperature section is determined as the position of the face section M3.

At step S123, the detection direction of the narrow range non-contact temperature sensor 300 is adjusted by the drive device 330 so that the narrow range non-contact temperature sensor 300 faces toward the position of the face section M3 obtained at step S122. After this adjustment of the detection direction of the narrow range non-contact temperature sensor 300, the temperature distribution in the vicinity of the face section M3 is measured in detail by the narrow range non-contact temperature sensor 300, and a narrow range temperature distribution information (ND) in the vicinity of the face section M3 is obtained.

Here, as will be cleared from the narrow range temperature distribution information (ND) illustrated in FIG. 10, from a difference between the temperature of the eyes and the nose and the skin temperature of the face section, the position of the eyes and the nose can be specified. Further, a position of the cheek section can be specified from the position of the eyes and the nose, and the temperature of the cheek section can be detected.

Next, at step S124, signals of the other sensors except both of the non-contact temperature sensor 200 and 300 are read in. For example, temperature measurement by means of both of the non-contact temperature sensors 200 and 300 is conducted every 4 seconds.

In the second embodiment, the temperature in a specific portion (for example, cheek section) of the narrow range can be accurately detected by the narrow range temperature detecting elements 310 whose area of the temperature detecting region per one piece of respective elements is narrow. Since the temperature in a region not requiring the temperature distribution information in detail is detected by the wide range temperature detecting elements 210 whose area of a temperature detecting region per one piece of respective elements is wide, the number of temperature detecting element can be lessened. Accordingly, a reduction in a circuit scale due to a reduction in the number of temperature detecting elements, and a decrease in process time of the temperature signals can be implemented.

In spite of a physique or a seating attitude of the passenger M, the temperature distribution information in the vicinity of the face section M3 can be positively obtained by determining the position of the face section M3 from the wide range temperature distribution information, and by adjusting the detection direction of the narrow range non-contact temperature sensor 300.

(Third Embodiment)

A third embodiment illustrated in FIG. 12 and FIG. 13 will be explained. In the above-described second embodiment, in order to detect the temperature in a wide range and the temperature in a narrow range, two non-contact temperature sensors 200 and 300 are utilized. However, in the third embodiment, one non-contact temperature sensor 400 is utilized to be switched between a state for detecting the temperature in a wide range, and a state for detecting the temperature in a narrow range. The other constructions of the third embodiment are similar to those of the above-described second embodiment.

Figure 12:
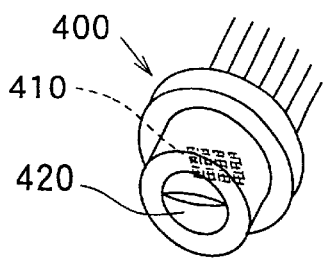
FIG. 12 is a perspective view showing a non-contact temperature sensor according to a third preferred embodiment of the present invention.
Figure 13:
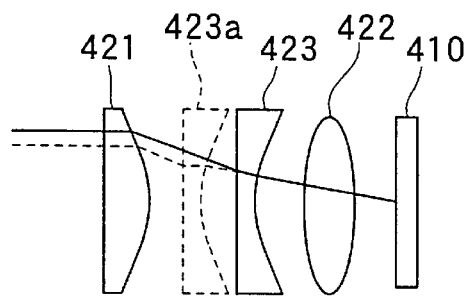
FIG. 13 is a side view of a main part of the non-contact temperature sensor in FIG. 12.

In FIG. 12, the non-contact temperature sensor 400 has a number of temperature detecting elements 410 arranged in a shape of a matrix, and a zoom lens 420 for passing through the infrared rays. As illustrated in FIG. 13, the zoom lens 420 includes two pieces of fixed lenses 421 and 422, and a movable lens 423 changeable its relative position with the temperature detecting elements 410. An area of the temperature detecting region of the non-contact temperature sensor 400 can be changed by movement of the movable lens 423.

When the movable lens 423 is moved to a position of a solid line, the movable lens 423 is set in a state of wide range (first state) for detecting the temperature in the entire area (wide range) of the detecting region 160 in FIG. 3, and the temperature distribution information of this region can be obtained. Next, while moving the movable lens 423 to the position of broken line 423a, the movable lens 423 is set in a narrow range state (second state) for detecting the temperature in the vicinity of the face section M3 (narrow range), and the temperature distribution information in the vicinity of the face section M3 can be obtained.

In this embodiment, an area of the temperature detecting region per one piece of the respective elements of the non-contact temperature sensor 400 becomes smaller for the narrow range state than the wide range state. Therefore, when the non-contact temperature sensor 400 is set to the narrow range state, the temperature distribution information in detail in the vicinity of the face section M3 can be obtained.

Because the temperature in a wide range and the temperature in a narrow range are detected by the one non-contact temperature sensor 400, the number of the temperature detecting elements can be decreased. Accordingly, a reduction in the circuit scale due to a reduction in the number of temperature detecting elements, and a decrease in process time of the temperature signals can be obtained.

The temperature detection direction of the non-contact temperature sensor 70 in the first embodiment and the non-contact temperature sensor 400 in the third embodiment may be adjusted by temperature detection portion adjusting means such as, for example, the drive device 330 in the second embodiment.

(Fourth Embodiment)

A fourth embodiment illustrated in FIG. 14 and FIG. 15 will be explained. In the fourth embodiment, a non-contact temperature sensor 500 is described in detail. In the non-contact temperature sensor 500, a number of wide range temperature detecting elements (second temperature detecting element) 510 arranged in a shape of a matrix are disposed opposite to a lens 530, a number of narrow range temperature detecting elements (first detecting element) 520 arranged in a shape of a matrix, are disposed at a position cross at right angle with a line connecting the wide range temperature detecting elements 510 and the lens 530, further, a mirror (temperature detecting portion adjusting means) 540 freely rotatable around a shaft 541 as a fulcrum is arranged between the wide range temperature detecting elements 510 and the lens 530 as shown in FIG. 14.

An area of the temperature detecting region per one piece of respective elements of the narrow range temperature detecting elements 520 is set smaller than an area of the temperature detecting region per one piece of respective elements of the wide range temperature detecting elements 510. The wide range temperature detecting elements 510 detect the temperature in the entire area (wide range) of the detecting region 160 in FIG. 3. On the other hand, the narrow range temperature detecting elements 520 detect the temperature in the vicinity (narrow range) of the head section M2 and the face section M3 among the detection region 160 in FIG. 3.

Figure 14:
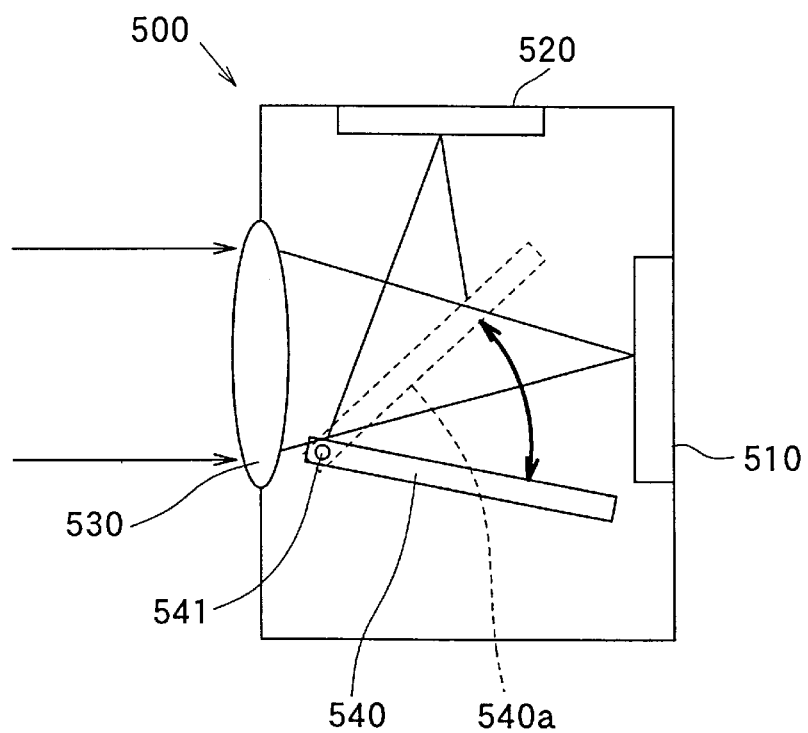
FIG. 14 is a schematic side view showing a non-contact temperature sensor according to a fourth preferred embodiment of the present invention.
Figure 15:
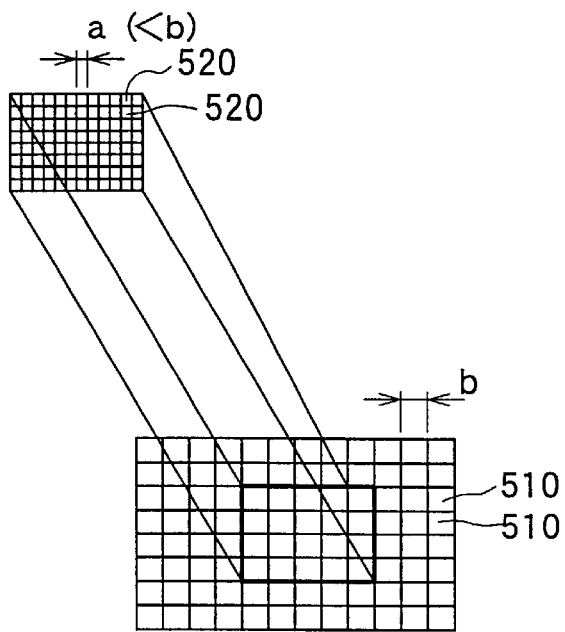
FIG. 15 is a view showing a main structure of the non-contact temperature sensor in FIG. 14.

In the fourth embodiment, by rotating the mirror 540 to the position of the solid line in FIG. 14, a thermal image in a wide range is imaged on the wide range temperature detecting elements 510, so that a wide range state (first state) for detecting the temperature in the wide range is set, and a wide range temperature distribution information can be obtained in the non-contact temperature sensor 400.

Next, when the mirror 540 is rotated to the position of the broken line 540a in FIG. 14, a narrow range state (second state) for detecting the temperature in a narrow range is set by imaging a thermal image of the narrow range on the narrow range temperature detecting elements 520, and the temperature distribution information in the narrow range can be obtained in the non-contact temperature sensor 500. Here, for setting the narrow range state in the non-contact temperature sensor 500, the position of the face section M3 is determined based on the wide range temperature distribution information, and the detection direction of the mirror 540 is adjusted so as to image the thermal image of the face section M3 on the narrow range temperature detecting elements 520. Accordingly, the mirror 540 serves as detecting temperature portion adjusting means for adjusting a temperature detecting direction of the narrow range temperature detecting elements 520.

In the fourth embodiment, similarly to the second embodiment, the temperature of a specified portion inside the narrow range can be detected accurately, a reduction in a circuit scale accompanied by a reduction in the number of temperature detecting elements or a decrease in process time of the temperature signals can be implemented.

In spite of a physique or a seating attitude of the passenger M, the temperature distribution information in the vicinity of the face section M3 can be positively obtained by obtaining the position of the face section M3 from the wide range temperature distribution information, and by adjusting the facing direction of the mirror 540.

(Fifth Embodiment)

Figure 16:
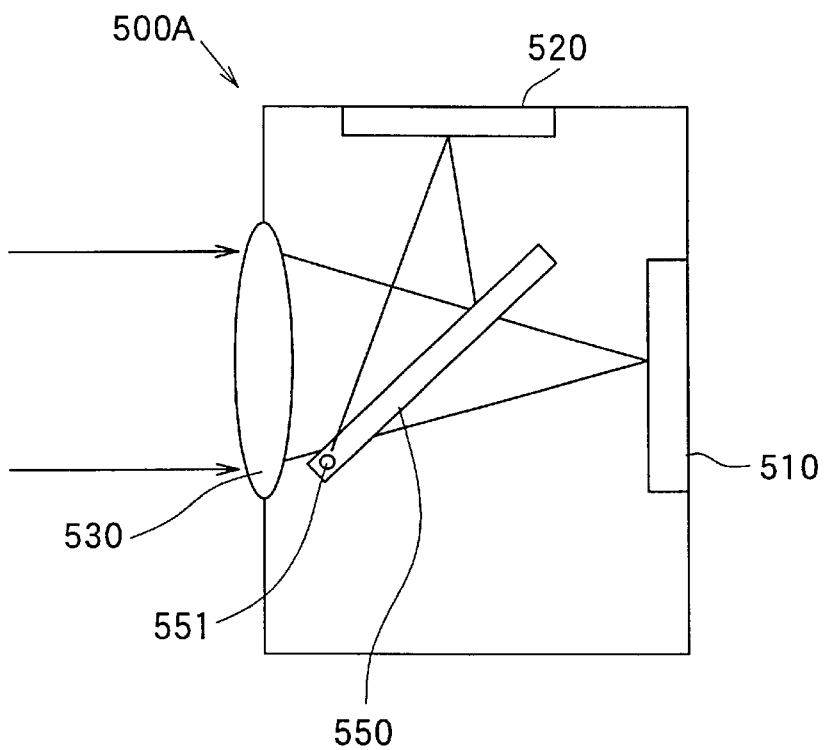
FIG. 16 is a schematic side view showing a non-contact temperature sensor according to a fifth preferred embodiment of the present invention.

A fifth embodiment illustrated in FIG. 16 will be explained. A non-contact temperature sensor 500A of this embodiment uses a half mirror (temperature detecting portion adjusting means) 550 freely rotatable around a shaft 551, in place of the mirror 540 of the non-contact temperature sensor 500 in the fourth embodiment. The other respects of the fifth embodiment are similar to those of the above-described fourth embodiment.

The half mirror 550 is disposed between the wide range temperature detecting elements 510 and the lens 530, so that a part of infrared rays after passing through the lens 530 is made to pass through the half mirror 550 toward a side of the wide range temperature detecting elements 510, and the residual part (the other part) of the infrared rays after passing through the lens 530 is made to be reflected by the half mirror 550 to a side of the narrow range temperature detecting elements 520.

Wide range temperature distribution information is obtained by imaging the thermal image in the wide range on the wide range temperature detecting elements 510, and the narrow range temperature distribution information is obtained by imaging the thermal image in the narrow range on the narrow range temperature detecting elements 520. Here, the position of the face section M3 is determined based on the wide range temperature distribution information, and the direction of the half mirror 550 is adjusted so as to image the thermal image of the face section M3 on the narrow range temperature detecting elements 520. Accordingly, the half mirror 550 serves as the temperature detecting portion adjusting means for adjusting the temperature detecting direction of the narrow range temperature detecting elements 520.

In the fifth embodiment, similarly to the second embodiment, the temperature of a specific portion in the narrow range can be detected precisely, a reduction in the circuit scale due to a reduction in the number of temperature detecting elements, and a decrease in process time of the temperature signals can be implemented.

In spite of a physique or a seating attitude of the passenger M, the temperature distribution information in the vicinity of the face section M3 can be accurately obtained by obtaining the position of the face section M3 from the wide range temperature distribution information, and by adjusting the direction of the half mirror 55.

(Sixth Embodiment)

Figure 17:
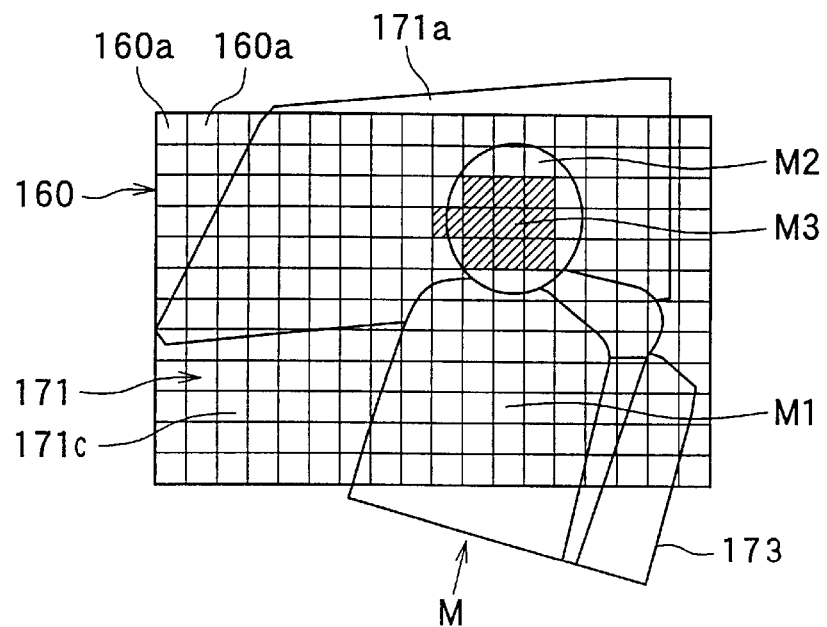
FIG. 17 is a view showing a temperature detecting region of a non-contact temperature sensor according to a sixth preferred embodiment of the present invention.

A non-contact temperature sensor 70 as an essential section of a sixth embodiment will be explained. In the sixth embodiment, parts similar to those of the above-described first embodiment are indicated with the same reference numbers, and detail explanation thereof is omitted. FIG. 17 illustrates a detection region 160 of a surface temperature by the non-contact temperature sensor 70. The detection region 160 includes the upper half body (wearing section) M1 of a driver (passenger) M, the head section M2, the face section M3, the side glass 171*a* and a door inner lining 171*c* of the front seat door 171, and the front seat 173.

Figure 18:
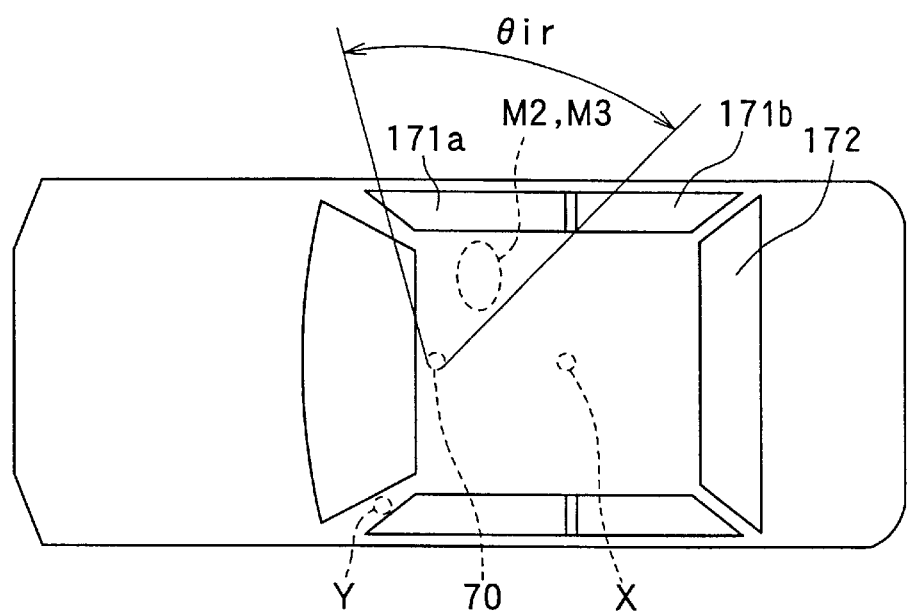
FIG. 18 is a plan view of a vehicle, showing an arrangement position of the non-contact temperature sensor, according to the sixth embodiment.

In the sixth embodiment, the non-contact temperature sensor 70 in which a detection region angle θir is set as illustrated in FIG. 18, is disposed in the neighborhood of a rear view mirror at a front side of the driver M in a ceiling section, as illustrated in FIG. 17. Further, the non-contact temperature sensor 70 is disposed so that the face section M3 and the side glass 171*a* are overlapped with each other when the temperature detecting region 160 is viewed from the position of the non-contact temperature sensor 70. That is, when the temperature detecting region 160 is viewed from the position of the non-contact temperature sensor 70, a background portion of the face section M3 is the side glass 171*a*.

In this embodiment, based on temperature distribution information of the detection region 160 detected by the non-contact temperature sensor 70, the position of the face section M3 is determined. That is, excluding a case where an inside air temperature is the highest such as cooling down time in the summer season, because the temperature distribution is the highest in the vicinity of the face section M3, the highest temperature section (in this embodiment, section drawn oblique lines in FIG. 17) is determined as the position of the face section M3. By the way, the temperature of the head section M2 is around 27° C., and that of the face section M3 is around 33° C.

An average temperature of the face section M3 is obtained by averaging the temperature in picture elements 160*a* corresponding to the position of the face section M3, and an air conditioning control is performed to be matched with a thermal sense by controlling a blow-out air volume (blower voltage) and a blow-out air temperature based on the face section average temperature.

Here, the temperature of the side glass 171*a* is in a temperature range between the inside air temperature and the outside the air temperature, in a state where the temperature in the passenger compartment 10*a* is substantially equal to a set temperature (around 25° C.) even in the summer season. Accordingly, the temperature of the side glass 171*a* is lower than the temperature (around 33° C.) of the face section M3. Accordingly, in the sixth embodiment, the position of the face section can be easily determined based on the temperature distribution information of the detecting region 160. Further, an area of side glass 171*a* is large as compared with the face section M3. Therefore, even if the driver M somewhat moves in a longitudinal or a lateral direction, when the temperature detecting region 160 is viewed from a position of the non-contact temperature sensor 70, the overlapping relationship of the face section M3 with the side glass 171*a* is maintained.

A part of the picture elements 161*a* corresponding to the position of the face section M3, includes the side glass 171*a* as the background portion of the face section M3. However, since glass is low in thermal conductivity and a thermal capacity thereof is large, an abrupt temperature change, due to conditioned air, outside air, solar radiation, or the like, hardly occurs. Fluctuation of the face section average temperature due to the temperature fluctuation of the face section background portion becomes small, the fluctuation of the blow-out air amount and the blow-out air temperature of conditioned air become small, a stable temperature environment is obtained.

In the sixth embodiment, the non-contact temperature sensor 70 may be disposed at the position X or the position Y in FIG. 18.

(Seventh Embodiment)

Figure 19:
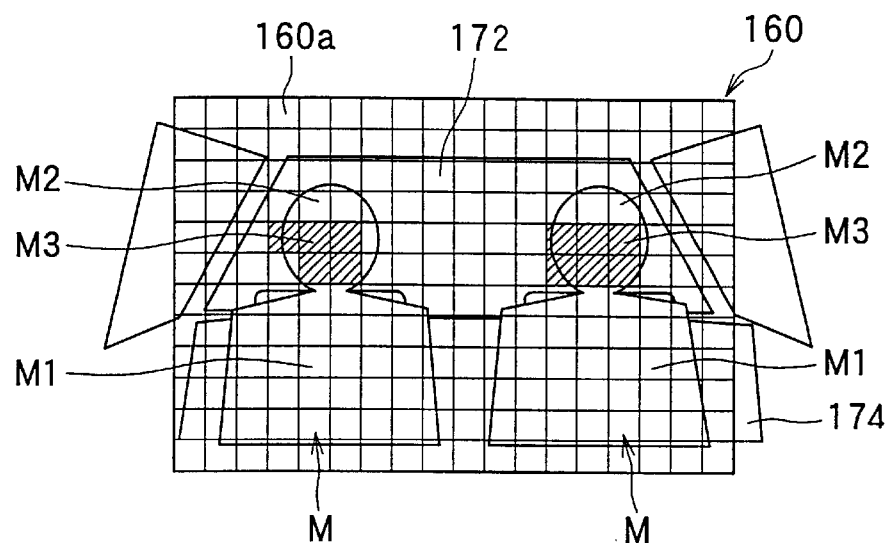
FIG. 19 is a view showing a temperature detecting region of a non-contact temperature sensor according to a seventh preferred embodiment of the present invention.

A seventh embodiment illustrated in FIG. 19 will be explained. In the sixth embodiment, a passenger entering in the temperature detecting region 160 of the non-contact temperature sensor 70 is just one person. However, in the seventh embodiment, a plurality of (in this embodiment, two persons) of passengers are entered in the temperature detecting region 160. In the mean time, contents of the seventh embodiment are similar to those of the sixth embodiment except in two respects that the set position of the non-contact temperature sensor 70 and the temperature detecting region 160 are changed.

In the seventh embodiment, the non-contact temperature sensor 70 is disposed in the neighborhood of a rear view mirror at the front side of a driver M in a ceiling section, or in an intermediate section between front seats and rear seats in the ceiling section and at a central section in a width direction of a vehicle (X position in FIG. 18) to detect seated positions of rear passengers or the mean face temperature in each seated position. As illustrated in FIG. 19, when the temperature detecting region 160 is viewed from the position (X position in FIG. 18) of the non-contact temperature sensor 70, the face sections M3 of the rear passengers M seated on the rear seats 174 and the rear glass 172 are overlapped with each other. That is, a background portion of the face section M3 is substantially on the rear glass 172.

In the seventh embodiment, based on temperature distribution information of the temperature detection region 160, existence/non-existence of the passenger on the rear seat, or a seating position of the passenger on the rear seat can be determined. For example, when equal to or more than four picture elements of the high-temperature picture element portions (in this embodiment, sections drawn oblique lines in FIG. 19) showing a value close to a face section temperature (around 33° C.) are existed adjacently, the high-temperature picture element portion is estimated to be the face section M3 of the passenger M, and it is determined that the passenger M is seated on that corresponding position.

Thereafter, a face section average temperature is calculated by averaging the surface temperatures of the picture element portions (section drawn oblique lines in FIG. 19) corresponding to a position of the face section M3, and a blow-out air volume or a blow-out temperature of conditioned air is controlled based on the face section average temperature, so that air conditioning control matched with the passenger's thermal sense can be performed.

In an air conditioning system controllable its blow-out air volume or the blow-out air temperature independently for every respective seats, conditioned air is blown only toward the seats where the passengers M are seated. Further, according to an average temperature of each face section of the passengers M on respective seats, the blow-out air volume and the blow-out air temperature are controlled independently for every respective seats.

According to this seventh embodiment, the background portion of the face section M3 is substantially on the rear glass 172. Accordingly, similarly to the sixth embodiment, based on the temperature distribution information of the detected region 160, the position of the face section M3 can be easily determined. Further, fluctuation in the blow-out air volume and the blow-out air temperature can be lessened, so that a stable temperature environment can be obtained in the passenger compartment 10a.

In addition to that, since the seating position and average temperature of the face section of the plural passengers are detected by one non-contact temperature sensor 70, the number of non-contact temperature sensors 70 can be made less than the number of passengers being the detecting objects.

(Eighth Embodiment)

Figure 20:
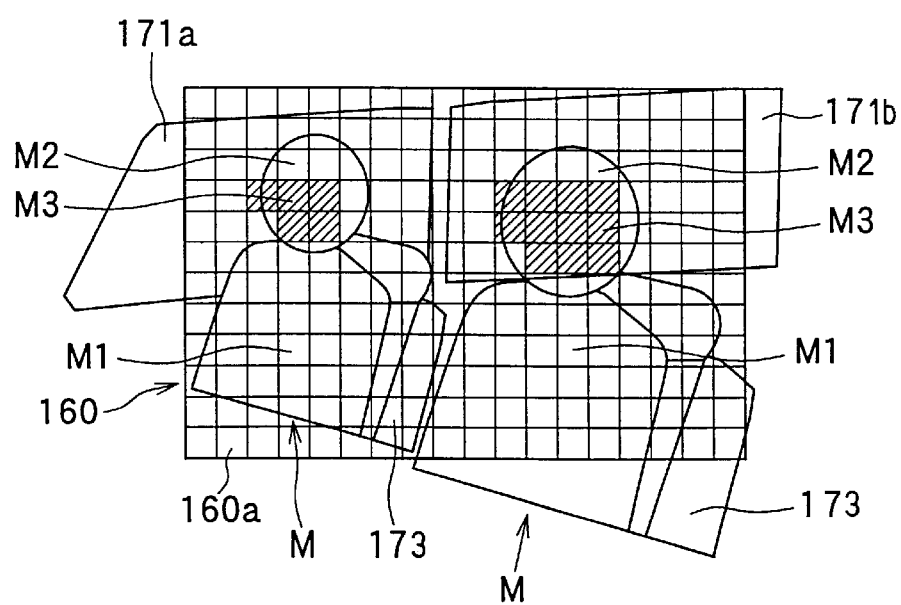
FIG. 20 is a view showing a temperature detecting region of a non-contact temperature sensor according to an eighth preferred embodiment of the present invention.

An eighth embodiment illustrated in FIGS. 20 and 21 will be explained. In the above-described seventh embodiment, the seating positions and each face section average temperature of plural passengers seated on rear seat 174 are detected by using one non-contact temperature sensor 70. However, in the eighth embodiment, whether a passenger of a driver seat or a passenger of a front assistant seat is seated or not and the face section average temperature for each passenger are detected by one non-contact temperature sensor 70. In the eighth embodiment, the installation position and the temperature detecting region 160 of the non-contact temperature sensor 70 are changed, and control processing in FIG. 21 is added as compared with the seventh embodiment.

In the eighth embodiment, the non-contact temperature sensor 70 is disposed in an above section of an A pillar of the front assistant seat side or substantially at a central section (at Y position in FIG. 18) in a vertical direction of the A pillar. Accordingly, as illustrated in FIG. 20, when the temperature detecting region 160 is viewed from the position of the non-contact temperature sensor 70, the face section M3 of the passenger M on the driver seat and the front side glass 171a are overlapped with each other. Further, the face section M3 of the passenger M on the front assistant seat and the rear side glass 171b are overlapped with each other. That is, the background portions of the face sections M3 of the both passengers are placed substantially on the vehicle glass. Here, the A pillars described in this specification are the pillars existed in the front most of the vehicle on both sides in a vehicle width direction among the pillars constituting a passenger compartment.

Figure 21:
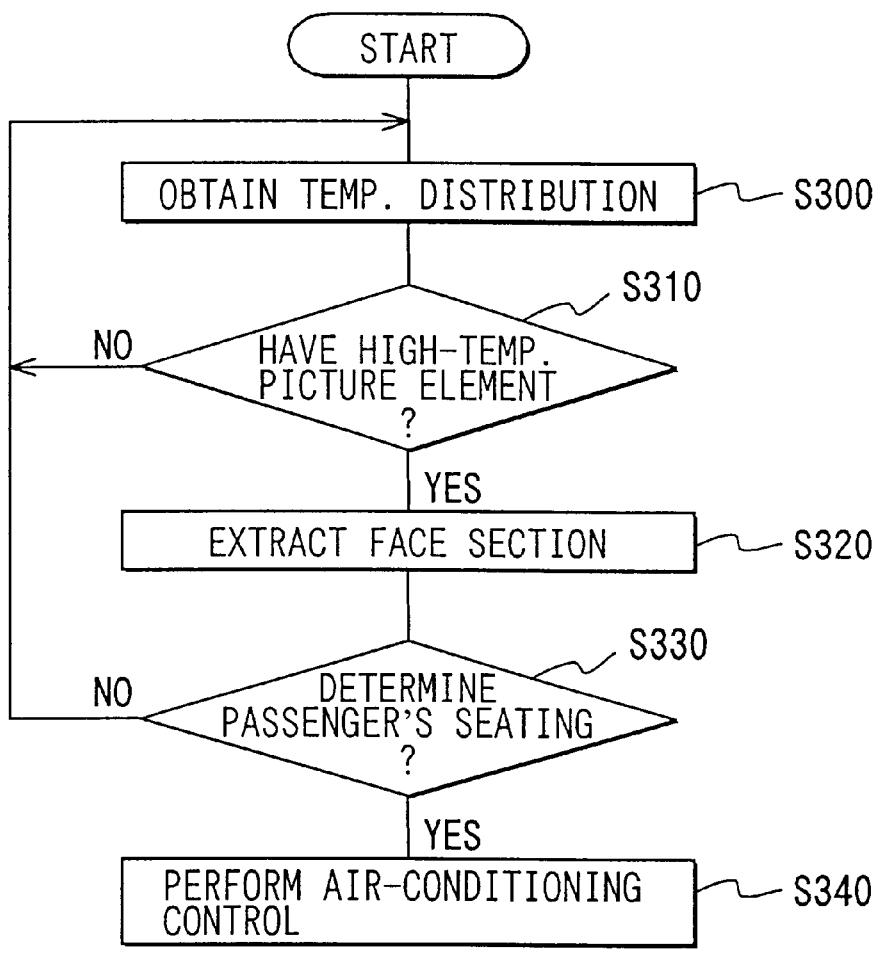
FIG. 21 is a flow diagram showing an air-conditioning control process according to the eighth embodiment.

FIG. 21 illustrates a flow diagram for determining existence/non-existence of a passenger M on the front seat and a seating position of the passenger M. Firstly, at step S300, the temperature distribution information of the temperature detection region 160 is obtained. Next, at step S310, whether there is a picture element portion (in this embodiment, sections drawn oblique lines in FIG. 20) with a high temperature indicating a value close to the face section temperature or not is determined. When the high-temperature picture element portion is determined at step 310, the existence of the passenger M is determined and the program is advanced to step S320. At step S320, the temperature distribution information of a predetermined portion (i.e., portion estimated to the face section M3 when passenger is in a correct seating attitude) of the temperature detecting region 160 is extracted. That is, at step S320, the temperature distribution information regarding the face section M3 is extracted.

Next, at step S330, a seat of the passenger M seating is specified, according to positions at which the high-temperature picture element portions showing a value close to the face section temperature are determined among the temperature detecting region 160. Further, the passenger's seat is also determined based on that how many of the high-temperature picture element portions are existed in masses (that is, size of the face section M3).

When the seat of the passenger seating is specified (determined), the program advances to step S340, and air conditioning control is performed. That is, at step S340, a blow-out air volume or a blow-out air temperature are controlled depending upon a seating position of the passenger M on the front seat, and an average temperature of the face sections of the passengers M seating in respective seats, similarly to the above-described seventh embodiment.

According to the eighth embodiment, a background portion of the face section M3 is substantially on a glass portion. Therefore, similarly to the sixth embodiment, based on the temperature distribution information of the detecting region 160, the position of the face section M3 is easily determined, further, a fluctuation of the blow-out air volume and the blow-out air temperature can be lessened, and a stable temperature environment is obtained.

The same as the seventh embodiment, the number of the non-contact temperature sensors 70 can be made smaller than the number of the passengers being the detecting object.

[Ninth Embodiment]

A ninth embodiment illustrated in FIG. 22–FIG. 24 will be explained. In the ninth embodiment, whether an object moving inside the passenger compartment is a passenger or a luggage is determined, and preferentially (concentrically) an air conditioning control is performed with respect to the passenger. The content of the ninth embodiment is the same as the sixth embodiment except in that the control processing illustrated in FIG. 22 is added.

Figure 22:
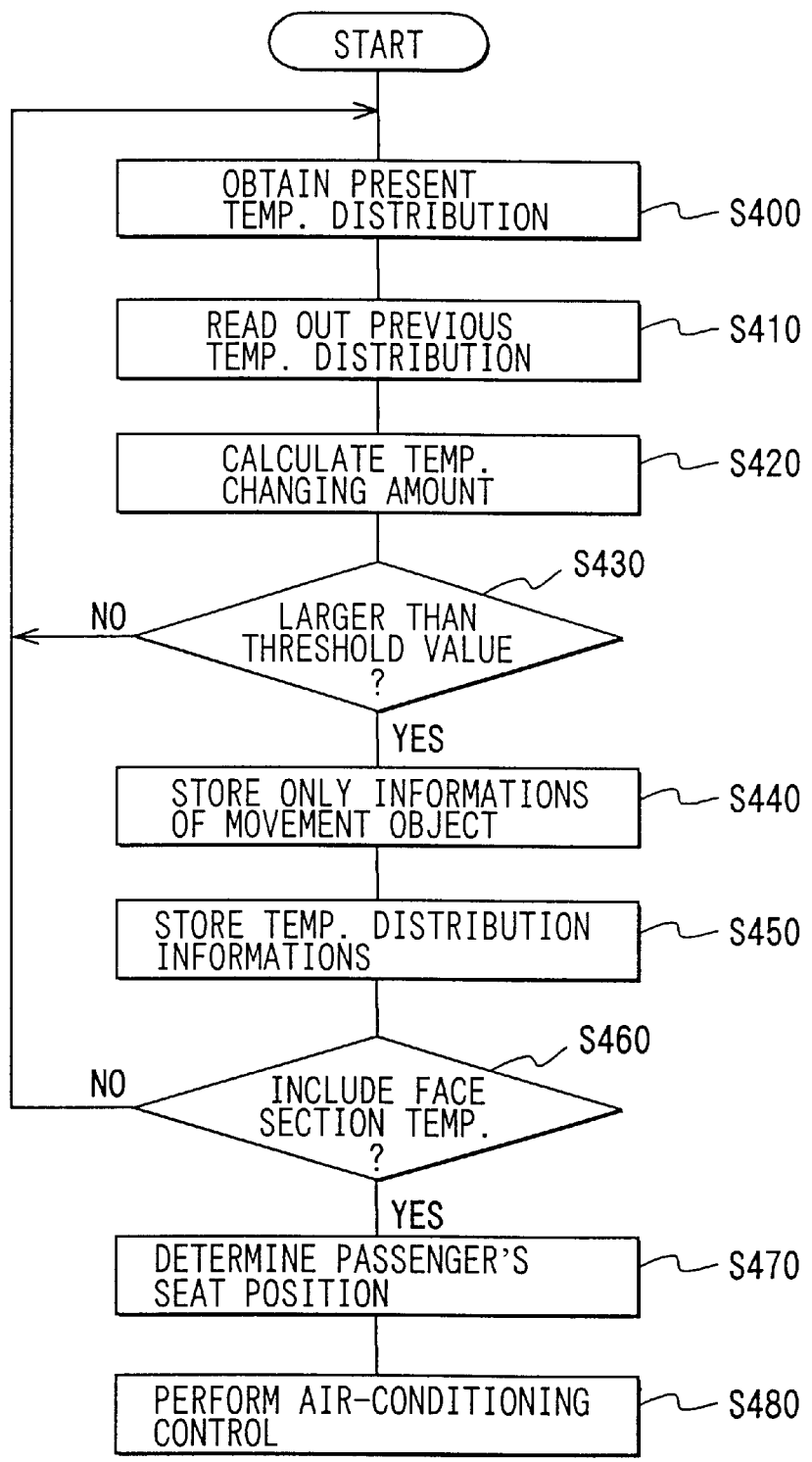
FIG. 22 is a flow diagram showing an air-conditioning control process according to a ninth preferred embodiment of the present invention.

FIG. 22 illustrates a flow diagram for determining whether the moving object is the passenger or the luggage. Firstly, at step S400, present temperature distribution information of the temperature detecting region 160 is obtained. Next, the temperature distribution information of the previous time is read out at step S410. At step S420, based on the present (this time) temperature distribution information and the previous (previous time) temperature distribution information, temperature changing amounts of every respective picture elements are calculated. Further, at step S430, the temperature changing amounts of every respective picture elements are compared with a threshold value, respectively.

Figure 23:
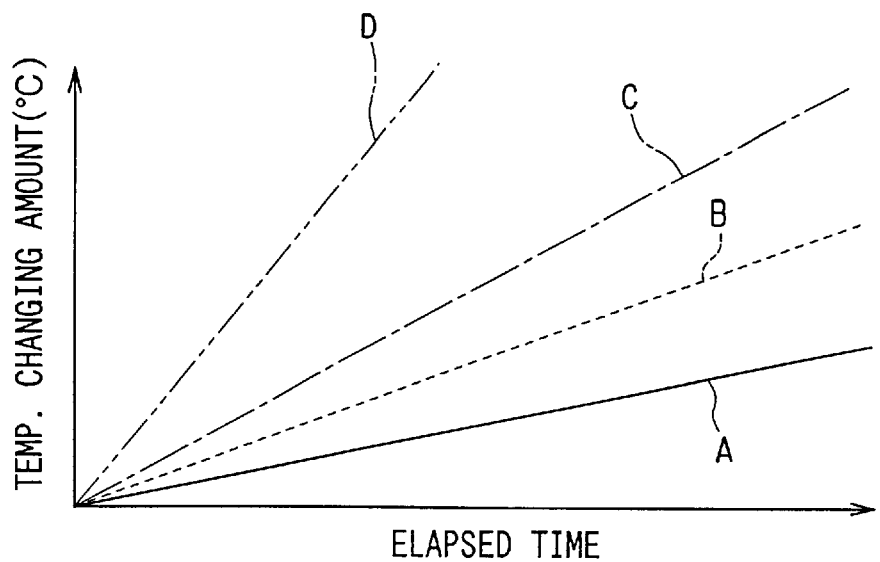
FIG. 23 is a characteristic view showing temperature change amounts of the various temperature detecting subjects according to the ninth embodiment.
Figure 24:
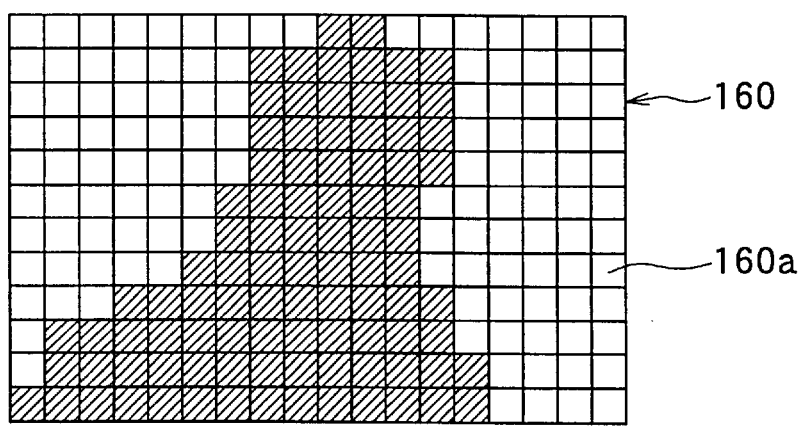
FIG. 24 is a view showing a temperature distribution of a temperature detecting region obtained by a non-contact temperature sensor according to the ninth embodiment.

Here, FIG. 23 illustrates situations of the temperature change when detecting the temperatures inside the passenger compartment of the various temperature detecting subjects by using certain picture elements. In FIG. 23, the solid line A shows a characteristic in a case where a seat or glass or the like receives an influence of an environment such as solar radiation or an outside environment temperature or the like and changes the temperature, the dotted line B indicates the threshold value, the chain line C indicates characteristics of the temperature change in a case where the passenger or the luggage is moved with a low speed, and the two dot chain line indicates characteristics of the temperature change in a case where the passenger or the luggage is moved with a high speed. As will be clearly understood from FIG. 23, the temperature change, in a case where glass or the like receives the influence of the environment, is gentle, on the other hand in a case where the object moves, the temperature change is rapid.

Accordingly, at step S430, by comparing a temperature change amount per prescribed time for every respective picture elements with the threshold value, whether a temperature change is brought about from the influence of the environment or as a result of a temperature change from the movement of the object, can be determined. When there is a picture element where the temperature change amount is larger than the threshold value, it is determined that there is the movement object and the program is advanced to step S440.

At step 440, only for the picture elements (section drawn oblique lines in FIG. 24) whose temperature change amount is larger than the threshold value, the position and temperature information of this time are stored.

At step S450, as for picture elements (section drawn oblique lines in FIG. 24) whose temperature change amount becomes larger than the threshold value, the previous time temperature information is stored. Further, as for the other picture elements, the present temperature information is stored, as temperature information of this time. The temperature information of this time stored here is later read out as the previous time temperature distribution information at step S410.

At step S460, in the temperature information stored at step S440, whether there is included the temperature information with a value close to the face section temperature or not is determined. When there is included no temperature information with a value close to the face section temperature, the moved object is determined as a luggage. When the temperature information with a value close to the face section temperature is included, the moved object is determined as the passenger and the program is advanced to step S470.

At step S470, based on the position and the temperature information stored at step S440, a seat in which the passenger M is seated is determined. And the program is advanced to step S480, a blow-out air amount and a blow-out air temperature are controlled according to the seating position of the passenger M or the face section average temperature of the passengers M in respective seats.

According to the ninth embodiment, in a case where an inside air temperature is extremely high, such as cool down time in a summer season, conditioned air blown toward the luggage side is stopped, and preferentially (concentrically) can be blown toward the passenger.

[Tenth Embodiment]

A tenth embodiment illustrated in FIG. 25 will be explained. In the tenth embodiment, after a temperature inside the passenger compartment (inside air temperature) is equal to a set temperature desired by the passenger M, the seating position and the face section average temperature of the passenger M are detected. In the tenth embodiment, the control program shown in FIG. 25 is added, and the other parts are similar to those of the above-described sixth embodiment.

Figure 25:
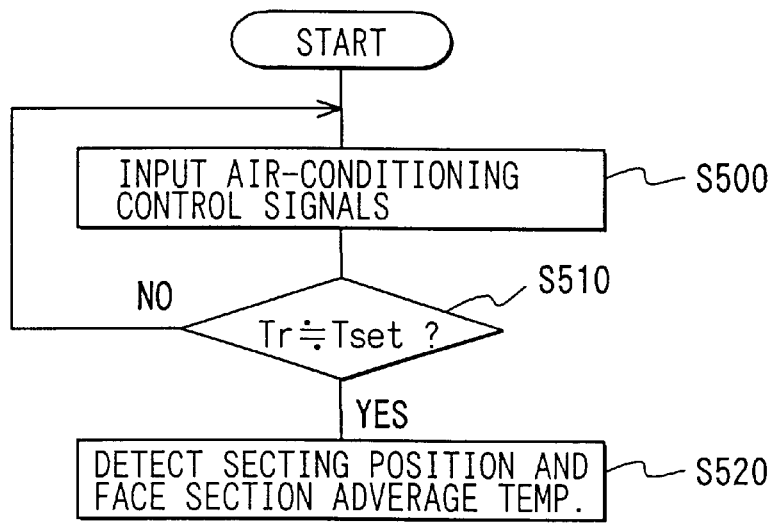
FIG. 25 is a flow diagram showing an air-conditioning control process according to a tenth preferred embodiment of the present invention.

FIG. 25 illustrates a control flow diagram. First, at step S500, information (signals) regarding a set temperature Tset set by the passenger M and information (signals) regarding an inside air temperature Tr are input. Next, at step S510, the inside air temperature Tr is compared with the set temperature Tset. At step S510, when the inside air temperature Tr is substantially equal to the set temperature Tset (for example, Tr=Tset±2° C.), the program is advanced to step S520. At step S520, based on the temperature distribution information detected by the non-contact temperature sensor 70, the seating position and the face section average temperature of the passenger M are detected.

As described above, in the tenth embodiment, when the inside air temperature is substantially equal to the set temperature, since the temperature of window glass is close to an intermediate point between the inside air temperature and the outside air temperature and is stabilized, a detection accuracy in the seating position and the face section average temperature of the passenger M can be improved.

In the above-described ninth embodiment, based on the blow-out air volume or the blow-out air temperature, whether the inside air temperature is substantially equalized to the set temperature or not may be determined.

(Eleventh Embodiment)

Figure 26:
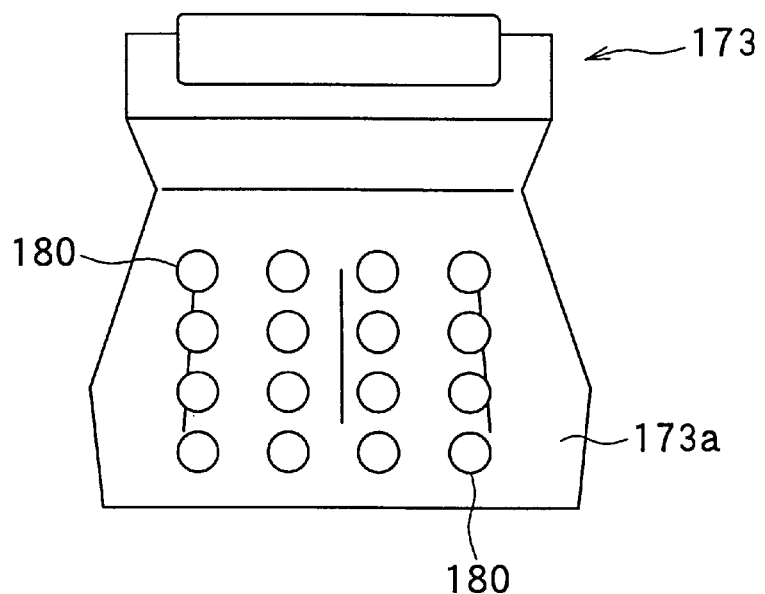
FIG. 26 is a plan view showing a seat with plural load sensors, according to an eleventh preferred embodiment of the present invention.

An eleventh embodiment illustrated in FIG. 26 will be explained. In the eleventh embodiment, as shown in FIG. 26, plural load sensors 180 for generating electric signals in response to weight are dispersively arranged. Here, the content of the eleventh embodiment is the same as that of the first or sixth embodiment except in that the load sensors 180 are added.

According to signals from the number of (in this embodiment, 16 pieces) load sensors 180, a load distribution on a seat surface 173a of the seat 173 can be found. Further, based on this load distribution, the seating position of the passenger M in the seat 173 can be found, and the position (close to right or left) of the face section M3 of the passenger M can be estimated. Based on the load distribution information of the load sensors 180 and temperature distribution information of the non-contact temperature sensor 70, the position of the face section M3 of the passenger M can be accurately estimated.

In the eleventh embodiment, at time point when seating of the passenger is confirmed by the signals from the load sensors 180 or a signal of the seat belt switch in FIG. 26, based on the temperature distribution information detected by the non-contact temperature sensor 70, the face section average temperature may be detected.

(Twelfth Embodiment)

Figure 27:
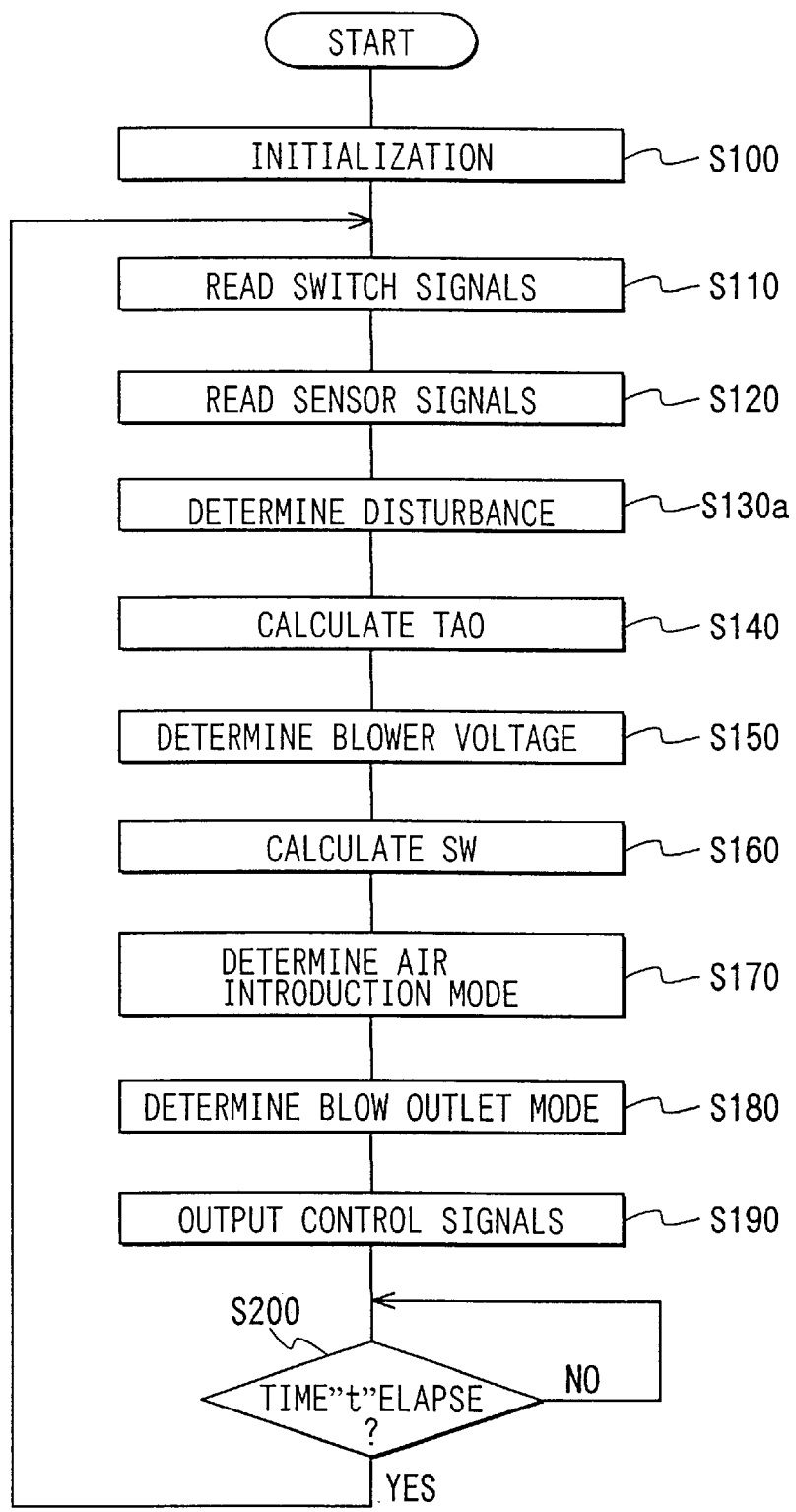
FIG. 27 is a flow diagram showing an air-conditioning control process according to a twelfth preferred embodiment of the present invention.

A twelfth embodiment as illustrated in FIG. 27–FIG. 31 will be explained. In the twelfth embodiment, as shown in FIG. 27, at step S130a, whether an outer disturbance object (e.g., high temperature objects such as cigarette, and cold temperature objects such as ice bars and can juice) whose temperature being largely deviated from the temperature range of the passenger M or the background, are entered within the temperature detection region or not is determined. In FIG. 27, the other steps are the same as the steps illustrated in FIG. 4.

Figure 30:
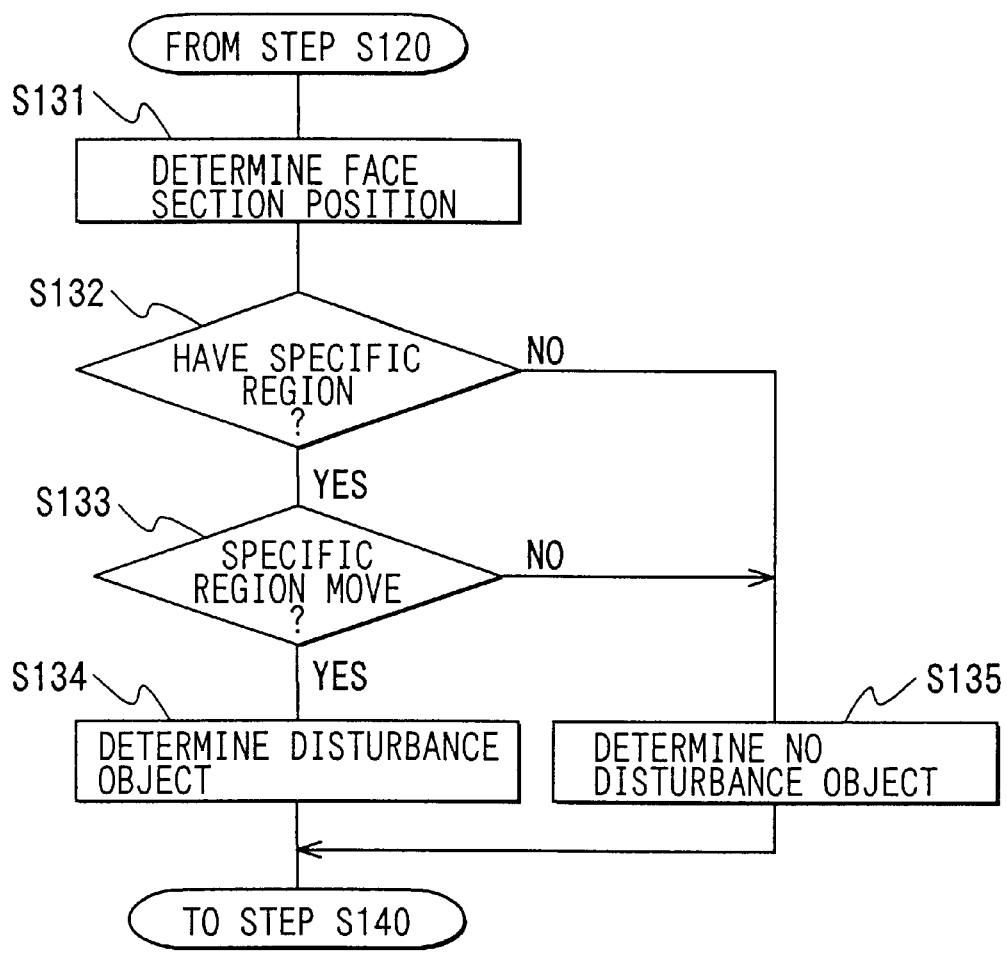
FIG. 30 is a flow diagram showing a control process of step S130a in FIG. 27.

Next, an outer disturbance determination of step S130a in FIG. 27 will be explained in detail based on FIG. 30. As shown in FIG. 30, firstly, at step S131, based on surface temperature data of the detection region 160 detected by the non-contact temperature sensor 70, the position of the face section M3 within the detection region 160 is determined. That is, since an approximate position of the face section M3 is already cleared, the region (picture element) with a temperature (for example 32–38° C.) close to the face section temperature in the vicinity of that position is determined as the position of the face section M3.

At step S132 (specific region detection means), based on the temperature data of the detection region 160 detected by the non-contact temperature sensor 70, a specific region whose temperature in a region except the face section M3 becomes out of a prescribed temperature range is determined. That is, it is determined whether or not a specific region whose temperature is extremely high or a specific region whose temperature is excessively low exists. At step S132, it is determined whether or not the detection region 160 has the specific region except for the face section M3.

Specifically, an average temperature Ta (when air conditioning is stable, around 25° C.) in the region except the face section M3 among the detection regions 160 is made a reference, a region whose temperature is higher than the average temperature Ta by equal to or more than a first predetermined value $\alpha 1$ (for example, 15° C.) is determined as a specific region on the high temperature side, further, a region whose temperature is lower than the average temperature Ta by equal to or more than a second predetermined value $\alpha 2$ (for example 10° C.) is determined as a specific region on the lower temperature side. If there is no specific region at step S132, it is determined that there is no an outer disturbance object at step S135, and the program is advanced to step S140 (FIG. 4). On the other hand, when there is a specific region at step S132, the program is advanced to step S133.

At step S133, it is determined whether or not the specific region is moved to the other region with the elapsed time. That is, at step S133, it is determined whether or not the specific region moves for a predetermined time.

Figures 28, 29:
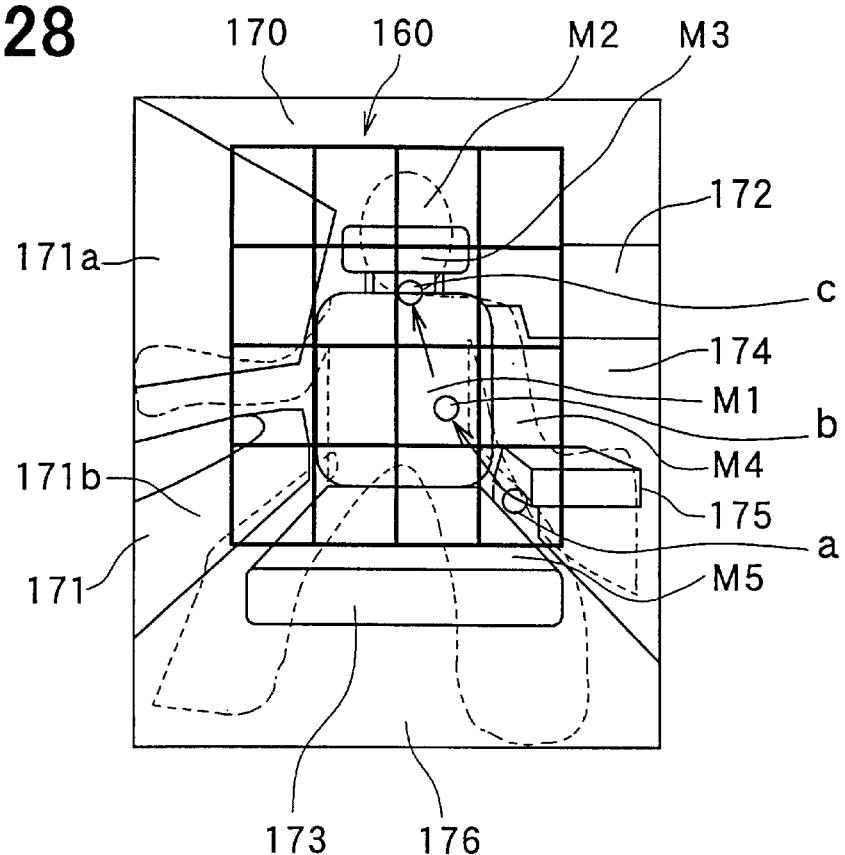
FIG. 28 is a view showing a temperature detecting region of a non-contact temperature sensor according to the twelfth embodiment.
FIG. 29 is a schematic diagram showing a structure of picture elements of the non-contact temperature sensor according to the twelfth embodiment.

The determination at step S133, in a case where a cigarette is moved to points of "a", "b", and "c" in order in FIG. 28, as an example, will be explained. Here, the temperature of a region at the point "a" is detected by a temperature detecting element in a symbol P among the temperature detecting elements A–P (refer to FIG. 29), the temperature of a region at the point "b" is detected by the temperature detecting element in a symbol K, and the temperature of a region at the point "c" is detected by the temperature detecting element in a symbol G.

Figure 31:
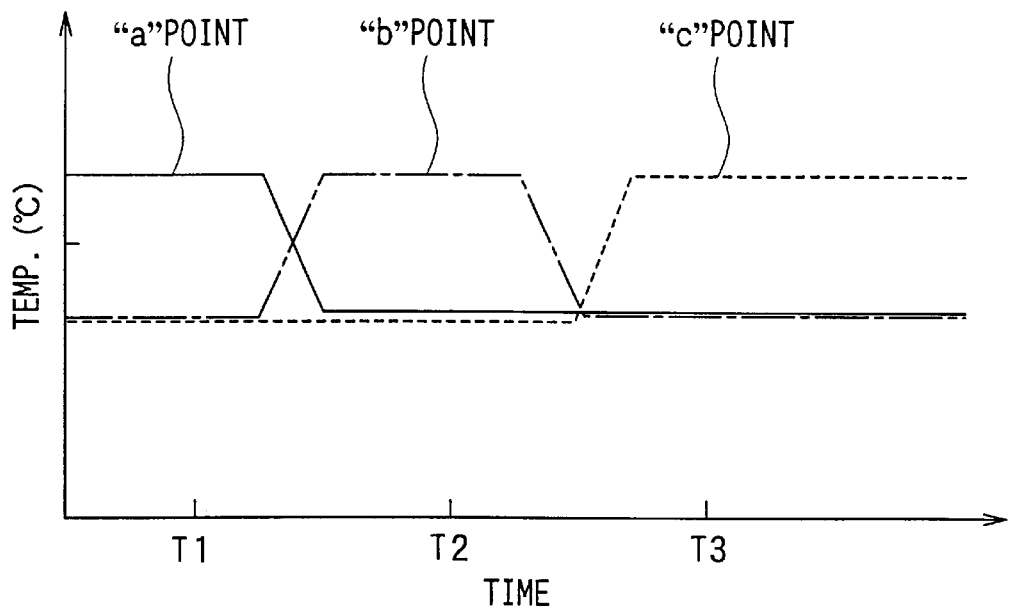
FIG. 31 is a graph showing a temperature change in each region at the points "a", "b" and "c", according to the twelfth embodiment.

FIG. 31 illustrates a temperature change in each region at the points "a", "b" and "c" detected by the temperature detecting elements P, K and G. At time T1, the region of the point "a" where the cigarette is positioned is a high-temperature side specific region with a temperature equal to or more than Ta+$\alpha 1$. At time t2, the region of the point "b" is the high-temperature side specific region. At time t3, the region of the point "c" is the high-temperature side specific region. As described above, when the high temperatures side specific region is moved in order within the detection region 160 accompanied by the elapse of time, at step S133, the program is advanced to step S134. At step S134, existence of a disturbance object for giving an adverse effect to an air conditioning control is determined.

When the cold temperature objects (for example ice bar and can juice) are moved within the detection region 160, the region where the cold temperature object is positioned is a low-temperature side specific region with a temperature equal to or lower than Ta–$\alpha 2$.

On the other hand, when the specified region is not moved within the detection region 160, the specified region is considered to be influenced by the outside air or the solar radiation, it is determined that there is no disturbance object at step S135, and the program is advanced to step S140 (FIG. 4).

In the twelfth embodiment, disturbance determining means is constructed by step S133 and step S134 for determining existence/non-existence of the disturbance based on whether the specific region is moved or not.

Here, the average temperature Ta of the region excluding the face section M3 that is a skin exposing section is substantially equal to a room temperature of the passenger compartment. Therefore, in a room temperature stationary state, the predetermined temperature range is changed in response to roughly the room temperature of the passenger compartment. When the room temperature is, for example, around 25° C., the moving object at a temperature, for example, of 50° C., is determined as the disturbance object. However, when the room temperature of the passenger compartment is high such as in cooling down time, the moving object is not determined as the disturbance object. That is, even in the moving object having the same temperature, only in a case where the temperature difference between the moving object and the room temperature of the passenger compartment is large, and an influence to the air conditioning control is large, the moving object is determined as the disturbance object.

Based on a disturbance determining result at step S130a described above, a computing method of the target blow-out air temperature TAO at step 140 in FIG. 27 is changed.

That is, at step S140, the target blow-out air temperature TAO is computed based on the surface temperature, the set temperature, and the inside air temperature read at step S120.

When no disturbance object is determined at step S135, the target blow-out air temperature TAO is calculated utilizing the most recent surface temperature data read in at step S120.

On the other hand, when the disturbance object giving an adverse effect to the air conditioning control is determined at step S134, old surface temperature data before entering the disturbance object within the temperature detecting region 160 are read from a RAM within the ECU, the target blow-out air temperature TAO is computed by utilizing the old surface temperature data. As stated above, in a case where the disturbance object is entered in the temperature detecting region 160, by calculating the target blow-out air temperature TAO using the old surface temperature data, the influence of the disturbance object can be removed, and it can prevent the air conditioning control from being unstable due to the disturbance.

(Thirteenth embodiment)

Figure 32:
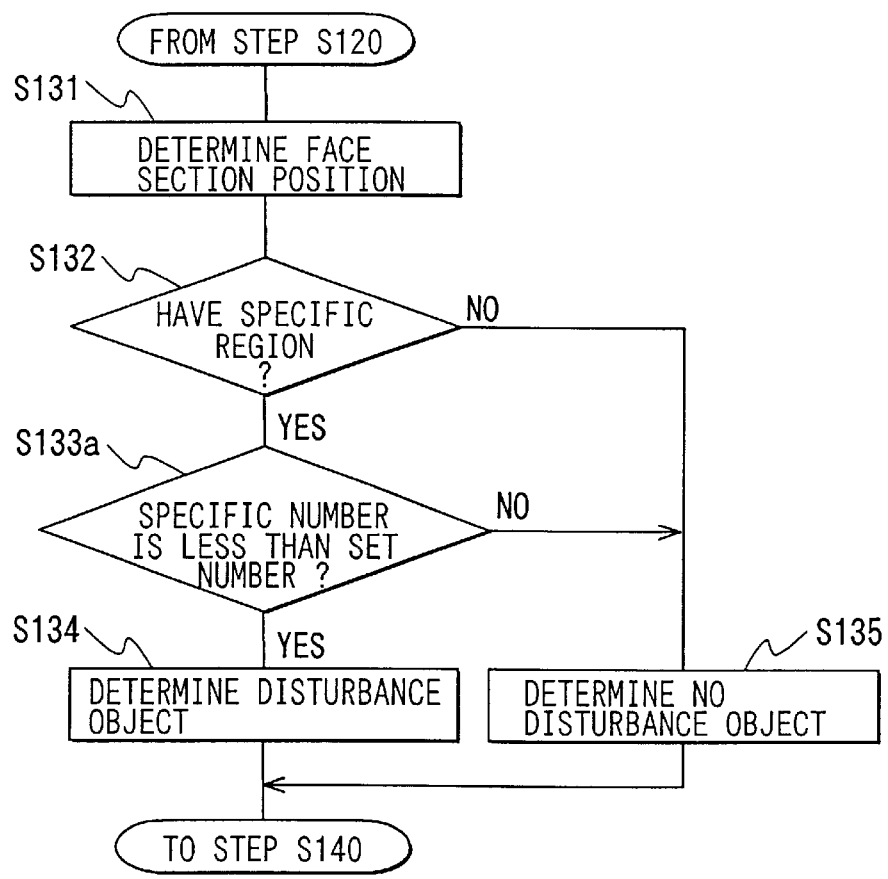
FIG. 32 is a flow diagram showing a main control process according to a thirteenth preferred embodiment of the present invention.

A thirteenth embodiment illustrated in FIG. 32 will be explained. The thirteenth embodiment is different from the twelfth embodiment in the disturbance determination method of step S130a of FIG. 27. Specifically, step S133 (refer to FIG. 30) of the twelfth embodiment is changed to step S133a in the thirteenth embodiment, and the other parts of the thirteenth embodiment are the same as those of the twelfth embodiment.

Hereinafter, the disturbance determining method of the thirteenth embodiment will be explained based on FIG. 32. Firstly, at step S131, the position of the face section M3 within the detection region 160 is determined. Next, at step S132, existence/non-existence of the specific region whose temperature in the region except the face section M3 is out of a predetermined temperature range is determined. If there is no specific region, there is no disturbance object at step S135 is determined and the program is advanced to step S140. On the other hand, if there is the specific region, the program is advanced to step S133a from step S132.

At step S133a, the number (i.e., specific number) of the regions (picture elements) determined as the specific region is counted. When the number exceeds a predetermined number (this embodiment, equal to or more than 3) at step S133a, it is determined that there is no disturbance object, and the program is advanced to step S140. Here, when the specific number of the specific region is equal to or more than 3, that is, when a wide range becomes a high temperature or a low temperature, it is estimated to be a normal state being influenced by the outside air or the solar radiation. Accordingly, in this case, it is determined that there is no disturbance object.

On the other hand, when the number of the regions (picture elements) determined as the specific region is below the predetermined number (in this embodiment, equal to or less than 2), the program is advanced to step S134, and it is determined that there is the disturbance object to give an adverse effect to an air conditioning control at step S134. Here, in a case where the specific number of the specific regions is 1 or 2, that is, in a case where a narrow range is in the high temperature state or the low temperature state, it is not a normal state due to the outside air or the solar radiation, but an influence of the disturbance objects such as a cigarette or a juice is estimated. Accordingly, in this case, it is determined that there is the disturbance object.

The disturbance determining means for determining the existence/non-existence of the disturbance based on the specific number of specific region is constructed by step S133a and step S134.

Thereafter, based on a disturbance determining result of step S130, the same steps as the twelfth embodiment, processing at and after step S140 (refer to FIG. 27) are executed. Accordingly, the influence of the disturbance object can be eliminated, and it can prevent the air conditioning control from being unstable due to the disturbance.

In the above-described twelfth embodiment and thirteenth embodiment, when the existence of the disturbance is determined, the target blow-out air temperature TAO is calculated by utilizing old surface temperature data before the disturbance object enters into the temperature detecting region 160. However, the controls at and after step S150 may well be performed by utilizing an old target blow-out air temperature before the disturbance object enters into the temperature detecting region 160.

In the twelfth embodiment and thirteenth embodiment described above, the predetermined temperature range is set, using the average temperature Ta in the region except the face section M3, as a reference. However, the predetermined temperature range may well be set, by using an average temperature of the entire detection region 160 including the face section M3, as a reference. Further a predetermined temperature range may well be set between a fixed value of the high-temperature side set temperature (for example 40° C.) and a fixed value of the low-temperature side set temperature (for example 15° C.).

In the thirteenth embodiment, when the number of the specific region is equal to or below the predetermined number, the existence of the disturbance object is determined. However, the predetermined number may be changed according to the number of divided regions (picture elements) of the temperature detecting region 160.

(Fourteenth Embodiment)

Figure 33:
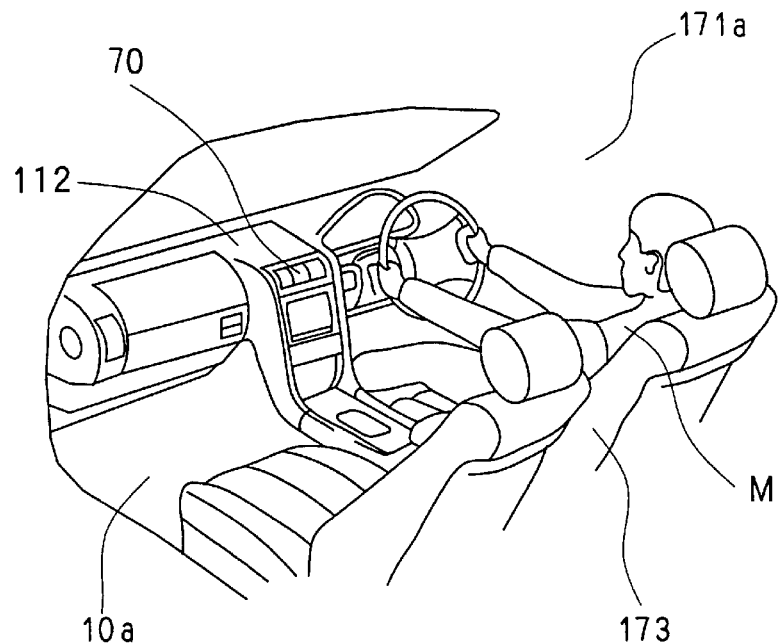
FIG. 33 is a schematic diagram of a passenger compartment, showing an arrangement position of a non-contact temperature sensor, according to a fourteenth preferred embodiment of the present invention.

A fourteenth embodiment of the preset invention will be explained with reference to FIG. 33–FIG. 37. As shown in FIG. 33, in an instrument panel 112 at a front side of the driver (passenger) M, a non-contact temperature sensor 70 for detecting a surface temperature of the driver M and on a periphery of the driver M in a non-contact state is installed. The non-contact temperature sensor 70 is an infrared sensor for generating an electric signal (surface temperature signal) corresponding to an amount of infrared ray radiated from a temperature detecting subject. More specifically, the non-contact temperature sensor 70 is the infrared sensor utilizing a thermo-pile type temperature detecting element for generating the electromotive force proportioned to the amount of infrared rays corresponding to the amount of the infrared rays from the temperature detecting subject.

Figure 34:
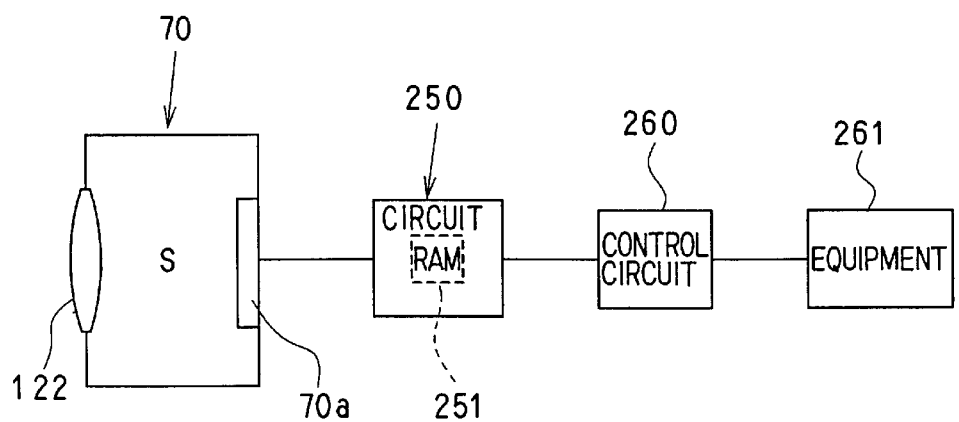
FIG. 34 is a schematic diagram of a control unit, for controlling a vehicle equipment, including the non-contact temperature sensor, according to the fourteenth embodiment.

As illustrated in FIG. 34, the non-contact temperature sensor 70 is provided with a number of temperature detecting elements 70a arranged in a shape of a matrix, and a lens 122 for condensing the infrared rays radiated from the temperature detecting subject. The non-contact temperature sensor 70 is disposed so as to image a thermal image by the lens 122 on the temperature detecting elements 70a.

Figure 35:
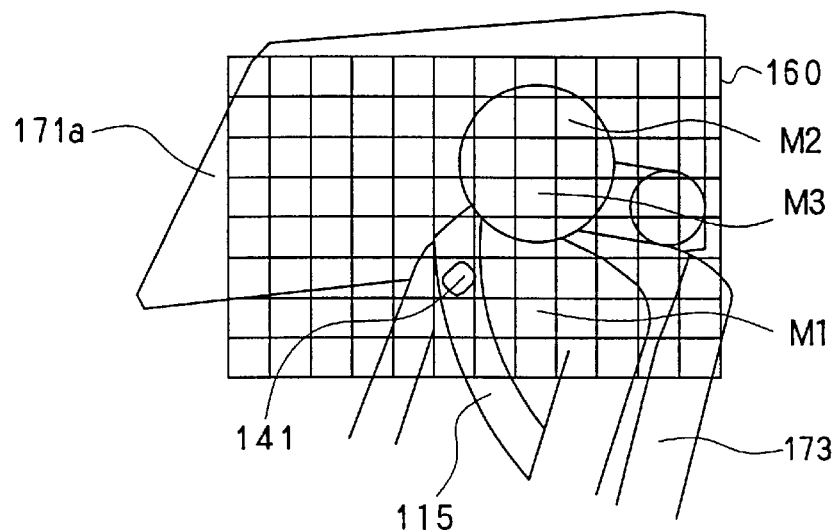
FIG. 35 is a view showing a temperature detecting region of the non-contact temperature sensor, according to the fourteenth embodiment.

FIG. 35 illustrates a detected region 160 of a surface temperature detected by the non-contact temperature sensor 70. The detection region 160 is divided into a plurality of picture elements, for example, picture elements in 8-lines and 12-columns, and a temperature is detected for every respective picture elements. This detection region 160 includes the upper half body (wearing section) M1 of the driver M, the head section M2, the face section M3, the side glass 171a of a driver's seat door, the driver's seat 173, and a driver seat belt 115.

On the driver seat belt 115, a constant temperature body (reference temperature detecting member) 141 settable in a predetermined constant temperature is mounted. A mounting position of the constant temperature body 141 is set so as to enter in the detection region 160 of the non-contact temperature sensor 70, in a state where the driver M wears the seat belt 115 of the driver seat. Specifically, the constant temperature body 141 is set in the vicinity of a breast of the driver M. the temperature of the constant body 141 is set at 33° C. similar to a skin temperature of the passenger. As the constant temperature body 141, a Peltier element adjustable the temperature by a control of an application voltage can be utilized. The Peltier element is a thermoelectric element which performs a heat absorbing operation on one end side thereof and performs a heat radiation operation on the other end side thereof when an electrical current is carried as will be well known.

In a signal processing circuit 250 illustrated in FIG. 34, an output signal from the non-contact temperature sensor 70 is processed and temperature distribution data obtained by processing the output signal is transmitted to a control circuit 260. Specifically, the infrared rays radiated from the driver M and on a periphery of the driver M arrive to the temperature detecting elements 70a through the condensing lens 122, so that the respective temperature detecting elements 70a send output signals in response to the amount of received infrared rays. The output signals from the non-contact temperature sensor 70 are processed in the signal processing circuit 250, and the temperature distribution data of the detection region 160 as illustrated in FIG. 36 is obtained.

Figure 36:
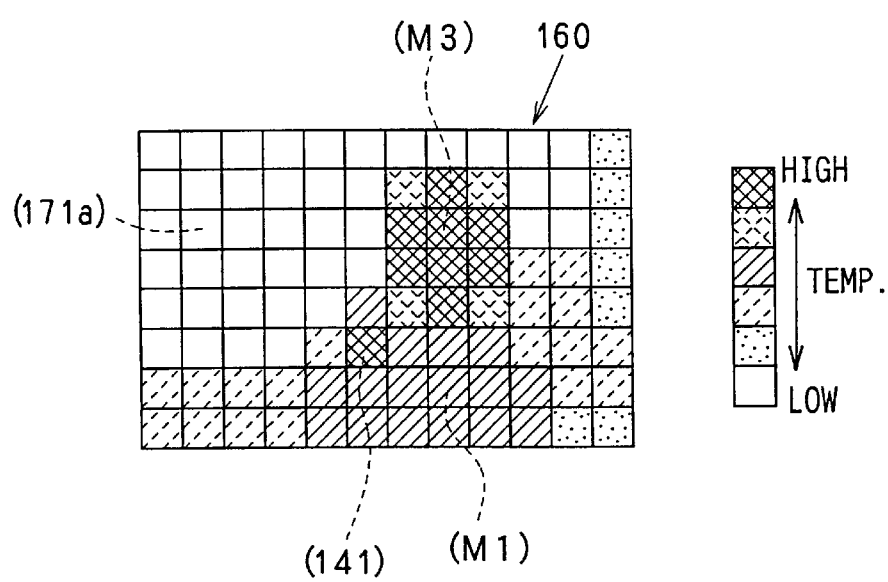
FIG. 36 is a view showing a temperature distribution of the temperature detecting region of the non-contact temperature sensor, according to the fourteenth embodiment.

However, in FIG. 36, the temperature distribution is indicated to be divided for every temperature areas, for convenience sake, actually, the temperature data of respective picture elements is numerized and stored, and the control operation is performed based on the temperature data numerized. Numeral 251 designates a RAM (memory means) for storing an initial output value or the like, which will be described later.

The control circuit 260 controls an operation of a vehicle equipment (e.g., air conditioning system, air bag device, security control device) 261 based on the temperature distribution data from the signal processing circuit 250.

FIG. 37 illustrates a flow diagram relating to an output value correction (calibration) of the non-contact temperature sensor 70 among control processing executed at the signal processing circuit 250. Next, the control processing will be explained based on FIG. 37.

Firstly, at step S610, the temperature of the constant temperature body (CTB) 141 is controlled at 33° C. Then, the temperature in the detection region 160 is detected by the non-contact temperature sensor 70, and the temperature distribution data of the detecting region 160 as illustrated in FIG. 36 can be obtained, at step S611.

Based on the temperature distribution data, the position of the picture element of the constant temperature body (CTB) 141 within the temperature distribution data is determined at step S612. Here, excluding a case where the inside air temperature of the passenger compartment is extremely high such as in cool down time in the summer season, the face section M of being a skin exposing section within the detection region 160 is the highest temperature. Thus, among the temperature distribution data in FIG. 36, a portion where plural picture elements having a highest temperature are concentrated, is determined as the positions of picture elements of the face section M3. On the other hand, the temperature of the constant temperature body (CTB) 141 is set the same as the skin temperature. Further, it is already known that the constant temperature body (CTB) 141 stays in the vicinity of the breast of the driver M and is positioned downward of the face section M3. Accordingly, within the temperature distribution data in FIG. 36, the portion of the high temperature existed downward of the face section M3 is determined as the position of the picture element of the constant temperature body 141.

The present temperature data (present output value A) in the position of the picture element of the constant temperature body (CTB) 141 determined at step S612 is obtained at step S613, next, an initial output value B of the set temperature of the constant temperature body (CTB) 141 is read in from the RAM 251 at step S614. The temperature data of the constant temperature body (CTB) 141, obtained by the non-contact temperature sensor 70 when the temperature of the constant temperature body (CTB) 141 is set at 33° C. at the time of completion of the assembly of the constant temperature body (CTB) 141 into a vehicle, is stored in the RAM 251, so that the initial output value B is obtained.

By comparing the present output value A with the initial output value B, a correction coefficient K (however, initial value is set at K=1) of an output signal of the non-contact type temperature sensor 70 is calculated at step S615, based on a formula K=B/A. Here, due to a deterioration of the temperature detection element 70a through use of a long period of time and contamination of the condenser lens 122 and the like, the non-contact temperature sensor 70 normally has a relationship constructed as that the present output value A<the initial output value B, accordingly, a correction coefficient being K>1.

In the signal processing circuit 250, a temperature distribution data being obtained by processing an output signal of the non-contact temperature sensor 70 is normally transmitted to the control circuit 260. The control processing illustrated in FIG. 37 is periodically executed at time when an engine of a vehicle is started (ignition switch, not illustrated, is turned on) or when the driver M wears (seat belt switch, not illustrated, is turned on) the driver seat belt 115. The control process illustrated in FIG. 37 may be executed periodically for every constant period based on a calendar signal.

In the signal processing circuit 250, an output signal of the non-contact temperature sensor 70 is multiplied by the correction coefficient K to be corrected, the output signal after the correction is processed to obtain temperature distribution data, and the temperature distribution date is transmitted to the control circuit 260.

The control circuit 260, where the temperature distribution data after correction is received, controls an operation of the vehicular equipment 261 based on the temperature distribution data. For example, when the vehicular equipment 261 is the air conditioning system, the seating position of the passenger M and the temperature of the face section M3 of the passenger M are detected based on the temperature distribution data, and a blow-out direction, a blow-out air volume, blow-out air temperature are adjusted corresponding to the seating position or the face section temperature.

According to the fourteenth embodiment, because the reduced portion of the present output value A relative to the initial output value B is corrected by the correction coefficient K obtained by comparing both of the output values A and B, even if an output value of the non-contact temperature sensor 70 is changed due to the deterioration of the temperature detection element 70a and the contamination of the condenser lens 122, the temperature of the temperature detecting subject can be accurately measured through the correction.

Since the constant temperature body 141 is mounted on the seat belt 115, the constant temperature body 141 can be set to stay in the vicinity of the breast of the driver M. Therefore, a distance between the constant temperature body 141 and the non-contact temperature sensor 70, and a distance between the driver M and the non-contact temperature sensor 70 are substantially equalized. Accordingly, in a case where the temperature of the constant temperature body 141 is detected, and in a case where the temperature of the driver M is detected, without receiving an influence of an error due to an imaging blur of the condenser lens 122, the temperature of the passenger M can be more accurately measured.

Because the temperature of the constant temperature body 141 is set at the same as the skin temperature of the passenger M and is corrected, the temperature of passenger M after correction can be more accurately measured.

Because the fluctuation range of the skin temperature in the face section of a person is in a degree of 30–35° C., in the present specification, the temperature range of 30–35° C. is set to a range substantially the same as the temperature of the skin of a person.

At time of calculation of the correction coefficient K from the second time, based on the correction coefficient $K_{old}$ calculated at previous time, an output value $A_{old}$ obtained at previous time and the present output value A, a new correction coefficient K may be calculated. Specifically, in place of the initial output value B, the previous time output value $A_{old}$ is stored in the RAM 251, and based on a formula $K=K_{old} \cdot A_{old}/A$, the new correction coefficient K is calculated. Here, since $K_{old} \cdot A_{old}$ is equal to an initial output value B, the value $K_{old} \cdot A_{old}$ is included in the initial output value.

(Fifteenth Embodiment)

A fifteenth embodiment is illustrated in FIG. 38. In the fifteenth embodiment, only the mounting position of the constant temperature body (CTB) 141 is different from that of the fourteenth embodiment. That is, the constant temperature body 141 is mounted on the driver seat 173 within the detection region 160. More specifically, the constant temperature body 141 is attached at a position upward of the back rest section of the seat 173, and is mounted to be close to a vehicle center in the vehicle width direction. According to the fifteenth embodiment, the same effect as that of the fourteenth embodiment can be obtained.

(Sixteenth Embodiment)

A sixteenth embodiment is described with reference to FIG. 39. In the above-described fourteenth and fifteenth embodiments, the temperature of the constant temperature body (CTB) 141 is set only at one point, and the correction coefficient K is obtained. However, in the sixteenth embodiment, the temperature of the constant temperature body (CTB) 141 (refer to FIG. 35 and FIG. 38) is set at two points, and the correction coefficient K is obtained. Other parts of the sixteenth embodiment are the same as those of fourteenth and fifteenth embodiments.

Figure 39:
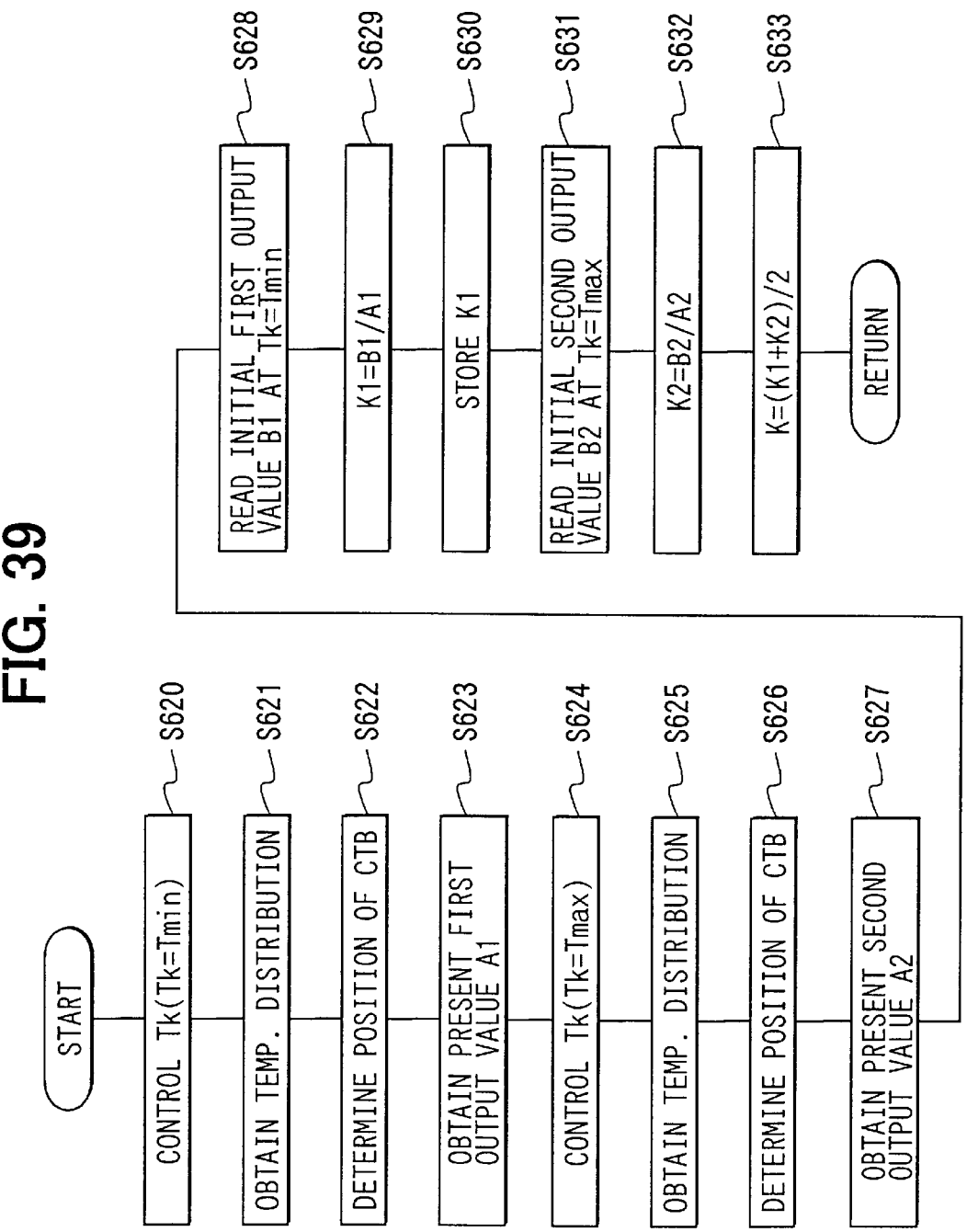
FIG. 39 is a flow diagram showing a control process performed in a signal processing circuit, according to a sixteenth preferred embodiment of the present invention.

FIG. 39 illustrates a flow diagram relating to an output value correction (calibration) of the non-contact temperature sensor 70, among the control processing executed by the signal processing circuit 250 (refer to FIG. 34). Next, the control processing according to the sixteenth embodiment will be explained based on FIG. 39.

Firstly, since the fluctuation range of the skin temperature of the face section of a person is at a degree of 30–35° C., the temperature Tk of the constant temperature body (CTB) 141 is controlled at step S620 to the minimum skin temperature Tmin (equal to 30° C.) of the face section. With the non-contact temperature sensor 70 (refer to FIG. 33 and FIG. 34), the temperature of the detecting region 160 (refer to FIG. 35 and FIG. 38) is detected, and the temperature distribution data of the detection region 160 is obtained at step S621.

Based on the temperature distribution data, the position of the picture element of the constant temperature body (CTB) 141 is determined at step S622. Next, the present temperature data (present first output value A1) of positions of the picture elements of the constant temperature body 141 at time of TK=Tmin is obtained at step S623.

Next, the temperature Tk of the constant temperature body 141 is controlled at step S624 to the maximum skin temperature Tmax (=35° C.) of the face section. Then, the temperature distribution data of the detection region 160 is obtained at step S625, the position of the picture element of the constant temperature body 141 within the temperature distribution data is determined at step S626, and the present temperature data (present second output value A2) of the position of the picture element of the constant temperature body 141 at time of Tk=Tmax is obtained at step S627.

An initial first output value B1 of the constant temperature body 141 at the time of Tk=Tmin is read at step S628 from the RAM 251 (refer to FIG. 34). The initial first output value B1 is obtained from the temperature date by the non-contact temperature sensor 70 and is stored in the RAM 251 at the time when assembly of the non-contact temperature sensor 70 and the constant temperature body 141 to the vehicle is completed, by setting the temperature of the constant temperature body 141 at 30° C.

By comparing the present first output value A1 with the initial first output value B1, based on formula K1=B1/A1, the first correction coefficient K1 is obtained at step S629. This first correction coefficient K1 calculated at step S629 is stored in the RAM 251 at step S630.

An initial second output value B2 of the constant temperature body 141 at the time of TK=Tmax is read in from the RAM 251 at step S631. This initial second output value B2 is obtained from the temperature date by the non-contact temperature sensor 70 and is stored in the RAM 251 at the time when the assembly of the non-contact temperature sensor 70 to the vehicle is completed, by setting the temperature of the constant temperature body 141 at 35° C.

By comparing the present second output value A2 with the initial second output value B2, based on a formula K2=B2/A2, the second correction coefficient K2 is obtained at step S632. Succeedingly, based on a formula K=(K1+K2)/2, the correction coefficient K is calculated at step S633, and this correction coefficient K is stored in the RAM 251.

In the signal processing circuit 250, an output signal of the non-contact temperature sensor 70 is multiplied by the correction coefficient K to be corrected, and the temperature distribution data obtained by processing the output signal after the correction is transmitted to the data control circuit 260 (refer to FIG. 34).

According to the sixteenth embodiment, the correction coefficient K is obtained by setting the temperature of the constant temperature body 141 at two points of the lowest skin temperature and the highest skin temperature of the face section. Therefore, the temperature detection accuracy inside the fluctuation range of the face section skin temperature can particularly be improved.

In this sixteenth embodiment, the temperature of the constant temperature body 141 is set at 30° C. and 35° C., however, the temperature thereof can be set appropriately in a range of 30–35° C. which is a rough fluctuation range of the face section skin temperature of the person.

For the calculation of the skin temperature after the assembly of the non-contact temperature sensor 70 to a vehicle is completed, the correction coefficient K obtained by the formula K=(K1+K2)/2 is utilized. However, in a region where the skin temperature is close to the minimum skin temperature Tmin, the skin temperature may be calculated by utilizing the first correction coefficient K1. Further, in a region where the skin temperature is close to the highest skin temperature Tmax, the skin temperature may be calculated by utilizing the second correction coefficient K2.

(Seventeenth embodiment)

Figure 40:
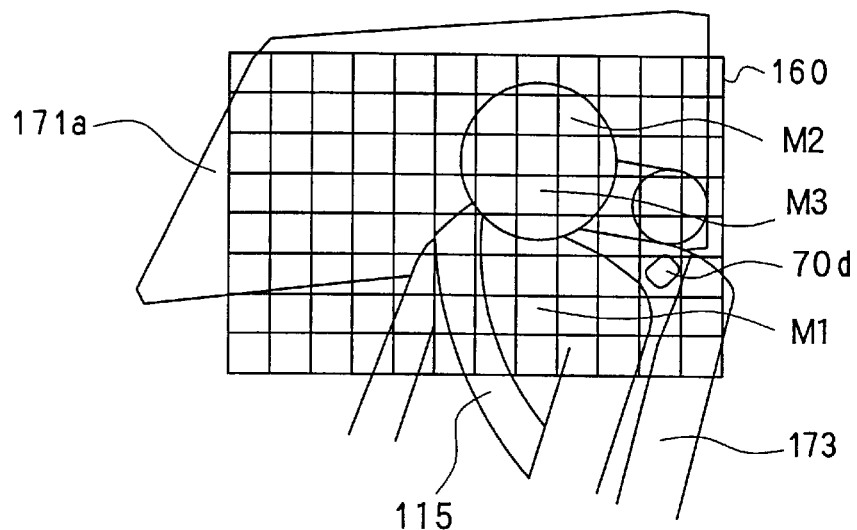
FIG. 40 is a view showing a temperature detecting region of a non-contact temperature sensor, according to a seventeenth preferred embodiment of the present invention.

A seventeenth embodiment is described with reference to FIG. 40 and FIG. 41. In the seventeenth embodiment, temperature detecting means 70d is utilized in place of the constant temperature body 141 described in the fourteenth through sixteenth embodiments. As illustrated in FIG. 40, the temperature detection means 70d composed, for example, of a thermistor, is attached to the driver seat 173 within the detecting region 160, for detecting the temperature of the seat surface. The temperature detecting means 70d is mounted at an upper position within the seat backrest section of the driver seat 173, and is positioned close to a center of a vehicle in the vehicle width direction. In the seventeenth embodiment, the other parts are the same as those of the fourteenth embodiment.

Figure 41:
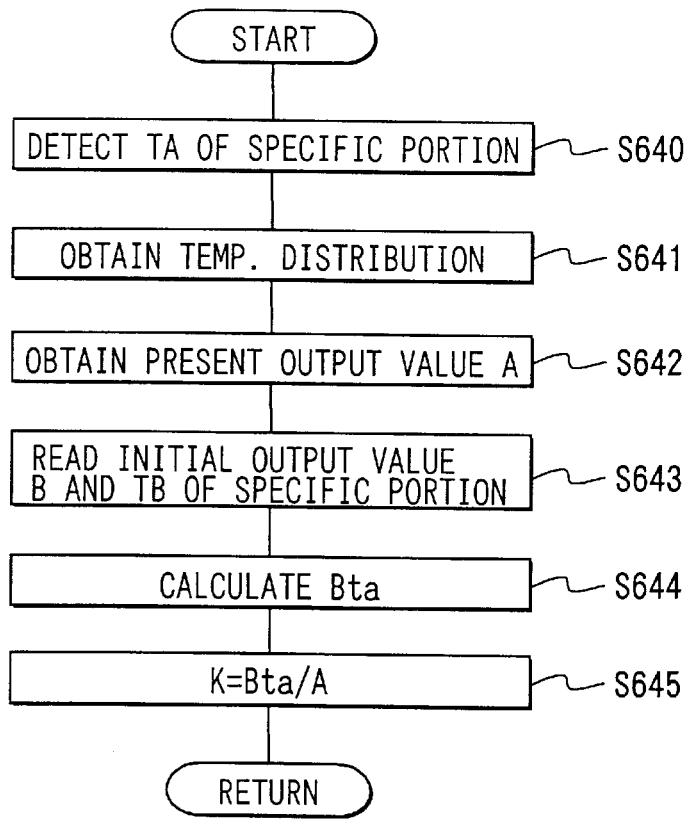
FIG. 41 is a flow diagram showing a control process performed in a signal processing circuit, according to the seventeenth embodiment.

FIG. 41 illustrates a flow diagram of a portion relating to an output value correction of the non-contact temperature sensor 70. Next, the control process of the seventeenth embodiment will be described with reference to FIG. 41.

Firstly, a present temperature TA of the seat surface of the mounting section (hereinafter, referred to as specific portion)

of the temperature detecting means 70*d* is detected at step S640 by the temperature detecting means 70*d*, and the temperature of the detecting region 160 is detected by the non-contact temperature censor 70 so that temperature distribution data of the detection region 160 is obtained at step S641.

Next, the position of the picture element of the specific portion within the temperature distribution data is determined based on the temperature distribution data, and present temperature data (present output value A) of the position of the picture element is obtained at step S642.

Next, an initial output value B at the specific portion, which is already detected by the non-contact temperature sensor 70, and an initial temperature TB of the specific portion, which is detected by the temperature detection means 70*d* at this time, are read in from the RAM 251 at step S643. The initial output value B and the initial temperature TB of the specific portion are obtained by the non-contact temperature censor 70 and the temperature detecting means 70*d*, and have been stored in the RAM 251 at a time when assembly of the sensor 70 and the means 70*d* to a vehicle is completed.

Since the present temperature TA of the specific portion and the initial temperature TB of the specific portion are different from each other, the initial output value B at the time of initial temperature TB is converted into a value equivalent to the present temperature TA, and an initial output conversion value Bta is calculated at step S644 (output value conversion means).

The present output value A is compared with the initial output conversion value Bta, and a correction coefficient K for an output signal of the non-contact temperature sensor 70 is obtained at step S645. That is, utilizing a formula K=Bta/A, the correction coefficient K is obtained at step S645 (correction coefficient determining means).

Thereafter, in the signal processing circuit 250, the output signal of the non-contact temperature censor 70 is multiplied by the correction coefficient K to be corrected, and temperature distribution data obtained by processing the output signals after the correction is transmitted to the control circuit 261 (refer to FIG. 34)

According to the seventeenth embodiment, the same effect as that of the fourteenth embodiment can be obtained. In the seventeenth embodiment, the temperature detecting means 70*d* may be disposed on the seat belt 115.

(Eighteenth Embodiment)

An eighteenth embodiment illustrated in FIG. 42 will be described. When an inside air temperature Tr inside a passenger compartment is close to a set temperature Tset, that is, in a state where the temperature inside the passenger compartment is stabilized, a correction of the correction coefficient K for an output signal of the non-contact temperature sensor 70 is carried out. In the eighteenth embodiment, the other constitutions are the same as those of the above-described fourteenth embodiment.

Figure 42:
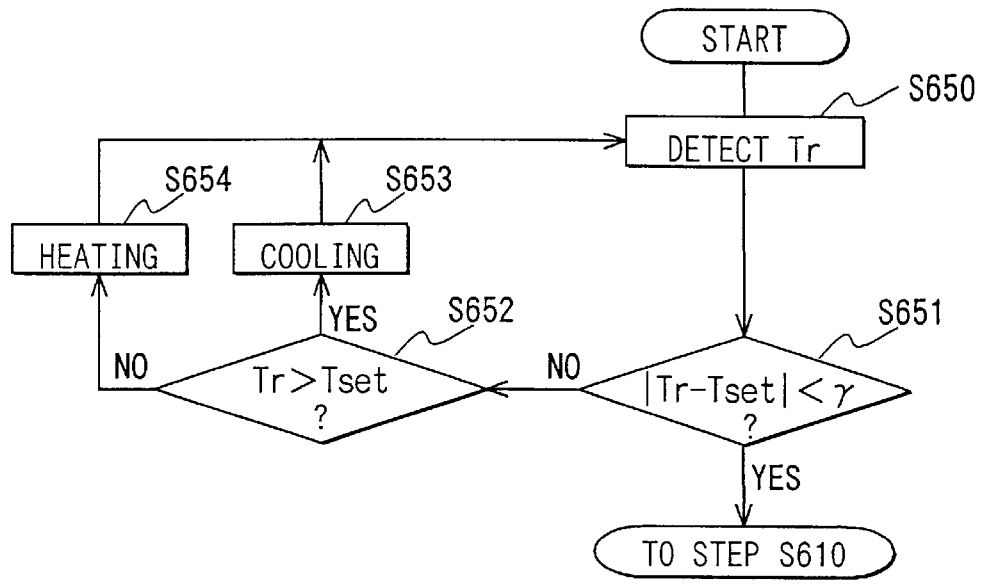
FIG. 42 is a flow diagram showing a control process performed in a signal processing circuit, according to an eighteenth preferred embodiment of the present invention.

In FIG. 42, first, the inside air temperature Tr is detected at step S650 by an inside air temperature sensor (not illustrated). Next, whether a temperature difference (|Tr−Tset|) between the inside air temperature Tr and the set temperature Tset is less than a set value γ (for example 2° C.) or not is determined at step S651. When the temperature difference |Tr−Tset| is equal to or larger than the set value γ (result of step 651 is NO), the program is advanced to step S652.

At step S652, whether the inside air temperature Tr exceeds the set temperature Tset or not is determined. When the inside air temperature Tr exceeds the set temperature Tset at step S652, the program is advanced to step S653 and cooling is performed. On the other hand, when the inside air temperature Tr does not exceed the set temperature Tset at step S652, the program is advanced to step S654, and heating is performed.

Due to the cooling at step S653 and the heating at step S654, when the difference of the temperature between the inside air temperature Tr and the set temperature Tset becomes less than the set value γ (result at step S651 is YES), the program is advanced to step S610 (refer to FIG. 37) of the fourteenth embodiment, or to step S620 (refer to FIG. 39) of the sixteenth embodiment, or to step S640 (refer to FIG. 41) of the seventeenth embodiment. In this case, similarly to these embodiments, the correction of the correction coefficient K of the output signal of the non-contact temperature sensor 70 is performed.

According to the eighteenth embodiment, since the temperature condition inside the passenger compartment at time of the correction of the correction coefficient K can always be substantially the same condition, the correction of the correction coefficient K can be precisely conducted.

(Nineteenth Embodiment)

Figure 43:
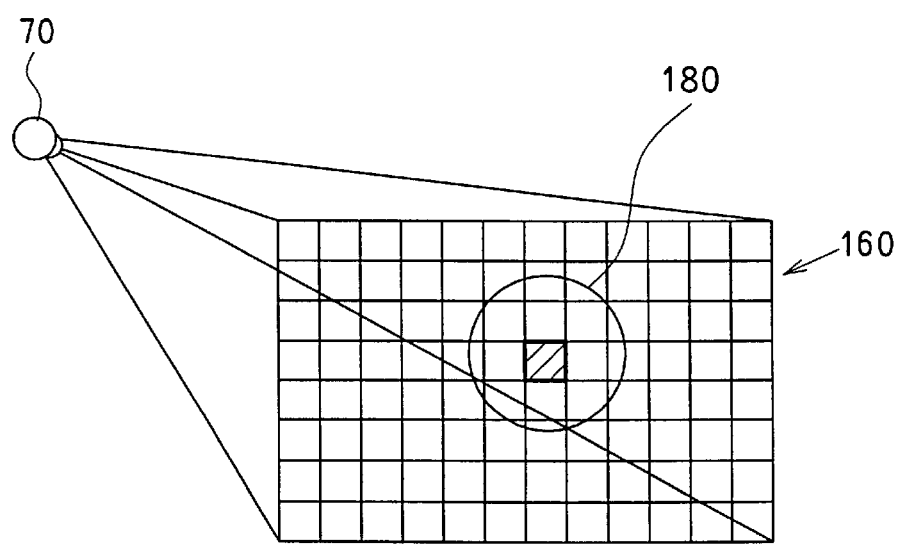
FIG. 43 is a view showing a temperature detecting region of a non-contact temperature sensor, according to a nineteenth preferred embodiment of the present invention.
Figure 44:
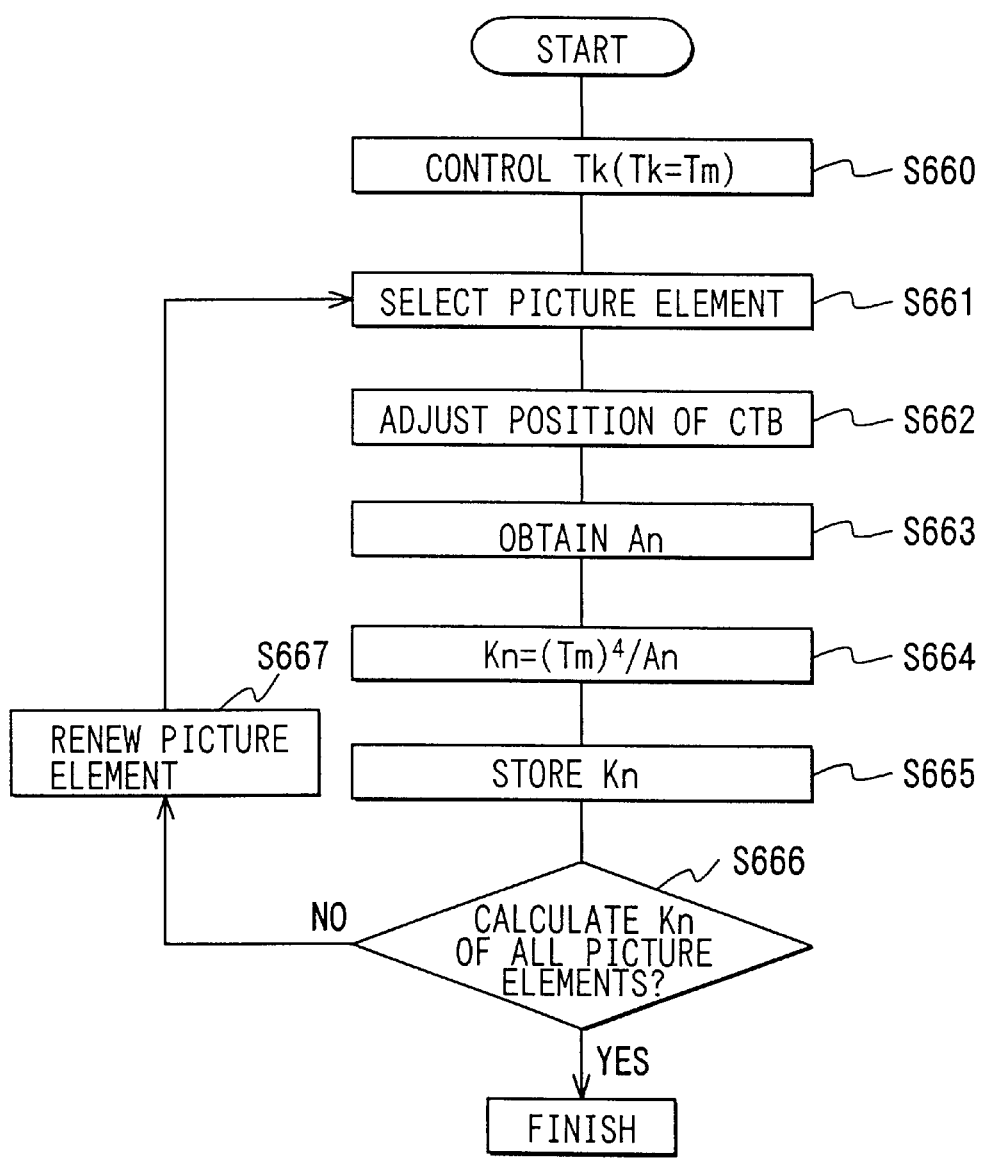
FIG. 44 is a flow diagram showing a control process performed in a signal processing circuit, according to the nineteenth embodiment.

A nineteenth embodiment illustrated in FIG. 43 and in FIG. 44 will be now described. When the face section M3 of the driver M is included as a temperature detection object of the non-contact temperature sensor 70, the nineteenth embodiment illustrates an output detection method of the non-contact temperature sensor 70 to be performed before assembling the non-contact temperate sensor 70 to a vehicle. In the nineteenth embodiment, the other parts are the same as those of the fourteenth embodiment.

In FIG. 43, a detection region 160 of the non-contact temperature sensor 70 is divided, for example, into 96 picture elements of 8 lines and 12 columns (rows), conversion coefficients Kn (i.e., n=1–96) relative to output signals An (i.e., n=1–96) for every respective picture elements are obtained, as described later. The conversion coefficients Kn correct the dispersion of the output of every respective picture elements, and are coefficients for converting outputs of every respective picture elements for a value corresponding to the temperature.

On the other hand, a constant temperature body (reference temperature detecting member, CTB) 180 used for the output detection of the non-contact temperature sensor 70, is possible to be set in a predetermined constant temperature, and is constructed to be position-adjustable. The constant temperature body (CTB) 180 is set to have the same size as that of the face section of a person, further, emissivity of the infrared rays of the constant temperature body 180 is adjusted so as to be equal to that of the skin of the face section of the person.

Next, an output detecting method of the non-contact temperature sensor 70 will be explained based on FIG. 44. Firstly, a temperature Tk of the constant temperature body (CTB) 180 is controlled at step S660 to the same temperature as a skin temperature Tm (For example 33° C.) of the face section of the person, and one picture element is selected to perform a detection at step S661.

A position of the constant temperature body (CTB) 180 is adjusted at step S662 so that a central section (section drawn oblique lines in FIG. 43) of the constant temperature body 180 is set at a position of the picture element selected at step S661. Next, the output signal An of the picture element is obtained at step S663 by the non-contact temperature sensor 70.

Next, the conversion coefficients Kn are calculated at step S664. Here, a radiant quantity Hm of an infrared ray of the person is obtained by a formula $Hm = \sigma \cdot \alpha \cdot (Tm)^4$, and a radiant quantity Hk of an infrared ray of the constant temperature body 180 is obtained by a formula $Hk = \sigma \cdot \beta \cdot (Tk)^4$. Here, symbol $\sigma$ denotes a Boltzmann's constant, symbol $\alpha$ denotes the emissivity of an infrared ray for the face section of the person, and symbol $\beta$ denotes the emissivity of an infrared ray of the constant temperature body 180. However, in the formula, symbols Tm and Tk denote the absolute temperatures.

The output single An is proportioned to a radiant quantity of the infrared ray. Further, in the nineteenth embodiment, since $\alpha = \beta$, an output signal An obtained when the temperature Tk of the constant temperature body 180 is 33° C. is equal to an output signal An when the temperature Tm of the person is 33° C. From the relationship described above, at step S664, based on a formula $Kn = Tm^4/An$, the conversion coefficients Kn are calculated. After the non-contact temperature sensor 70 is assembled to a vehicle, based on a formula $Tm = (Kn \cdot An)^{1/4}$, the skin temperature Tm is calculated.

The conversion coefficients Kn obtained at step S664 are stored in the RAM 251 (refer to FIG. 34) at step S665.

When the conversion coefficient Kn for the entire 96 picture elements are not calculated (result at step S666 is NO), the picture element is renewed at step S667, controls from step S661 to step S665 are repeated until a result at step S666 is converted into YES, and the conversion coefficients Kn (Kn=K1–K96) for the entire picture elements are obtained.

According to the nineteenth embodiment, since detection of an output value of the non-contact temperature sensor 70 before the non-contact temperature sensor 70 is located on a vehicle, is conducted by utilizing the constant temperature body 180 set with the same size as the face of a person. Accordingly, when the skin temperature of a passenger, after assembling of the non-contact temperature sensor 70 on a vehicle, is detected, a deviation of the output value due to a blur of an optical system can be minimized, and the skin temperature of the passenger can be accurately measured.

Further, the emissivity of the infrared ray of the constant temperature body 180 is set to be equal to the emissivity of the infrared ray of the skin of the person, and the temperature of the constant temperature body 180 at the time of detection is made to be equal to the skin temperature of the person that is an actual temperature detecting subject. Therefore, a temperature detection accuracy at an actually used temperature area (in the vicinity of skin temperature of passenger) can particularly elevated.

The size of the constant temperature body 180 may well substantially the same as size of the face section of the person. The size of the face section (excluding head section) of a child viewed from the front is about 10 cm×10 cm, the size of the face section of an adult viewed from the front is about 20 cm×20 cm. In the nineteenth embodiment, the range of 10 cm×10 cm–20 cm×20 cm is used as a range with the size substantially equal to the face section of the person.

In the nineteenth embodiment, the emissivity of the infrared ray of the constant temperature body 180 can be set to be substantially equal to the emissivity of the infrared ray of the skin of the person. Further in the present specification, a range of ±5% of the emissivity of the infrared ray of the skin of the person is determined as the range substantially equal to one another.

(Twentieth Embodiment)

Figure 45:
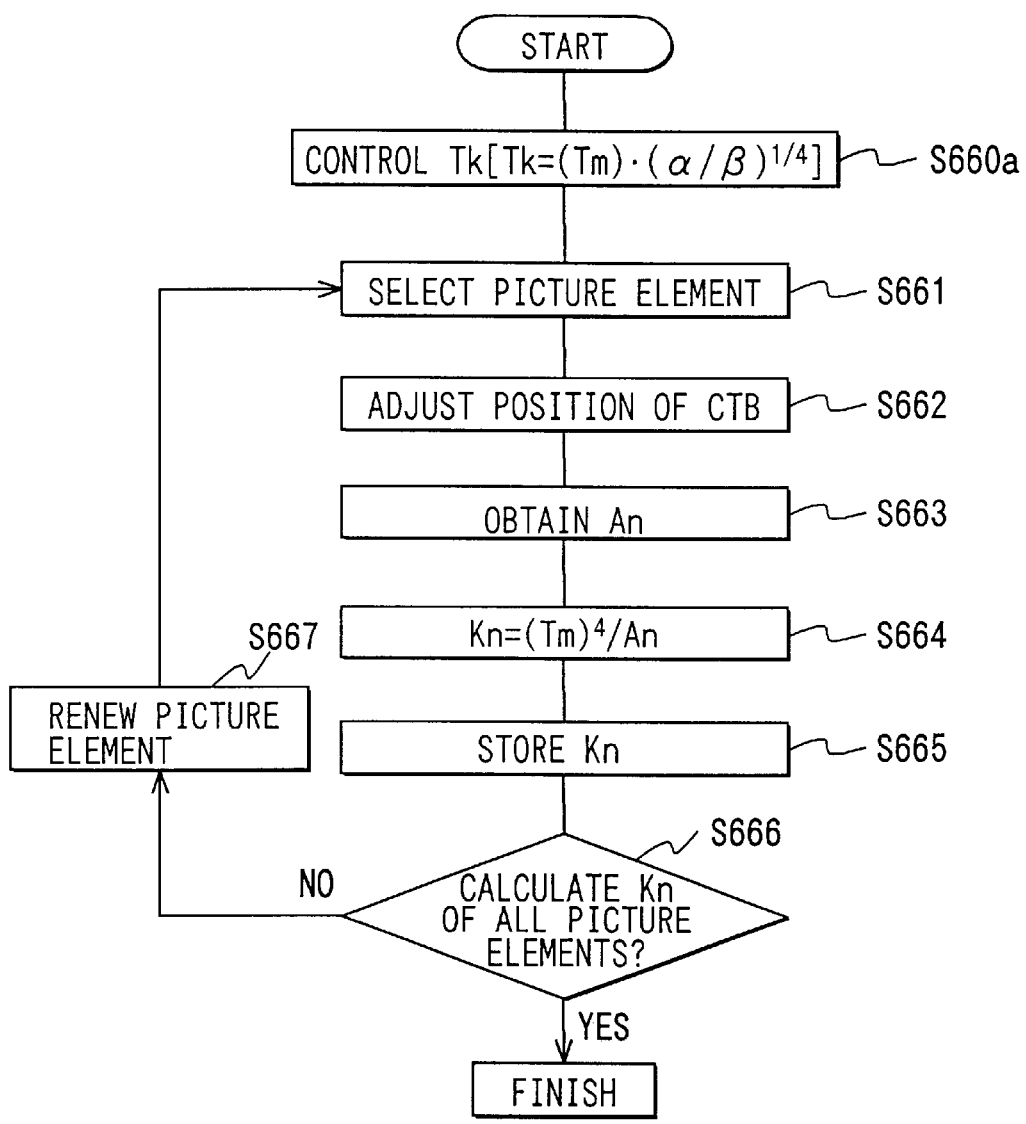
FIG. 45 is a flow diagram showing a control process performed in a signal processing circuit, according to a twentieth preferred embodiment of the present invention.

In the above-described nineteenth embodiment, an output detecting method when the emissivity of the infrared ray of the constant temperature body 180 is equal to that of a person is described. However, in the twentieth embodiment illustrated in FIG. 45, an output detecting method, when the emissivity $\beta$ of the infrared ray of the constant temperature body 180 (refer to FIG. 43) is different from the emissivity a of the infrared ray of the person, is illustrated. Accompanied with the difference of the emissivity of the infrared ray, step S660 of the nineteenth embodiment is changed to step S660a in the twentieth embodiment, as illustrated in FIG. 45. The other parts of the twentieth embodiment are the same as the those of the nineteenth embodiment.

At step S660 of the nineteenth embodiment, relative to a manner that the temperature Tk of the constant temperature body 180 is controlled to the same temperature as the skin temperature Tm of the person, at step S660a of the twentieth embodiment, the temperature Tk of the constant temperature body 180 is controlled to a temperature obtained by a formula $Tk = (TM) \cdot (\alpha/\beta)^{1/4}$. Accordingly, the radiant quantity Hk of the infrared ray of the constant temperature body 180 can be made equal to the radiant quantity Hm of the infrared ray of the person.

As described above, after controlling the temperature of the constant temperature body 180 at step 660a, the program is advanced to step S661, and thereafter, the conversion coefficients Kn of the entire picture elements are obtained similarly to the above-described nineteenth embodiment. After the non-contact temperature sensor 70 is assembled to a vehicle, the skin temperature Tm is calculated based on a formula $Tm = (Kn \cdot An)^{1/4}$.

According to this embodiment, even when the emissivity $\beta$ of the infrared ray of the constant temperature body 180 is different from the emissivity a of the infrared ray from the skin of the person, since the radiant quantity Hk of the infrared ray of the constant temperature body 180 is made equal to the radiant quantity Hm of the infrared ray of the person, the output value of the non-contact temperature sensor 70 at a time of detection can be made approximately equal to the output value when the skin temperature of person is detected. Accordingly, the temperature detecting accuracy in the actually used temperature area (in the vicinity of the skin temperature of passenger) can be elevated.

Similarly to the nineteenth embodiment, in this twentieth embodiment, the range of ±5% of the radiant quantity Hm of the infrared ray of the person is determined as the range substantially equal to one another.

(Twenty-first Embodiment)

Figure 46:
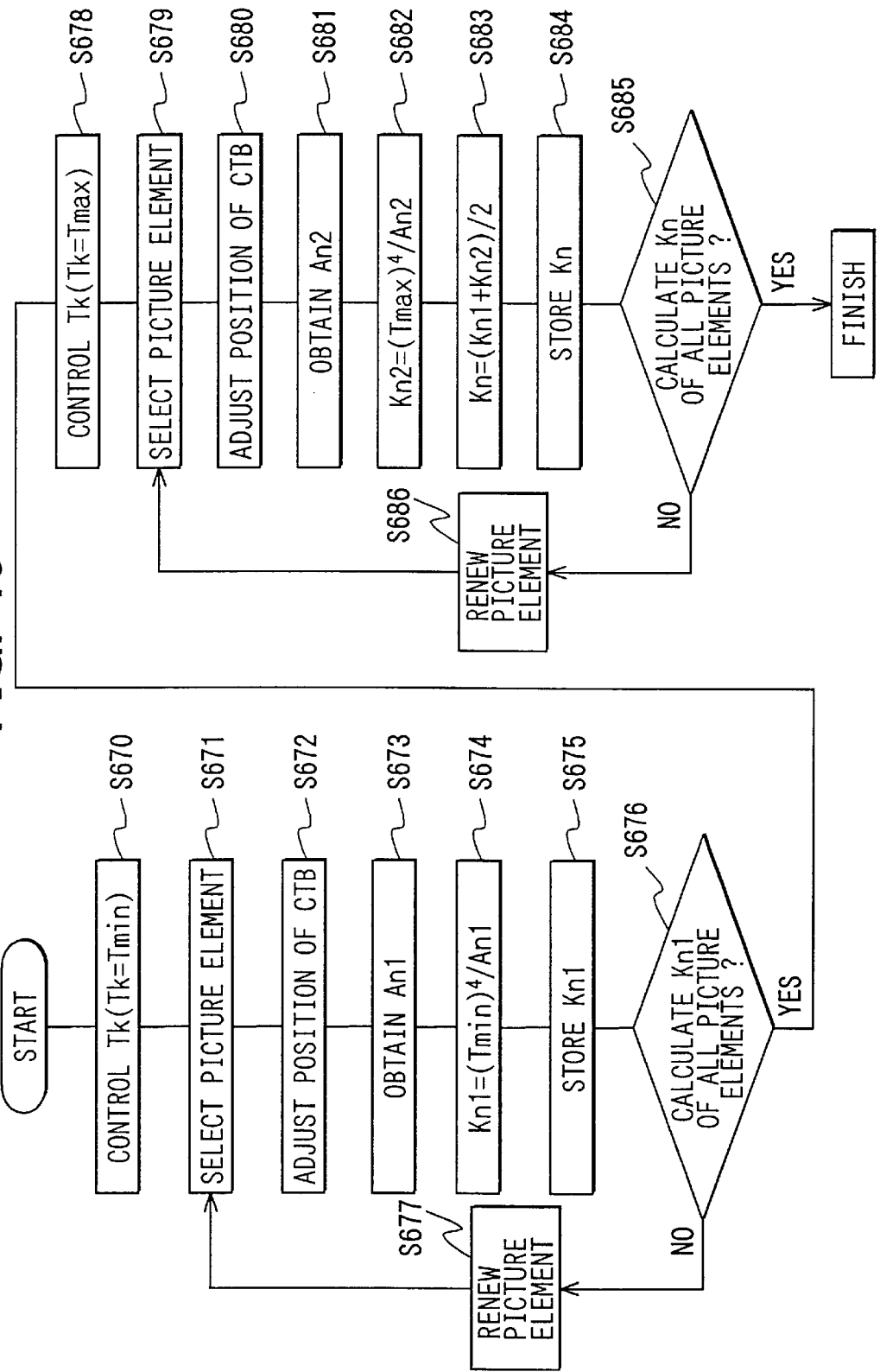
FIG. 46 is a flow diagram showing a control process performed in a signal processing circuit, according to a twenty-first preferred embodiment of the present invention.

A twenty-first embodiment illustrated in FIG. 46 will be now described. In the above-described nineteenth embodiment, the output detection is performed by setting the one-point temperature of the constant temperature body 180. However, in the twenty-first embodiment, the output detection is performed by setting two-point temperatures of the constant temperature body 180. The other parts of the twenty-first embodiment are the same as those of the nineteenth embodiment.

Next, an output detection method of the non-contact temperature sensor 70 (refer to FIG. 43) will be explained based on FIG. 46. Firstly, when the fluctuation range of the skin temperature of the face section of the person is set in a range of 30–35° C., the temperature Tk of the constant temperature body 180 is controlled at step S670 to the minimum skin temperature Tmin (=30° C.) of the face section.

Next, one picture element is selected at step S671 for performing detection, the position of the constant temperature body (CTB) 180 is adjusted at step S672 so that the central section (section drawn oblique lines in FIG. 43) of the constant temperature body 180 is set to a position of the picture element selected at step S671, and a first output signal An1 of the picture element position at a time Tk=Tmin is obtained at step S673.

Next, a first conversion coefficient Kn1 is calculated at step S674 based on a formula of Kn1=(Tmin)$^4$/An1, and this first conversion coefficient Kn1 is stored at step S675 in the RAM 251 (refer to FIG. 34).

When the conversion coefficients Kn for the entire 96 picture elements are not calculated at step S676, the picture element is renewed at step S677, and the controls of steps S671–S675 are repeated until the conversion coefficients Kn for the entire 96 picture elements are calculated at step S676, so that the first conversion coefficients Kn1 of the entire picture elements are obtained.

When the first conversion coefficients Kn1 of the entire picture elements are obtained, the temperature Tk of the constant temperature body 180 is controlled at step S678 to the maximum skin temperature Tmax (e.g., 35° C.) of the face section. An another one picture element is selected at step S679 to perform detection, the position of the constant temperature body (CTB) 180 is adjusted at step S680 so that the central section of the constant temperature body 180 is set to a position of the picture element selected at step S679, a second output signal An2 of the picture element position in time Tk=Tmax is obtained at step S681.

Next, the second conversion coefficients Kn2 are calculated at step S682 based on a formula of Kn2=(Tmax)$^4$/An2. Thereafter, the conversion coefficients Kn are calculated at step S683 based on a formula Kn=(Kn1+Kn2)/2, and this conversion coefficients Kn are stored at step S684 in the RAM 251 (refer to FIG. 34).

When the conversion coefficients Kn for the entire 96 picture elements are not calculated (result at step S685 is NO), the picture element is renewed at step S686, the controls at steps S676–S684 are repeated until the result at step S685 becomes YES, and the conversion coefficients Kn of the entire picture elements are obtained. Accordingly, after the non-contact temperature sensor 70 is assembled to a vehicle, the skin temperature Tm is calculated based on the formula of Tm=(Kn·An)$^{1/4}$.

According to the twenty-first embodiment, the output detection is performed by setting the temperature of the constant temperature body 180 at two points of the minimum skin temperature and the maximum skin temperature. Therefore, the temperature detecting accuracy within the fluctuation range of the skin temperature of the face section can be particularly elevated.

In the twenty-first embodiment, conversion coefficients Kn obtained by the formula of Kn=(Kn1+Kn2)/2 is utilized for the calculation of the skin temperature Tm after the non-contact temperature sensor 70 is assembled to a vehicle. However, in a region where the skin temperature Tm is close to the minimum skin temperature Tmin, the skin temperature Tm may be calculated by utilizing the first conversion coefficient Kn1. Further, in a region where the skin temperature Tm is close to the maximum skin temperature Tmax, the skin temperature Tm may well be calculated by utilizing the second conversion coefficient Kn2.

(Twenty-second embodiment)

Figure 47:
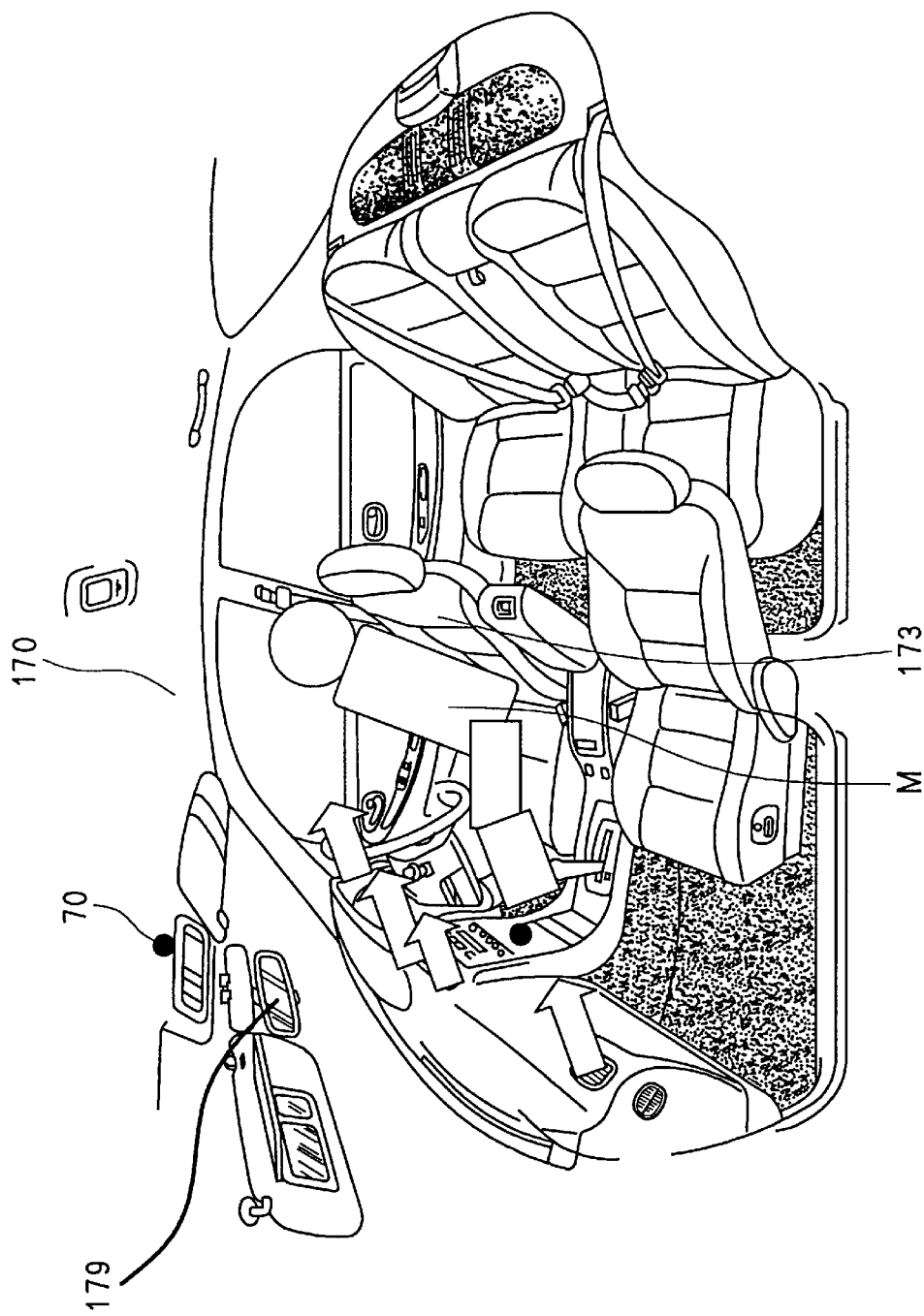
FIG. 47 is a schematic diagram of a passenger compartment, showing an arrangement position of a non-contact temperature sensor, according to a twenty-second preferred embodiment of the present invention.

A twenty-second embodiment of the present invention will be explained based on FIG. 47–FIG. 51. FIG. 47 illustrates an inside of a passenger compartment of a vehicle. As shown in FIG. 47, a non-contact temperature sensor 70 for detecting, in a non-contact state, a surface temperature of the driver (passenger) M and on a periphery of the driver M is installed in a ceiling 170 on the neighborhood of a rear view mirror 179. That is, the non-contact temperature sensor 70 is disposed to detect the temperature from an oblique front forward of the driver M.

Figure 48:
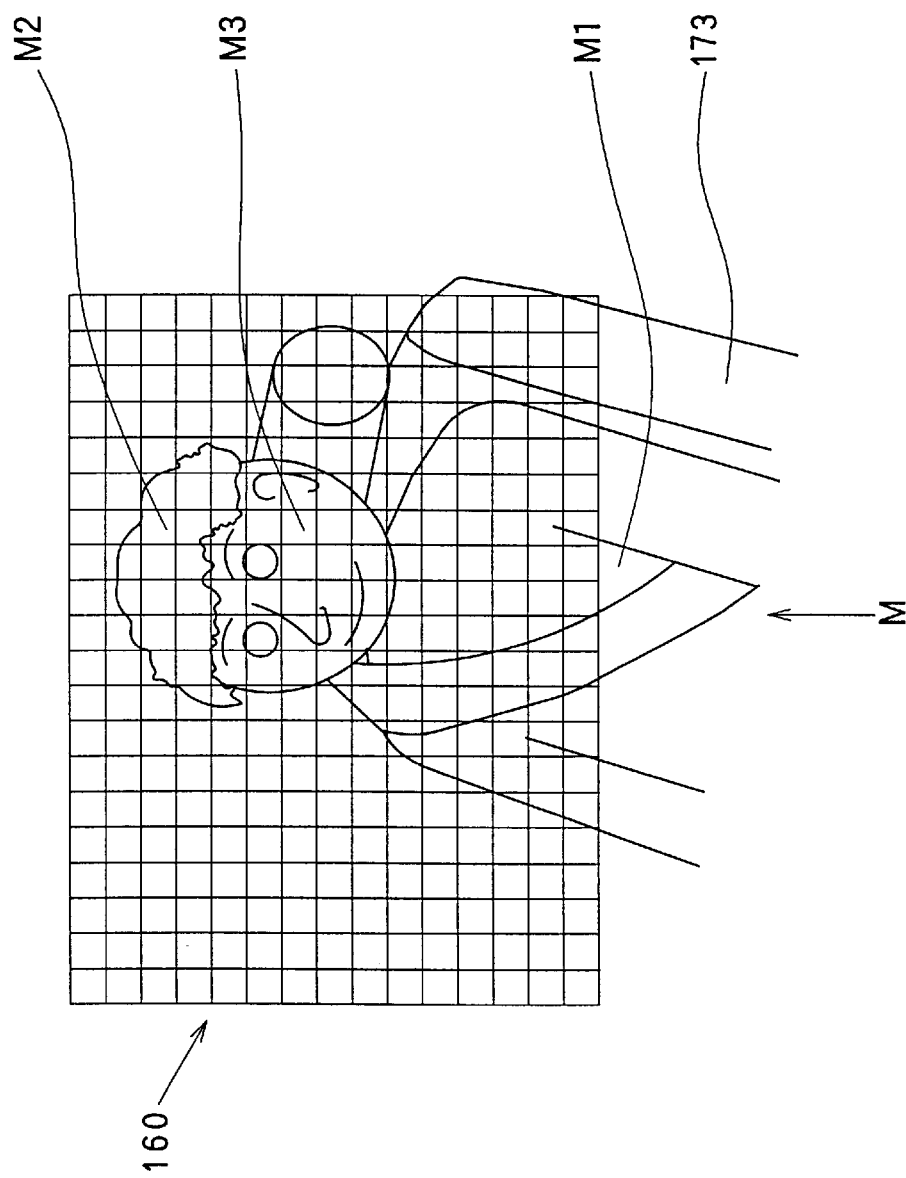
FIG. 48 is a view showing a temperature detecting region of the non-contact temperature sensor, according to the twenty-second embodiment.

FIG. 48 illustrates a detection region 160 of the surface temperature by the non-contact temperature sensor 70. As shown in FIG. 48, the upper half body (wearing section) M1 of the driver M, the head section M2, the face section M3, and the seat 173 of the driver are included in the detection region 160.

The non-contact temperature sensor 70 has a number of temperature detecting elements arranged in a shape of a matrix. Accordingly, as illustrated in FIG. 49, the detecting region 160 of the surface temperature due to the non-contact temperature sensor 70 is divided into plural picture elements, and the temperature for each picture element is detected by the non-contact temperature sensor 70.

In the twenty-second embodiment, the non-contact temperature sensor 70 is an infrared sensor generating an electric signal (surface temperature signal) corresponding to an amount of an infrared ray radiated from a temperature detecting subject. More specifically, the sensor 70 is an infrared sensor using a thermo-pile type temperature detecting element that generates electromotive force proportioned to the amount of the infrared ray.

Figure 49:
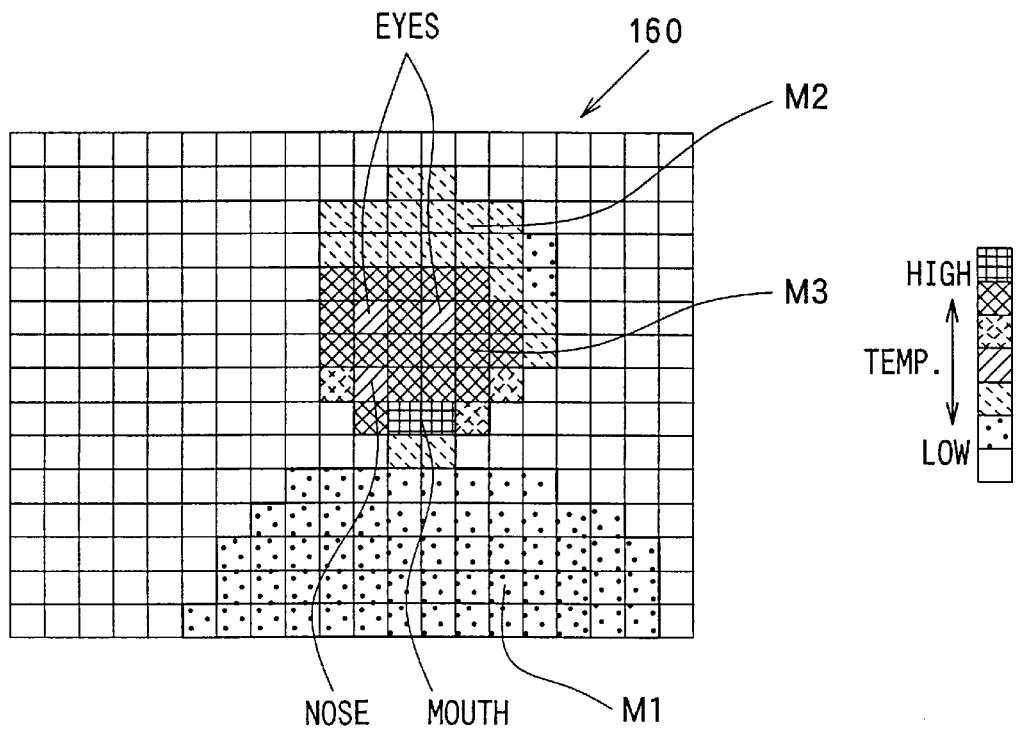
FIG. 49 is a view showing a temperature distribution of the temperature detecting region of the non-contact temperature sensor, according to the twenty-second embodiment.
Figure 50:
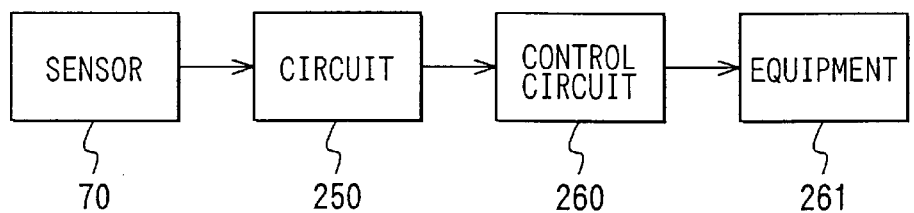
FIG. 50 is a schematic diagram of a vehicle air conditioning system including the non-contact temperature sensor, according to the twenty-second embodiment.

A signal processing circuit 250 illustrated in FIG. 50 processes output signals of the non-contact temperature sensor 70 and obtains a temperature distribution map of the detection region 160 as illustrated in FIG. 49. In FIG. 49 a temperature distribution is illustrated, for convenience sake, by classifying into every temperature area. However, actually, temperature data of each picture element is stored after being numerized, and a calculation is performed based on the numerized temperature data. A control circuit 260 controls an operation of an equipment 261 such as an air conditioning system for a vehicle, based on temperature data from the signal control circuit 250 and the other signals.

Figure 51:
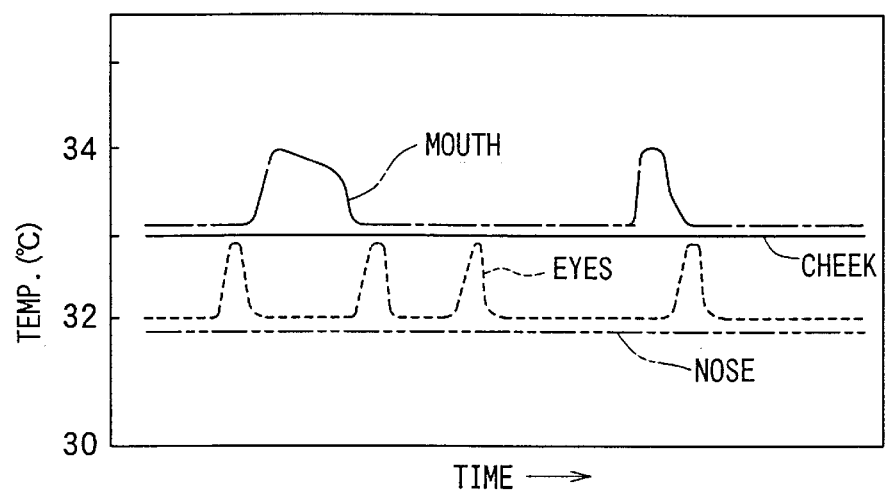
FIG. 51 is a characteristic view showing a temperature change of each specific position of a passenger, according to the twenty-second embodiment.

FIG. 51 illustrates, on conditions that an air temperature inside the passenger compartment is controlled at about 25° C. and that the driver is not exposed to solar radiation, an example of the skin temperature of the head section M2 and the face section M3 of the driver M, and average temperature of the face section M3 excluding eyes, a mouth and a nose is about 33° C.

A temperature of the eyes inside the face section M3, when both the eyes are opened, is about 32° C. which is lower than the average temperature of the face section M3 by about 1° C. On the other hand, the temperature of the eyes inside the face section M3, when both the eyes are closed, is about 33° C. which is equal to the average temperature of the face section M3. Accordingly, the temperature of the eyes changes according to a blink. FIG. 49 illustrates the temperature distribution map when both eyes are opened.

As far a temperature of the mouth, when the mouth is opened, the temperature is about 34° C. On the other hand, when the mouth is closed, the temperature of the mouth is about 33° C. which is equal to an average temperature of the face section M3. In the meantime, FIG. 49 illustrates the temperature distribution map when the mouth is opened, so that the mouth is at the highest temperature. Moreover, a temperature of the nose, is lower than the average temperature of the face section M3 by about 1° C., and is about 32° C., that is substantially constant.

A control process of the output signal of the non-contact temperature sensor 70, executed in the signal control circuit 250, will be explained.

Firstly, the output signal (temperature data) of the non-contact temperature sensor 70 is processed, the temperature distribution map of the detection region 160 as illustrated in FIG. 49 is obtained, and the position of the face section M3 is estimated within the temperature distribution map. Here, excluding a case where an inside air temperature is extremely high such as cool down time in summer season, among the detection region 160, the face section M3 that is a skin exposed section becomes the highest temperature. Thus, within the temperature distribution map of FIG. 49, a vicinity of portions where plural high temperature picture elements are concentrated are determined as picture element positions of the face section M3.

Next, a position of each specific portion within the face section M3 is estimated. Firstly, the position of the eyes is estimated as stated below. As illustrated in FIG. 51, the temperature of the eyes changes according to a blink between about 32° C. and about 33° C. Thus, in an upper section area of the temperature distribution map of the face section M3 already estimated, a portion where normally at a temperature of 32° C. and periodically to become 33° C. is determined as the picture element positions of the eyes.

The position of the mouth is estimated as stated below. As illustrated in FIG. 51, the temperature of the mouth is at about 34° C. when the mouth is opened. On the other hand, when the mouth is closed, the temperature of the mouth is about 33° C. Thus, in the lower section area of the temperature distribution map of the face section M3 already estimated, a portion where a temperature fluctuates between about 33° C.–34° C., is determined as the picture element positions of the mouth.

The position of the nose is estimated as stated below. As illustrated in FIG. 51, the temperature of the nose is lower than the average of the temperature of the face section M3, and is substantially constant of about 32° C. Thus, at substantially a center section in a vertical direction of the temperature distribution map of the face section M3 already estimated, a portion where the temperature thereof is about 32° C. and is substantially constant is determined as the picture element position of the nose.

Furthermore, from a positional relationship of the eyes, the mouth, and the nose estimated as described above, the position of the cheek is estimated using any one of the following methods.

For example, in the picture element positions of the face section M3 estimated, a portion positioned below an eye is determined as the picture element positions of the cheek. Alternatively, in the picture element positions of the face section M3 estimated, portions positioned left and right of the nose are determined as the picture element positions of the cheeks. Inside of the picture element positions of the face section M3 estimated, portions positioned above the mouth can be determined as the picture element positions of the cheeks. Furthermore, in the picture element position of the face section M3 estimated, portions between the eyes and the mouth, positioned left and right of the nose, may be determined as the picture element positions of the cheeks.

The signal processing circuit 250 after estimating the picture element positions of the specific portions (eyes, mouth, nose, and cheeks) of the face section M3 or in the face section M3 as described above, average temperature data of the face section M3 and the temperature data of each specific portion in the face section M3 are transmitted to the control circuit 260. The control circuit 260 adjusts a blow-out air direction, a blow-out air amount, a blow-out air temperature, and the like based on the temperature data or the like.

According to the twenty-second embodiment, from the point that the temperature of the eyes and the mouth fluctuates in a predetermined temperature range, positions of the eyes and the mouth are estimated based on a temperature change of the position of the face section M3 estimated. Therefore, the positions of the eyes and the mouth within the temperature distribution map can be accurately estimated.

Further from the point that the temperature of the nose is lower than the average temperature of the face section M3 and is substantially constant, the position of the nose is estimated based on the temperature distribution of the position of the face section estimated. Therefore, the position of the nose within the temperature distribution map can be accurately estimated. In addition, since the positions of the cheeks are estimated from the positional relationship of the eyes, the mouth, and the nose estimated described above, the positions of the cheeks within the temperature distribution map can be accurately estimated.

(Twenty-third Embodiment)

Figure 52:
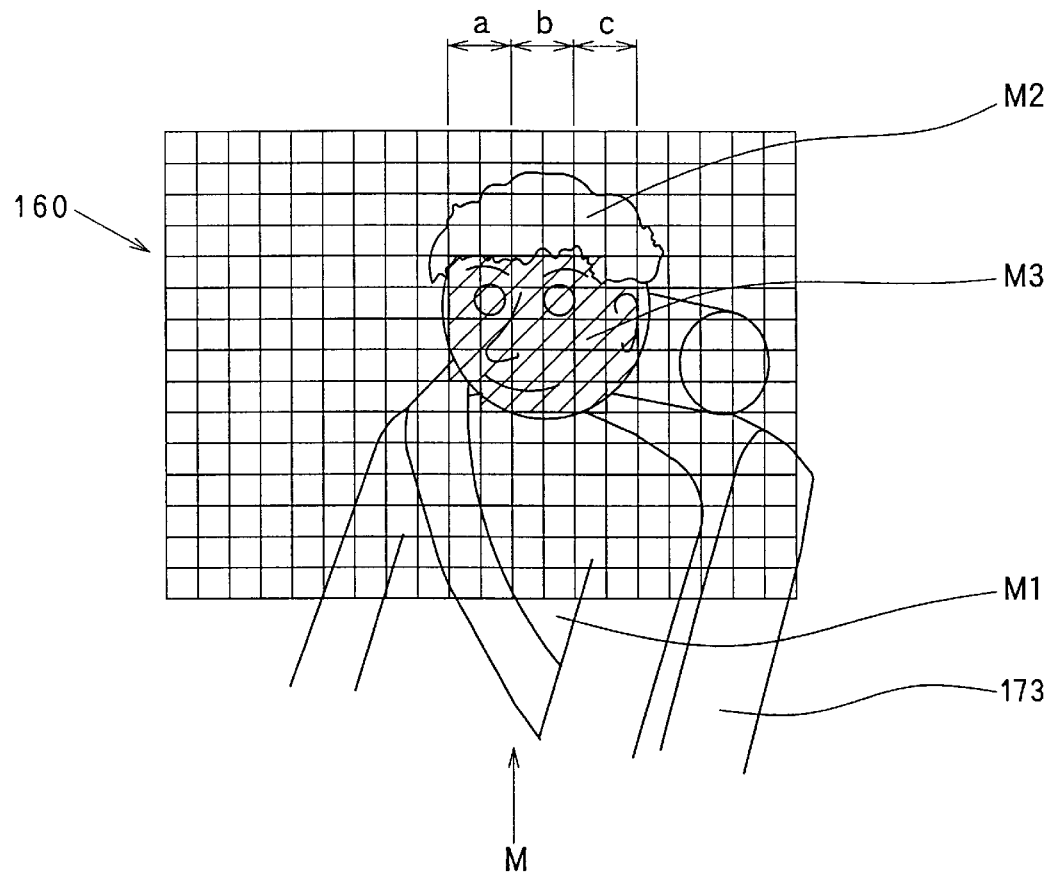
FIG. 52 is a view showing a temperature detecting region of a non-contact temperature sensor, according to a twenty-third embodiment of the present invention.

The twenty-third embodiment will be explained with reference to FIG. 52. In the twenty-third embodiment, only the method for estimating the positions of the cheeks within temperature distribution map is different from the twenty-second embodiment, and the other parts are similar to those of the above-described twenty-second embodiment.

In this embodiment, firstly, within the temperature distribution map, a vicinity of a portion where plural pieces of high temperature picture elements are concentrated is determined as picture element positions of the face section M3, next, temperature data of the portion of the highest temperature section in the vicinity (in the vicinity of face position) of the portion where the pieces of the high temperature picture elements are concentrated is read in, and thereafter, the temperature of the highest temperature section is set as a peek temperature Tp. Further, a portion where the temperature data having a range (Tp–2° C.)–Tp is continued, is estimated as a range of the face section M3. In FIG. 52, the portion with the hatching is the range of the face section estimated described above.

Next, the range of the face section M3 estimated is laterally three sectioned as illustrated by portions "a", "b", and "c", and among these three sectioned portions, the left and right portions "a" and "c" are estimated as the positions of the cheeks.

In the above-described twenty-second and twenty-third embodiments, when a high temperature object whose temperature is higher than the skin temperature is determined based on the temperature distribution map to be moved in the detection region 160, the high temperature object is estimated as a cigarette or a warm drink. In this case, from the position of the high temperature object, the position of the face section M3 or the position of the mouth in the temperature distribution map can be estimated. Alternatively, when a low temperature object whose temperature is lower than the skin temperature is determined to be moved in the detection region 160, the low temperature object is estimated as an ice bar or a cold drink. In this case, from the position of the low temperature object, the position of the face section M3 or the position of the mouth in the temperature distribution map can be estimated. By concurrently utilizing the method of estimation due to the high/low temperature object and the method of estimation described in the twenty-second and twenty-third embodiments described above, the position of the face section M3 and that of the mouth can be accurately estimated.

In the above-described twenty-second and twenty-third embodiments, as the non-contact temperature sensor, the infrared sensor utilizing the thermo-pile type detecting element is illustrated. However, the infrared sensor utilizing a bolometer type detecting element constructed by a resistance having a large temperature coefficient or the infrared sensor of other type can be utilized. Not necessary the infrared sensor, other type of non-contact temperature sensor for detecting the surface temperature of temperature detecting subject in non-contact state can be used.

In the above-described twenty-second embodiment, although the non-contact temperature sensor 70 is arranged in the ceiling 170 around the rear view mirror 79 and detects the temperature from the oblique forward of the driver M. However, the non-contact temperature sensor 70 is arranged in the vicinity of substantially at center section in a longitudinal direction and in a width direction of the vehicle in the ceiling 170, and the temperature may be detected from substantially and directly sideward of the driver M. Further, the non-contact temperature sensor 70 is arranged in the vicinity of substantially at center section in the width direction of the vehicle in the ceiling 170, and in a slightly forward from the directly sideward of the driver M. In this case, one side of the face section of the driver M may be used so that the temperature of the one side of the face section is directly detected, and the temperature of the other side of the face section M3 may be observed by utilizing the reflection on the window glass.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioning system for a vehicle having a passenger compartment, comprising:

a non-contact temperature sensor with a plurality of temperature detecting elements, the non-contact temperature sensor being disposed to detect a predetermined region within the passenger compartment in a non-contact state using the temperature detecting elements; and a control unit for controlling an air-conditioning state to be introduced into the passenger compartment based on a temperature signal from the non-contact temperature sensor, wherein the temperature detecting elements include a plurality of first elements each of which has a first temperature detecting area in the predetermined region, and a plurality of second elements each of which has a second temperature detecting area larger than the first temperature detecting area in the predetermined region.

2. The air conditioning system according to claim 1, wherein:

when a passenger is seated on a seat in the passenger compartment, the predetermined region includes the face portion of the passenger and a part around the face portion; and the non-contact temperature sensor is disposed to detect temperature of the face portion of the passenger using the first elements and to detect temperature of the part around the face portion using the second elements.

3. The air conditioning system according to claim 1, wherein:

when a passenger is seated on a seat in the passenger compartment, the predetermined region includes the face portion of the passenger and a part around the face portion; and the non-contact temperature sensor is disposed to detect temperature of the face portion of the passenger using the first elements and to detect temperature of an entire area of the predetermined region using the second elements.

4. The air conditioning system according to claim 1, wherein the non-contact temperature sensor includes direction adjusting means for adjusting a temperature detection direction of the first elements.

5. The air conditioning system according to claim 1, wherein:

the non-contact temperature sensor is an infrared sensor which generates an electrical signal in accordance with an amount of infrared rays;

the non-contact temperature sensor has a lens disposed opposite to the second elements, and a mirror disposed between the lens and the second elements; and the first elements are disposed at a position cross at a right angle with a line connecting the second elements and the lens.

6. The air conditioning system according to claim 5, wherein:

the mirror is disposed to be rotatable around a rotation shaft; and the mirror is a half mirror through which a part of infrared rays from the lens passes.

7. The air conditioning system according to claim 1, wherein the temperature detecting elements are disposed in a matrix shape.

8. The air conditioning system according to claim 1, wherein the non-contact temperature sensor includes a first sensor member with the first elements, for detecting temperature in each first temperature detecting area, and a second sensor member with the second elements, for detecting temperature in each second temperature detecting area.

9. The air conditioning system according to claim 1, wherein:

when a passenger is seated on a seat in the passenger compartment, the predetermined region includes the face portion of the passenger and a part around the face portion; and the non-contact temperature sensor is disposed in such a manner that the face portion and a glass portion of the vehicle are overlapped from each other when being viewed from a position of the non-contact sensor to the predetermined region.

10. The air conditioning system according to claim 9, wherein the predetermined region includes a plurality of passengers seated on different seats in the passenger compartment.

11. The air conditioning system according to claim 10, wherein:

the non-contact temperature sensor is disposed in the passenger compartment at one side in a vehicle width direction;

the control unit calculates a size of the face portion from the temperature signals of the non-contact temperature sensor; and the control unit determines a seating position of a passenger based on the size of the face portion.

12. The air conditioning system according to claim 9, wherein:

the control unit determines whether or not a moving object exists in the passenger compartment based on a change of the temperature signal from the non-contact temperature sensor; and the control unit determines whether or not the moving object is the passenger, based on the temperature signal from the non-contact temperature sensor, at a position corresponding to a position of the moving object.

13. The air conditioning system according to claim 9, wherein:
the control unit controls temperature inside the passenger compartment to a set temperature; and
the control unit determines a seating position of the passenger based on the temperature signal from the non-contact temperature sensor, after the temperature inside the passenger compartment becomes approximately equal to the set temperature.

14. The air conditioning system according to claim 1, wherein:
the control unit includes specific region detecting means for detecting a specific region where temperature is out of a predetermined temperature range among the predetermined region, and disturbance determining means which determines that there is a disturbance when the specific region moves in the predetermined region with an elapsed time.

15. The air conditioning system according to claim 1, wherein:
the control unit includes specific region detecting means for detecting a specific region where temperature is out of a predetermined temperature range among the predetermined region, and disturbance determining means which determines that there is a disturbance when number of the temperature detecting elements in the specific region is less than a predetermined number.

16. The air conditioning system according to claim 14, wherein
when the disturbance determining means determines the disturbance, the control unit controls the air-conditioning state based on the temperature signal of the non-contact temperature sensor before the determination of the disturbance.

17. The air conditioning system according to claim 14, wherein:
the control unit calculates a target temperature of air blown into the passenger compartment based on the temperature signal from the non-contact temperature sensor; and
when the disturbance determining means determines the disturbance, the control unit controls the air-conditioning state based on the target temperature before the determination of the disturbance.

18. The air conditioning system according to claim 14, wherein the predetermined temperature range is a range between a first temperature which is lower than the mean temperature of the predetermined region by a predetermined value and a second temperature which is higher than the mean temperature of the predetermined region by a predetermined value.

19. The air conditioning system according to claim 14, wherein the predetermined temperature range is a range between first and second set temperatures that are set for controlling the air-conditioning state.

20. The air conditioning system according to claim 1, further comprising:
a reference member disposed in the predetermined region to be set at a predetermined temperature;
storing means for storing an initial output value of the non-contact temperature sensor, obtained by detecting temperature of the reference member at an initial time; and correction coefficient determining means for determining a correction coefficient of a present output value of the non-contact temperature sensor by comparing the present output value and the initial output value, the present output value being obtained by detecting temperature of the reference member at the present time.

21. The air conditioning system according to claim 20, wherein:
the reference member is disposed at a specific position in the predetermined region; and
the specific position includes at least one of a seat and a seat belt within the predetermined region.

22. The air conditioning system according to claim 20, wherein the reference member has a size approximately equal to that of the face portion.

23. The air conditioning system according to claim 20, wherein:
the non-contact temperature sensor changes the output value in accordance with an amount of infrared rays; and
an emissivity of the infrared rays from the reference member is set to be approximately equal to an emissivity of the infrared rays from the skin of the passenger.

24. The air conditioning system according to claim 20, wherein the temperature of the reference member is set to be approximately equal to that of the skin of the passenger.

25. The air conditioning system according to claim 20, wherein the temperature of the reference member is set to become approximately one of a highest temperature and a lowest temperature of the skin of the passenger.

26. The air conditioning system according to claim 1, wherein:
when a passenger is seated on a seat in the passenger compartment, the predetermined region includes the face portion of the passenger and a part around the face portion;
the control unit forms a temperature distribution map of the face portion and the part around the face portion based on temperature signals from the temperature detecting elements of the non-contact temperature sensor;
the control unit estimates a position of the face portion within the temperature distribution map; and
the control unit estimates a position of a specific portion within the face portion based on a temperature change in the estimated position of the face portion.

27. The air conditioning system according to claim 26, wherein the control unit estimates that a position, where temperature changes in an upper area of the temperature distribution map within the face portion, is of the eyes of the face portion.

28. The air conditioning system according to claim 27, wherein the control unit estimates positions of the cheeks of the face portion in the temperature distribution map from the positions of the eyes.

29. The air conditioning system according to claim 26, wherein the control unit estimates that a position, where temperature changes in a lower area of the temperature distribution map within the face portion, is of the mouse of the face portion.

30. The air conditioning system according to claim 29, wherein the control unit estimates positions of the cheeks of the face portion in the temperature distribution map from the estimated position of the mouth.

31. The air conditioning system according to claim 1, wherein:

when a passenger is seated on a seat in the passenger compartment, the predetermined region includes the face portion of the passenger and a part around the face portion;

the control unit forms a temperature distribution map of the face portion and the part around the face portion based on temperature signals from the temperature detecting elements of the non-contact temperature sensor;

the control unit estimates a position of the face portion within the temperature distribution map; and the control unit estimates a position of a specific portion within the face portion based on a temperature distribution in the estimated position of the face portion.

32. The air conditioning system according to claim 31, wherein the control unit estimates that a position at an approximate center of the face portion, with a temperature lower than an average temperature of the temperature distribution of the face portion, is of the nose of the face portion.

33. The air conditioning system according to claim 32, wherein the control unit estimates positions of the cheeks of the face portion in the temperature distribution map from the position of the nose.

34. The air conditioning system according to claim 26, wherein when a highest temperature in the estimated position of the face portion is Tp, the control unit estimates that a portion where temperature is continued in a range of (Tp−2° C.)–Tp is an area of the face portion.

35. The air conditioning system according to claim 34, wherein the control unit divides the area of the face portion into three parts in a lateral direction, and determines that both side parts in the lateral direction are the cheeks of the face portion.

36. An air conditioning system for a vehicle having a passenger compartment, comprising:

a non-contact temperature sensor having a plurality of temperature detecting elements each of which generates an electrical signal in accordance with an amount of infrared rays, the non-contact temperature sensor being disposed to detect a predetermined region within the passenger compartment in a non-contact state using the temperature detecting elements; and a control unit which controls an air-conditioning state to be introduced into the passenger compartment based on a temperature signal from the non-contact temperature sensor, wherein:

the non-contact temperature sensor include a lens through which the infrared rays pass;

the lens is disposed to change a relative position with the temperature detecting elements; and the control unit changes the relative position of the lens with the temperature detecting elements to switch a first state of the non-contact temperature sensor, for detecting temperature of an entire area of the predetermined region, and a second state of the non-contact temperature sensor, for detecting temperature of a part area in the predetermined region.

37. The air conditioning system according to claim 36, wherein:

when a passenger is seated on a seat in the passenger compartment, the predetermined region includes the face portion of the passenger and a part around the face portion; and the non-contact temperature sensor detects the face portion in the second state.

38. The air conditioning system according to claim 36, wherein the temperature detecting elements are disposed in a matrix shape.

* * * * *